United States Patent
Ohishi et al.

(10) Patent No.: US 7,945,821 B2
(45) Date of Patent: May 17, 2011

(54) TIME LAG MEASURING DEVICE, DISTANCE MEASURING APPARATUS AND DISTANCE MEASURING METHOD

(75) Inventors: Masahiro Ohishi, Itabashi-ku (JP); Yoshikatsu Tokuda, Itabashi-ku (JP); Fumio Ohtomo, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 426 days.

(21) Appl. No.: 11/921,914

(22) PCT Filed: Jun. 12, 2006

(86) PCT No.: PCT/JP2006/311767
§ 371 (c)(1),
(2), (4) Date: Dec. 10, 2007

(87) PCT Pub. No.: WO2006/132420
PCT Pub. Date: Dec. 14, 2006

(65) Prior Publication Data
US 2009/0235127 A1  Sep. 17, 2009

(30) Foreign Application Priority Data
Jun. 10, 2005  (JP) .................... 2005-171571

(51) Int. Cl.
*G06K 5/04* (2006.01)
(52) U.S. Cl. ....................... 714/700; 714/699
(58) Field of Classification Search .................. 714/700, 714/699, 736, 738, 819, 799, 798, 707, 815; 324/76.11, 76.52, 76.77, 138
See application file for complete search history.

(56) References Cited

U.S. PATENT DOCUMENTS

| | | | |
|---|---|---|---|
| 4,560,271 | A | 12/1985 | Fumio |
| 5,075,878 | A | 12/1991 | Ohtomo et al. |

(Continued)

FOREIGN PATENT DOCUMENTS

| | | |
|---|---|---|
| EP | 0 348 898 A2 | 1/1990 |
| EP | 1 321 740 A2 | 6/2003 |
| EP | 1 808 671 A2 | 9/2005 |

(Continued)

OTHER PUBLICATIONS

European Patent Office, Extended European Search Report for European Patent Application No. EP 06 75 7252, Nov. 11, 2009. European Patent Office. Rijswijk, Netherlands.

*Primary Examiner* — Phung M Chung
(74) *Attorney, Agent, or Firm* — Chapman and Cutler LLP

(57) ABSTRACT

In measuring a certain time lag between generations of two pulse signals, a time lag measuring device prevents errors in measurement results even with an error in two reference signals for measuring the time lag. The device measures a time lag between a start signal M1 and a stop signal M2 and includes a reference signal generating section 41 generating two reference signals S1, S2 having a phase difference $\pi/2$, and an amplitude detecting section 42 detects amplitudes A11, A12 and A21, A22 of the reference signals S1, S2 at generation timings for the start signal M1 and the stop signal M2, a phase difference detecting section 43 calculating a phase _ of the reference signals S according to each set of the amplitudes (A11, A12) and (A21, A22), and a correcting section 46 correcting the calculated phase using correction data for error correction in the reference signals S1, S2.

42 Claims, 29 Drawing Sheets

U.S. PATENT DOCUMENTS

| | | |
|---|---|---|
| 5,218,289 A | 6/1993 | Besson |
| 5,566,139 A | 10/1996 | Abshire |
| 5,956,374 A * | 9/1999 | Iwamatsu .................... 375/320 |
| 7,102,306 B2 * | 9/2006 | Hamaoka et al. ........ 318/400.01 |
| 7,202,451 B2 * | 4/2007 | Uchida et al. ................. 219/662 |
| 7,230,216 B2 * | 6/2007 | Uchida et al. ................. 219/662 |
| 7,660,212 B2 * | 2/2010 | Takeda ....................... 369/44.32 |
| 2006/0082339 A1 * | 4/2006 | Hamaoka et al. ............. 318/439 |
| 2009/0122296 A1 | 5/2009 | Ohishi et al. |

FOREIGN PATENT DOCUMENTS

| | | |
|---|---|---|
| JP | 62-063885 A | 3/1987 |
| JP | 63-085489 A | 4/1988 |
| JP | 2-077673 A | 3/1990 |
| JP | 5-231879 A | 9/1993 |
| JP | 8-122465 A | 5/1996 |
| JP | 2916780 B2 | 7/1999 |
| WO | WO 2006/038559 A1 | 4/2006 |

* cited by examiner

FIG.17
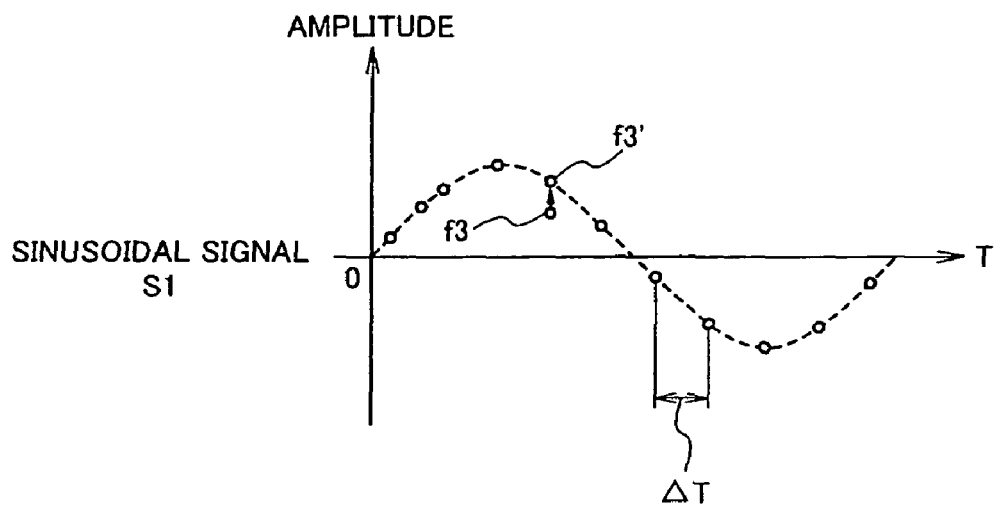
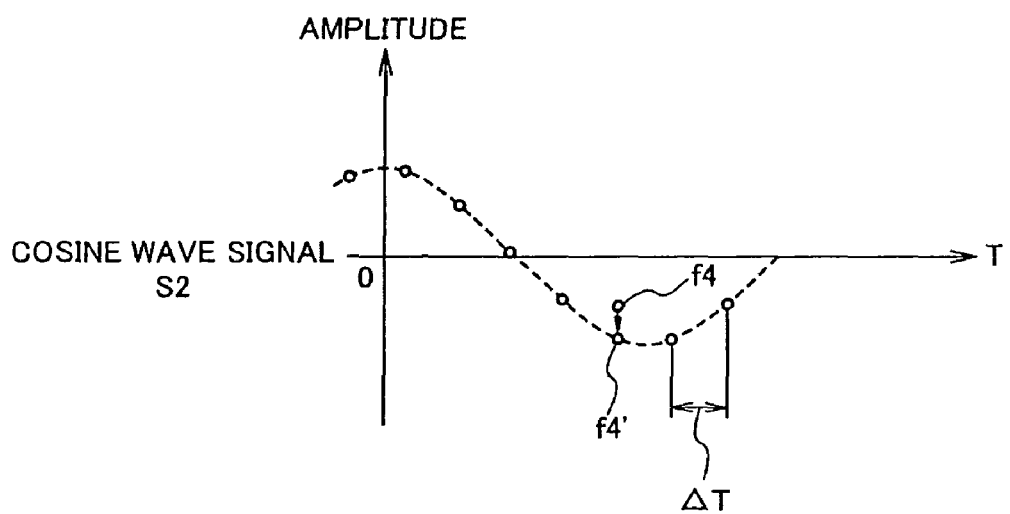

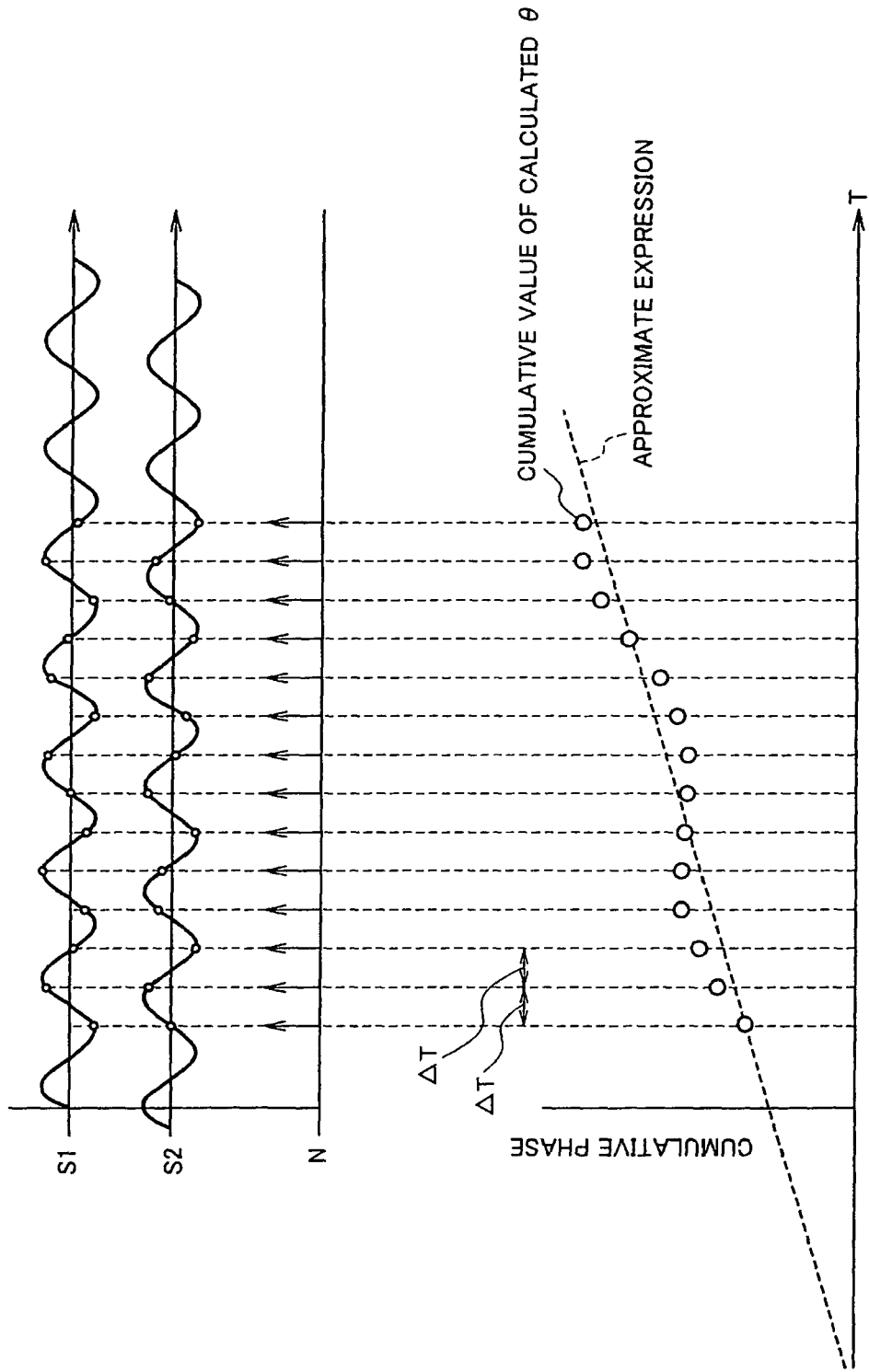

(ENLARGED DETAIL OF Z PORTION)

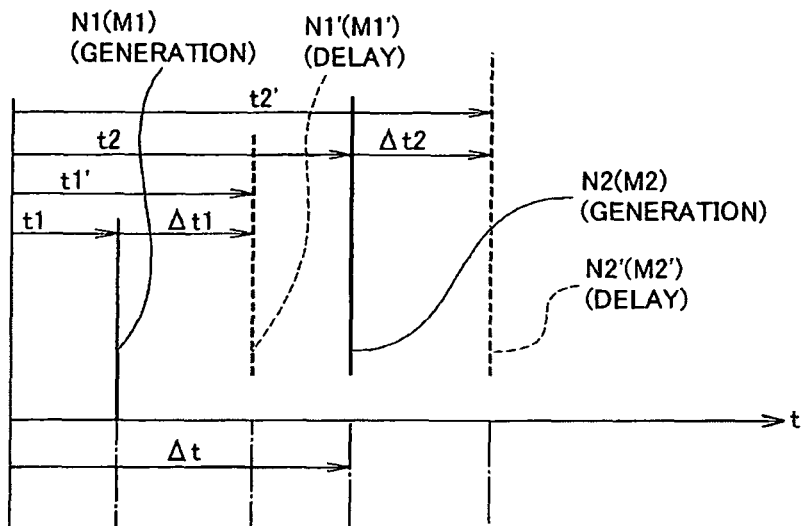
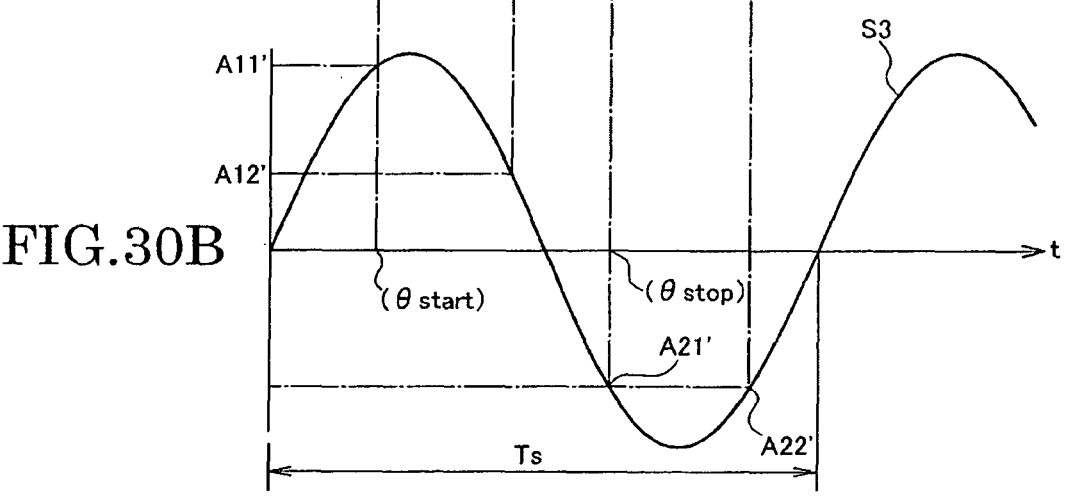
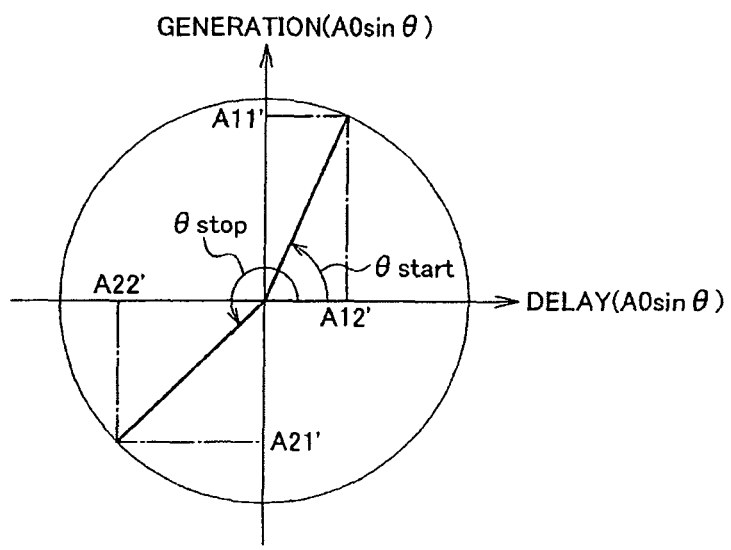

TIME LAG MEASURING DEVICE, DISTANCE MEASURING APPARATUS AND DISTANCE MEASURING METHOD

TECHNICAL FIELD

The present invention relates to a time lag measuring device, a distance measuring apparatus and a distance measuring method, and, in particular, relates to improvement in measurement of a time lag between pulse signals at a very short time interval.

BACKGROUND ART

A distance measuring apparatus such as a current survey instrument irradiates an object of distance measurement with a measuring wave such as a laser beam or a microwave, detects a reflected wave (hereinafter, collectively called a measuring wave) reflected from the object of distance measurement, finds the distance of the reciprocating movement of the measuring wave according to the time lag between the emission and the detection of the measuring wave, and thereby calculates the distance (one-way distance) to the object.

Here, the measuring of the time lag (time interval) is performed, for example: by generating a high frequency clock signal having a known extremely-short cycle as compared with the time lag between the emission and the detection of a measuring wave; by counting the number of clocks in the high frequency clock signal generated during the time between the emission and the detection of the measuring wave; and then by multiplying the counted value by the cycle. However, even though the frequency in the clock signal has to be increased to improve the measurement accuracy in such measuring, there is a limitation on the increase of the generated frequency in the clock signal.

To address this issue, a method has been invented for making the frequency of a clock signal higher spuriously by generating multiple high-frequency clock signals at the same frequency which are a certain degree out of phase with each other, and by counting the number of clocks in each of the clock signals. However, in order to improve the reliability in accuracy, the measurement needs to be repeated the number of times corresponding to the number of generated clock signals. This leads to an increase of the measurement time, and hence to a problem in a practical use.

In order to solve this problem, the applicants have proposed a technique (Patent Document 1) in which: both a start signal synchronous with an emission time of a measuring wave and a stop signal synchronous with a detection time thereof are repeatedly generated two or more times at certain time intervals; a reference signal, such as a sinusoidal signal, generated in shorter cycle than the cycle of this repetition is sampled in response to the repeated start signals and in response to the repeated stop signals; a phase difference between the first sampling wave obtained with the start signal and the second sampling wave obtained with the stop signal; a phase difference between the start signal and the stop signal is found based on the phase difference between the sampling waves; and the obtained phase difference is converted into the time lag.

The foregoing proposed technique, however, requires the start signal and the stop signal to be generated two or more times, and then to be detected two or more times. For this reason, the proposed technique has a disadvantage in terms of further speeding-up of the measurement.

Moreover, in this proposed technique, multiple start signals and multiple stop signals individually operate as sampling signals. For this reason, this proposed technique requires a generation interval between the start signals and a generation interval between the stop signals to be accurately constant, and thereby needs the control for keeping the generation intervals constant.

Against this background, the applicants have proposed a technique for solving these problems. Specifically, for example, the applicants have proposed a time lag measuring device (Patent Document 2) in which: a start signal and a stop signal are waited to be generated under the condition where two reference signals in a known cycle, such as a sinusoidal signal and a cosine wave signal, having a phase difference of $\pi/2$ [rad] therebetween are generated; the amplitudes of the respective reference signals are detected by sampling both reference signals at each generation timing for the start signal and the stop signal; a phase at the detection time of the start signal is obtained based on the amplitudes of both reference signals obtained with the start signal; a phase at the detection time of the stop signal is obtained based on the amplitudes of both reference signals obtained with the stop signal; and the generation time lag between the start signal and the stop signal is obtained based on the known cycle of these reference signals and the difference (phase difference) between the phase at the detection time of the start signal and the phase at the detection time of the stop signal.

With this time lag measuring device, an accurate generation time lag between a start signal and a stop signal can be obtained by detecting a set of the start signal and the stop signal only once.

More precisely, for example, as shown in FIG. 7, a sinusoidal signal and a cosine wave signal (signal obtained by delaying the sinusoidal signal by a phase of $\pi/2$ [rad]) are generated as two reference signals, and both reference signals are sampled at timings of the start signal and the stop signal. Then, obtained are amplitudes A11 (an amplitude of the sinusoidal signal at the generation timing of the start signal), A12 (an amplitude of the cosine wave signal at the generation timing of the start signal), A21 (an amplitude of the sinusoidal signal at the generation timing of the stop signal), and A22 (an amplitude of the cosine wave signal at the generation timing of the stop signal) of both of the reference signals at both timings. By drawing, in an xy plane, the amplitude A12 of the cosine wave signal and the amplitude A11 of the sinusoidal signal corresponding to the generation timing of the start signal, an intersection Pstart is obtained as shown in FIG. 8A. Thus, arctan (A11/A12) ($=\tan^{-1}$ (A11/A12)) that is an arctangent value of a ratio between these amplitudes (A11/A12) indicates a phase shift amount $\_start$ ($=\tan^{-1}$ (A11/A12)) from a phase zero timing of the sinusoidal signal (or the cosine wave signal).

Similarly, by drawing, in an xy plane, the amplitude A22 of the cosine wave signal and the amplitude A21 of the sinusoidal signal corresponding to the generation timing of the stop signal, an intersection Pstop is obtained as shown in FIG. 8B. Thus, arctan (A21/A22) that is an arctangent value of a ratio between these amplitudes (A21/A22) indicates a phase shift amount $\_stop$ ($=\tan^{-1}$ (A21/A22)) from a phase zero timing of the sinusoidal signal (or the cosine wave signal).

Accordingly, a phase difference $\Delta\_$ in the reference signal between the generation timing of the start signal and the generation timing of the stop signal is obtained from $$\Delta\_=\_stop-\_start,$$

and a time lag Δt between the generation timing of the start signal and the generation timing of the stop signal is obtained from $$\Delta t = (\Delta\_/2\pi)Ts \text{ [seconds]},$$

where Ts [seconds] denotes a cycle of the reference signal.

In addition, the applicants have also proposed a technique (Patent Document 3) in which: only a single reference signal is generated instead of the aforementioned two reference signals having the phase difference of π/2 [rad] therebetween; and, in the sampling of this reference signal by use of a pulse signal, the reference signal is sampled at two timings, i.e., a generation timing of the pulse signal and a delay timing that is delayed from this generation timing by the phase difference of π/2 [rad] between the reference signals.

In essence, the technique proposed by Patent Document 2 is that the two reference signals set to have a phase difference of π/2 [rad] are simultaneously sampled at one timing, while the technique proposed by Patent Document 3 is that the amplitude of the reference signal is sampled at the two timings shifted by a time corresponding to a phase difference of π/2 [rad] between the reference signals. The technique of Patent Document 2 and the technique of Patent Document 3 are substantially the same as that in which the amplitude of a reference signal is sampled at two phase difference timings corresponding to a phase difference of approximately π/2 [rad].

Patent Document 1: Japanese Patent Publication No. 2916780
Patent Document 2: Japanese Patent Application No. 2004-291495 (not disclosed)
Patent Document 3: Japanese Patent Application No. 2005-169500 (not disclosed)

DISCLOSURE OF THE INVENTION

Problems to be Solved by the Invention

Here, the technique proposed by the Patent Document 2 is a technique realized under the premises that two reference signals have a phase difference of π/2 [rad] and have the completely same amplitude and cycle. For this reason, even a slight variation of the phase difference from π/2 [rad] causes a large error in the result.

More precisely, if the two reference signals have the completely same cycle and amplitude and the strict phase difference of π/2 [rad], the aforementioned intersection Pstart, in the xy plane, of the amplitude A12 of the cosine wave signal and the amplitude A11 of the sinusoidal signal detected corresponding to the generation timing of the start signal always exists on the circumference of a circle of a radius A0 (the maximum amplitude in design of the reference signals (the sinusoidal signal and the cosine wave signal)) as shown by the dashed line in FIG. 8A.

Similarly, the intersection Pstop, in the xy plane, of the amplitude A22 of the cosine wave signal and the amplitude A21 of the sinusoidal signal detected corresponding to the generation timing of the stop signal always exists on the circumference of a circle of a radius A0 as shown by the dashed line in FIG. 8B.

Then, the calculation to find the phases of _start and _stop corresponding to the respective generation timings is based on the premise that each of the intersections Pstart and Pstop exists on the circumference of the circle having, as the radius, the maximum amplitude A0 of the reference signals.

However, even though, for example, the circuit characteristics of a resonance circuit, a filter and the like for generating the reference signals are provided for generating each of the reference signals, the manufacturing of those for the two reference signals to have completely the same circuit characteristics is difficult in fact in consideration of a balance with costs.

In addition, even if these two have the circuit characteristics made completely the same, a slight difference between the installation positions on the substrates causes a difference between use environments, such as ambient temperatures, and accordingly causes a difference between outputted waveforms of the reference signals.

Moreover, a difference may occur in the degree of age deterioration.

If the premise that both of the reference signals used to measure the generation time interval (time lag) between the pulse signals for the measurement are completely the same (have the same maximum amplitude and are shifted by the phase difference of π/2 [rad]) is overturned, the intersection Pstart, in the xy plane, of the amplitude A12 of the cosine wave signal and the amplitude A11 of the sinusoidal signal detected corresponding to the generation timing of the start signal follows a locus along an oval curved line as shown by the dashed line in FIG. 9, for example.

As similar to the intersection Pstart, the intersection Pstop, in the xy plane, of the amplitude A22 of the cosine wave signal and the amplitude A21 of the sinusoidal signal detected corresponding to the generation timing of the stop signal follows a locus along an oval curved line.

Here, in the drawing of the locus shown in FIG. 9, assume that, even though the amplitude A11 of the sinusoidal signal that is the reference signal at the generation timing of the start signal should be originally detected as a value shown by the straight alternate long and two short dashes line (as a point on the circumference of the alternate long and two short dashes line (radius=A0)), the amplitude A11 is actually detected as a value shown by the solid straight line due to an occurrence of an error in the maximum amplitude, itself, of the sinusoidal signal. On the other hand, assume that any error does not occur in the maximum amplitude and the phase difference of the cosine wave signal, and the amplitude A12 is detected as a value shown by a solid line in FIG. 9. On these assumptions, the intersection of Pstart of the two is naturally located at a different position, and the intersection Pstart based on the actually-detected value appears on a position shifted in a direction in which a value in the y axis direction becomes smaller, in the example shown in the drawing.

When the phase _start is obtained on the basis of this intersection Pstart (actual), the calculation is performed on assumption that the intersection Pstart (actual) exists on the circumference. For this reason, in FIG. 9, assuming the circumference (the radius<A0) which passes through Pstart, and is shown by the alternate long and short dash line, the phase _start (actual) on this circumference of the alternate long and short dash line is obtained. However, the phase to be originally obtained should be _start (original).

Accordingly, a difference occurs between the phase _start (original) to be originally obtained, and the phase _start (actual) actually obtained on the basis of the detection value, and a similar difference also occurs between the phases _stop. For this reason, an error occurs in the phase difference Δ_, which is a difference between the phases _start and _stop, and thereby, the finally obtained time lag Δt takes a wrong value.

Although the foregoing example of the error occurrence shows the case where the phase difference between the two reference signals varies from π/2 [rad], an error also occurs in the measurement result of the time lag Δt, as similar to the above case, when the maximum amplitudes of the reference signals are not equal to each other.

In addition, the foregoing problem of measurement error occurs not only in the case of the technique proposed by Patent Document 2 in which the two reference signals having the phase difference $\pi/2$ [rad] are used, but also in the case of the technique proposed by Patent Document 3 in which only one reference signal is used and sampled with the time lag corresponding to the phase difference of $\pi/2$ [rad], similarly.

The present invention has been made in consideration of the above problems. An object of the present invention is to provide a time lag measuring device capable of accurately measuring a time lag between two pulse signals generated with a predetermined time lag only at once without generating the two pulse signals repeatedly, and capable of preventing an error from occurring in the measurement result even when an error occurs in a single reference signal used for the time lag measurement or when a difference in the sampling timing or a difference between two or more reference signals occurs; as well as to provide a distance measuring apparatus and a distance measuring method using the time lag measuring device.

Means for Solving the Problems

A time lag measuring device according to the present invention measures a time lag between generations of two pulse signals and improves accuracy in measuring a time lag as follows. Two reference signals having a phase difference of approximately $\pi/2$ [rad] are simultaneously sampled in response to each of the pulse signals, or a single reference signal is sampled at the generation timings for the respective pulse signals and at delay timings obtained by delaying the respective generation timings by a time corresponding to a phase difference of approximately $\pi/2$ [rad] (including a phase difference of odd multiples of approximately $\pi/2$ [rad] (($\pi/2$) [rad] _(2n−1); n=1, 2, ... ). When the generation time lag is found out according to the amplitudes of the reference signals obtained by sampling the reference signals at the respective timings, an error between the reference signals and/or an error in at least one of the reference signals is/are corrected in accordance with a relationship between the two amplitude values of the two reference signals at the same timing, or a relationship between the two amplitude values of the single reference signals at two timings (two timings including the generation timing and the delay timing). Then, the generation time lag is found by using the corrected values to improve accuracy of the measurement of the time lag.

Specifically, (1) a time lag measuring device according to the present invention measures an unknown time lag between generations of two pulse signals. The time lag measuring device is characterized by including: a reference signal generating section generating a reference signal having a known cycle; an amplitude detecting section obtaining two amplitudes of the reference signal at a timing at which each of the pulse signals are generated, so as to substantially achieve a same effect as in a case where the amplitudes of the reference signal are sampled at two timings in association with respective generation timings for the two pulse signals, the two timing being spaced with an interval corresponding to a phase difference of approximately $\pi/2$ [rad] in the reference signal; a phase difference detecting section obtaining a phase of the reference signal at a generation timing for each of the pulse signals and a phase difference thereof between the generation timings according to the two amplitudes obtained at each of the generation timings for the pulse signals; a correcting section correcting the phase difference detected by the phase difference detecting section relative to one of an error in the reference signal and an error in the phase difference of approximately $\pi/2$ [rad]; and a time lag calculating section obtaining the time lag between the generations of the two measurement pulse signals according to the phase difference corrected by the correcting section.

Here, the obtaining of two amplitudes of the reference signal at the respective generation timings for the pulse signals so as to substantially achieve the same effect as in the case where the amplitude of the reference signal is sampled at two timings having a time interval corresponding to a phase difference of approximately $\pi/2$ [rad] in the reference single, indicates that there are two applicable methods in which:

(a) in the case where a single reference signal is used, the amplitude of the reference signal is sampled at two timings having a time interval corresponding to a phase difference of approximately $\pi/2$ [rad] in the reference signal; and (b) in the case where two reference signals are used, and where the two reference signals having a phase difference of approximately $\pi/2$ [rad], the amplitudes of the reference signals are sampled at the same time.

Both of the above described contents (a) and (b) indicate that two amplitude values are obtained for each of the pulse signals. Thus, four amplitude values are obtained in response to two pulse signals determining a time lag to be measured.

Moreover, the correcting section correcting an error may generate and store correction data (a correction coefficient, a correction function and a reference table) and the like immediately before the measurement of a generation time lag between two pulse signals, or may store fixed correction data that is suited to the individual difference of the time lag measuring device.

In the time lag measuring device thus configured according to the present invention, (a) in the case where a single reference signal is used, the amplitude of the single reference signal is sampled at two timings having a time interval corresponding to a phase difference of approximately $\pi/2$ [rad] in the reference signal; or (b) in the case where two reference signals are used and where a phase difference between the two reference signals is approximately $\pi/2$ [rad], the reference signals are sampled at the same time.

In this way, two reference signal amplitudes are obtained for each of generation timings for two pulse signals generated with a known time lag.

Then, according to each of the reference signal amplitudes detected by the amplitude detecting section, the phase difference detecting section obtains a phase of the reference signal at each of the generation timings, and obtains a phase difference $\Delta\theta$ between the obtained phases at the two generation timings. The phase difference $\Delta\theta$ between the two generation timings can be converted into a time lag $\Delta t$ by using the cycle Ts in the reference signal. Accordingly, the time lag calculating section performs the calculation to find an unknown generation time lag between two pulse signals having the unknown generation time lag $\Delta t$.

Here, the correction means corrects an error included in a phase difference corresponding to the two generation timings for the respective pulse signals, the error attributed to an error in the reference signal or an error in the timing for the phase difference approximately of $\pi/2$ [rad]. The time lag calculating section finds the generation time lag $\Delta t$ according to the phase difference corrected by the correction section.

Hence, even in a case where the reference signal has an error in the amplitudes or the phase difference, a time lag between the generation timings for measurement pulse signals can be accurately measured.

In order to measure a generation time lag of two pulse signals, another time lag measuring device according to the present invention: generates two reference signals having a phase difference of approximately π/2 [rad] and a known cycle; samples the reference signals in response to each pulse signal (detects the amplitudes); and obtains a phase of the reference signals at each sampling timing according to the amplitudes of the two reference signals at each sampling time. Thereafter, to find a generation time lag according to a phase difference between the two sampling timings, the time lag measuring device accurately measures the generation time lag between pulse signals by correcting an error in the phase difference attributed to an error in the reference signal.

Specifically, (2) another time lag measuring device according to the present invention measures an unknown time lag between generations of two pulse signals, and is characterized by including: a reference signal generating section generating at least two reference signals having a phase difference of approximately π/2 [rad] and a known cycle; an amplitude detecting section obtaining respective amplitudes of the two reference signals at a timing at which the pulse signals are generated; a phase difference detecting section obtaining a phase of the reference signal at a timing at which each of the pulse signals is generated and a phase difference thereof between respective generation timings according to the two amplitudes of each of the reference signals obtained by the amplitude detecting section; a correcting section correcting the phase difference detected by the phase difference detecting section relative to an error attributed to one of an error between the two reference signals and an error in at least one of the reference signals; and a time lag calculating section obtaining the time lag between the generations of the two measurement pulse signals according to the phase difference corrected by the correcting section.

Here, the correcting section correcting an error may generate and store correction data (a correction coefficient, a correction function and a reference table) and the like immediately before the measurement of a generation time lag between two pulse signals, or may store fixed correction data that is suited to the individual difference of the time lag measuring device.

In another time lag measuring device thus configured according to the present invention, at each generation timing for two pulse signals with an unknown time lag, the amplitude detecting section samples two reference signals having a phase difference of π/2 [rad] and generated by the reference signal generating section, and detects the amplitude of each of the reference signals for each sampling (for each pulse signal).

Thereafter, the phase difference detecting section obtains a phase of each of the reference signals in each sampling according to the amplitude of each of the reference signals detected by the amplitude detecting section, and also obtains a phase difference Δθ between the obtained phases at the generation timings for the pulse signals. Since the phase difference Δθ between the generation timings can be converted into a time lag Δt by using a cycle Ts of the reference signals, the time lag calculating section performs the calculation to find an unknown generation time lag Δt between two pulse signals having the unknown generation time lag.

Here, the correcting section corrects the phase difference detected by the phase difference detecting section relative to an error included in the phase difference due to an error between the two reference signals or an error in at least one of the reference signals. The time lag calculating section obtains the generation time lag Δt according to the phase difference corrected by the correction section.

Hence, even in a case where the reference signal has an error in the amplitudes or the phase difference, a time lag between the generation timings for measurement pulse signals can be accurately measured.

In a time lag measuring device according to one preferred embodiment of the present invention, the correcting section includes a correction data storing part storing therein correction data (a reference table (a lookup table), a correction coefficient, a correction function and the like); and a correction calculating part performing a correction calculating processing using the correction data stored in the storing part.

In other words, (3) in one preferred embodiment of the time lag measuring device of the present invention, a correcting section is characterized by including a correction data storing part storing therein correction data for correcting an error; and a correction calculating part performing a correction calculating processing using the correction data stored in the correction data storing part.

Here, the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that should correspond to the time lag). Specifically, the above relationship, for example, includes: a relationship between a time lag obtained when two correction pulse signals having a known time lag between the generation timings are inputted to the time lag measuring device, and the known time lag; a relationship between the obtained phase difference and the known time lag (or the phase difference that should correspond to the time lag); a relationship between the two obtained phases corresponding to the respective generation timings, and the known time lag (or the phase difference that is to correspond to the time lag); or the like.

In addition, the correction data may be prohibited from being rewritten or be allowed to be rewritten after being stored in the correction data storing part. When the data is prohibited from being rewritten, an influence made on a measurement result due to an individual difference of the time lag measuring device can be eliminated.

On the other hand, when the data is allowed to be rewritten, not only the influence attributed to an individual difference of the time lag measuring device but also the influence attributed to the use environment, such as age deterioration of the time lag measuring device, can be eliminated.

In the time lag measuring device thus configured according to the one preferred embodiment of the present invention, the correction calculating part performs the correction calculating processing using the correction data previously stored in the correction data storing part to correct an error in a measurement result attributed to an error between the two reference signals or an error in at least one of the reference signals. Thereby, even in a case where the reference signals have an error in the amplitudes and the phase difference, the time lag between the generation timings for the measurement pulse signals can be accurately measured.

Additionally, the correcting section can be built with such a simple configuration including the correction data storing part and the correction calculating part.

In other words, the time lag measuring device has a configuration only including the actual measurement mode for performing actual measurement, without including a structure (the correction mode) for generating the correction data stored in the correction data storing part. For this reason, the time lag measuring device can have a configuration simpler than a time lag measuring device including such a correction mode.

A time lag measuring device according to one preferred embodiment of the present invention has a correction mode in addition to the actual measurement mode.

Specifically, (4) in one preferred embodiment of the time lag measuring device according to the present invention, the correcting section is characterized by including: a mode switching part switching between an actual measurement mode in which measurement pulse signals targeted for measuring the generation time lag are inputted and a correction mode in which correction pulse signals generated at timings with a known time lag are inputted; a correction data generating part generating correction data for correcting the error in accordance with a relationship between the known time lag and the phase difference of the correction pulse signals between the generation timings+, the phase difference being calculated by the phase difference detecting section in response to input of each of the correction pulse signals in the correction mode; a correction data storing part storing therein the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

Here, as similar to the correction data of the time lag measuring device according to the aforementioned embodiment (3), the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that should correspond to the time lag). Specifically, the above relationship, for example, includes: a relationship between a time lag obtained when two correction pulse signals having a known time lag between the generation timings are inputted to the time lag measuring device, and the known time lag; a relationship between the obtained phase difference and the known time lag (or the phase difference that is to correspond to the time lag); a relationship between the two obtained phases corresponding to the respective generation timings, and the known time lag (or the phase difference that is to correspond to the time lag); or the like.

Note that an external device comprises a section for generating correction pulse signals having a known time lag (for example, a sampling timing forming part), and it is not included in the time lag measuring device of the present invention.

Besides the actual measurement mode, the time lag measuring device thus configured according to the one preferred embodiment of the present invention also includes the correction mode for generating the correction data to be stored in the correction data storing part, and the mode switching part alternatively selects the correction mode and the actual measurement mode.

First, in the correction mode, the correction pulse signals having the known time lag between the generation timings are inputted. The phase difference detecting section calculates the phase difference of the correction pulse signals between the generation timings in response to input of the correction pulse signals. Then, in accordance with a relationship between the calculated phase difference and the known time lag, the correction data generating part generates the correction data for correcting an error.

Thereafter, the correction data generated by the correction data generating part is stored in the correction data storing part. After the mode switching part switches to the actual measurement mode, the correction calculating part performs a correction calculating processing using the correction data stored in the correction data storing part to correct the phase difference corresponding to the time lag between the generation timings for measurement pulse signals obtained in the actual measurement mode.

In this way, in the preceding step of an actual measurement of a time lag, the mode can be switched to the correction mode, and then the correction data stored in the correction data storing part can be updated to the latest correction data. Accordingly, it is possible to eliminate not only influence on a measurement result due to an individual difference of the time lag measuring device, but also an influence attributed to the usage environment, such as age deterioration of the time lag measuring device.

Note that an external device comprises a section for generating correction pulse signals having a known time lag (for example, a sampling timing forming part), and it is not included in the time lag measuring device of the present invention. For this reason, the time lag measuring device can have a configuration simpler than a time lag measuring device including a structure for generating such correction pulse signals.

A time lag measuring device according to one preferred embodiment of the present invention has a correction mode in addition to the actual measurement mode, and also includes a section generating time lag pulses for correction at equal intervals (sampling timing forming part).

Specifically, (5) in one preferred embodiment of the time lag measuring device of the present invention, the correcting section is characterized by including: a sampling timing forming part generating correction pulse signals at timings with an equal time lag; a mode switching part switching between an actual measurement mode in which measurement pulse signals targeted for measuring the generation time lag are inputted, and a correction mode in which the correction pulse signals are inputted; a correction data generating part generating correction data for correcting the error in accordance with a relationship between the equal time lag and the phase difference of the correction pulse signals between the generation timings, the phase difference being calculated by the phase difference detecting section in response to input of each of the correction pulse signals in the correction mode; a correction data storing part storing the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

Here, as similar to the correction data of the time lag measuring device according to the aforementioned embodiments (3) and (4), the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that should correspond to the time lag). Specifically, the indicated relationship, for example, includes: a relationship between a time lag obtained when correction pulse signals having an equal time lag between the generation timings are inputted to the time lag measuring device, and the time lag; a relationship between the obtained phase difference with the time lag (or the phase difference that should correspond to the time lag); a relationship between the two obtained phases corresponding to the respective generation timings, and the time lag (or the phase difference that should correspond to the time lag); or the like.

The time lag measuring device thus configured according to the one preferred embodiment of the present invention also includes the correction mode for generating the correction data to be stored in the correction data storing part in addition to the actual measurement mode for performing actual measurement, and the mode switching part alternatively selects the correction mode and the actual measurement mode.

First, in the correction mode, the sampling timing forming part generates correction pulse signals having an equal time lag between the generation timings by imitating measurement pulse signal. The phase difference detecting section calculates the phase difference between the generation timings for the correction pulse signals in response to input of the correction pulse signals. Then, in accordance with a relationship between the calculated phase difference and the equal time lag, the correction data generating part generates the correction data for correcting an error.

Thereafter, the correction data generated by the correction data generating part is stored in the correction data storing part. After the mode switching part switches to the actual measurement mode, the correction calculating part performs a correction calculating processing using the correction data stored in the correction data storing part to correct the phase difference corresponding to the time lag between the generation timings for measurement pulse signals obtained in the actual measurement mode.

In the preceding step of an actual measurement of a time lag, the mode is switched to the correction mode, and then new correction data is formed by generating correction pulse signals, as described above. Thereby, the correction data stored in the correction data storing part can be updated to the latest correction data. Accordingly, it is possible to eliminate not only an influence on a measurement result due to an individual difference of the time lag measuring device but also an influence attributed to the usage environment such as age deterioration of the time lag measuring device.

Moreover, a calibration processing can also be performed in a self-contained manner. Precisely, since it is not necessary to additionally prepare another external apparatus (an apparatus for generating correction pulse signals or the like), calibration can be performed in the correction mode even in a place without any available external apparatus.

(6) One preferred embodiment of the time lag measuring device of the present invention is characterized in that the correction pulse signals are generated at equal intervals by the sampling timing forming part, and synchronized, once every several times, with the reference signals generated by the reference signal generating section.

(7) One preferred embodiment of the time lag measuring device of the present invention is characterized in that the correction pulse signals are generated at equal intervals by the sampling timing forming part, and asynchronous with the reference signals generated by the reference signal generating section.

(8) One preferred embodiment of the time lag measuring device of the present invention is characterized in that the correction data is set to correspond with a ratio between the amplitudes of the reference signals that are detected by the amplitude detecting section in response to each of the correction pulse signals.

(9) One preferred embodiment of the time lag measuring device of the present invention is characterized in that the two reference signals are a sinusoidal signal and a cosine wave signal.

In the time lag measuring device thus configured according to the one preferred embodiment of the present invention (9), the sinusoidal signal and the cosine wave signal having a phase difference of $\pi/2$ are employed as the reference signals. Thereby, the phase _ can be calculated by directly calculating a ratio between the detected values (amplitude values) and then by calculating the arctan of the ratio. Then, the phase difference $\Delta\_$ can be easily detected from the two phases.

(10) One preferred embodiment of the time lag measuring device of the present invention is characterized in that the correction data is set to correspond with an arctangent value (arctan) of a ratio between the amplitudes of the reference signals that are detected by the amplitude detecting section in response to each of the correction pulse signals.

The time lag measuring device thus configured according to the one preferred embodiment of the present invention is capable of calculating the phase _ by directly calculating a ratio between the detected values (amplitude values), and then by calculating the arctan of the ratio, and also is capable of easily detecting the phase difference $\Delta\_$ from the two phases.

(11) One preferred embodiment of the time lag measuring device of the present invention is characterized in that: the two reference signals are a sinusoidal signal and a cosine wave signal; when the amplitude values of the sinusoidal signal at the respective timings at which the plurality of correction pulse signals are sequentially inputted in time series are plotted in time series, the correcting section corrects a variation in the amplitude values so that each amplitude value not plotted on a certain sinusoidal curved line, among the plotted amplitude values, is plotted on the certain sinusoidal curved line; and when the amplitude values of the cosine wave signal at the respective timings at which the plurality of correction pulse signals is sequentially inputted in time series are plotted in time series, the correcting section corrects a variation in the amplitude values so that each amplitude value not plotted on a certain cosine wave curved line, among the plotted amplitude values, is plotted on the certain cosine wave curved line.

(12) One preferred embodiment of the time lag measuring device of the present invention is characterized in that: the correction data stored in the correction data storing part is data on discrete sampling points; and, in a case where the data on a relevant sampling point is not stored in the correcting section at the time of obtaining the generation time lag, the correcting section generates the data on the relevant sampling point through any of an interpolation process and a fitting process based on the data of the sampling points stored in the correcting section.

(13) One preferred embodiment of the time lag measuring device of the present invention is characterized in that the correction data stored in the correction data storing part is stored as a function with an oval shape obtained corresponding to elliptically discrete sampling points.

(14) One preferred embodiment of the time lag measuring device of the present invention is characterized by further including an approximate-time-lag detecting section detecting an approximate generation time lag between the two measurement pulse signals, and is characterized in that the time lag calculating section calculates the generation time lag between the two measurement pulse signals by using the approximate generation time lag detected by the approximate-time-lag detecting section, in addition to a precise time lag obtained by the time lag calculating section.

The approximate-time-lag detecting section may be any device as long as it can detect a time with resolution of a degree that allows 1 cycle of the aforementioned reference signals to be distinguished. Thus, a widely-known pulse counter or the like for detecting the approximate time lag by counting the number of pulses in the reference signals can be employed.

The time lag measuring device thus configured in the one preferred embodiment according to the present invention (14) is capable of detecting the approximate generation time lag between two pulse signals by use of the approximate-time-lag detecting section. For this reason, even when the generation time lag between the two pulse signals is so long as to exceed 1 cycle of the reference signal, the generation time lag can be accurately measured.

In other words, the phase difference $\Delta\_$ between the two pulse signals detected by the time lag calculating section is calculated as a value within a range of 0 [rad] to $2\pi$ [rad]. However, since the reference signal is a periodic signal, the phase difference $\Delta\_$ potentially indicates $2\pi+\Delta\_$, $4\pi+\Delta\_$, ... as well as $\Delta\_$ of $2\pi$ or less. Thus, the phase difference $\Delta\_$ can be expressed as a general expression $2\pi(n-1)+\Delta\_$ (n; natural number).

On the other hand, the generation time lag between two pulse signals to be calculated needs to include, as a time, the first term of the above general expression $2\pi(n-1)$ [rad], and thereby the natural number n needs to be identified.

For this reason, even when the generation time lag between two pulse signals exceeds 1 cycle ($2\pi$ [rad]) of the reference signal, the approximate-time-lag detecting section is able to approximately detect the generation time lag with resolution on the order of 1 cycle of the reference signal, and then the time lag calculating section is able to identify the phase difference of $2\pi(n-1)$ [rad], which is the first term part in the general expression, according to the approximate generation time lag detected by the approximate-time-lag detecting section. Thus, the time lag calculating section can identify and obtain, as a unique value, a time (a value obtained by multiplying $[2\pi(n-1)+\Delta\_]/2\pi$ by the cycle [sec] of the reference signal) corresponding to the phase difference that is a total sum of the first term and the second term, i.e., the generation time lag between the two pulse signals.

(15) One preferred embodiment of the time lag measuring device of the present invention is characterized in that: the amplitude detecting section detects both of an amplitude A11 of the sinusoidal signal as one of the reference signals and an amplitude A12 of the cosine wave signal as the other one of the reference signals at the generation timing for one of two measurement pulse signals targeted for measuring the generation time lag, the one of two measurement pulse signals chronologically preceding to the to the other; the phase difference detecting section calculates a ratio between the amplitudes A11 and A12 (A11/A12), and calculates the phase _start based on the amplitude ratio (A11/A12) from $\tan^{-1}\{(A11/A12)\}$; the correcting section corrects the phase _start to a phase _start'; the amplitude detecting section detects both of an amplitude A21 of the sinusoidal signal and an amplitude A22 of the cosine wave signal at the generation timing for the other of the two measurement pulse signals which is chronologically subsequent to the other; the phase difference detecting section calculates a ratio between the amplitudes A21 and A22 (A21/A22), and calculates a phase _stop based on the amplitude ratio (A21/A22) from $\tan^{-1}\{(A21/A22)\}$; the correcting section corrects the phase _stop to the phase _stop'; and the time lag calculating section calculates the phase difference $\Delta\_$ of the two measurement pulse signals between the generation timings from (_stop'−_start').

The time lag measuring device thus configured according to the one preferred embodiment of the present invention is capable of accurately calculating a time lag through the simple calculation processes.

(16) One preferred embodiment of the time lag measuring device of the present invention is characterized in that the correction data is obtained by sampling the reference signal at least 6 sampling points in one cycle.

Another time lag measuring device according to the present invention functions in the following way in order to measure a generation time lag between two pulse signals. Specifically, a single reference signal having a known cycle is generated, and the reference signal is sampled in response to each of the pulse signals (when the amplitude is detected). At the time, the reference signal is sampled not only at the generation timing for each of the pulse signals, but also at a timing (delay timing) delayed from the generation timing by a time corresponding to a phase difference of approximately $\pi/2$ [rad] in the reference signal. Thereby, the two amplitudes of the reference signal corresponding to the generation of each pulse signal are obtained, and the phase of the reference signal at each of the generation timing is obtained based on the corresponding amplitude of the reference signal. Thereafter, when the generation timing lag is found based on the phase difference between the generation timings, an error in the phase difference attributed to an error in the reference signal is corrected, and thereby the generation time lag between the two pulse signals is accurately measured.

Specifically, (17) another time lag measuring device measures an unknown time lag between generations of two pulse signals, and is characterized by including: a reference signal generating section generating a single reference signal having a known cycle; a pulse delaying section delaying each of the two pulse signals by a time corresponding to a phase difference of approximately $\pi/2$ [rad] in the reference signal; an amplitude detecting section obtaining respective amplitudes of the reference signal at a timing at which each of the pulse signals is generated and at the delay timing delayed by the pulse delaying section; a phase difference detecting section obtaining a phase of the reference signal for each of the pulse signals and a phase difference of the pulse signals between the generation timings according to two amplitudes detected for each of the pulse signals by the amplitude detecting section; a correcting section correcting the phase difference detected by the phase difference detecting section relative to one of an error in the reference signal and an error in the phase difference of approximately $\pi/2$ [rad]; and a time lag calculating section obtaining the generation time lag between the two measurement pulse signals according to the phase difference corrected by the correcting section.

Here, the correcting section correcting an error may generate and store the correction data (the correction coefficient, the correction function or the reference table) or the like immediately before a measurement of a generation time lag between two pulse signals, or such data may be stored as fixed correction data suited to an individual difference of the time lag measuring device.

In another time lag measuring device thus configured according to the present invention, at each generation timing for two pulse signals with an unknown time lag and at each delay timing, the amplitude detecting section samples a single reference signal generated by the reference signal generating section, and detects each of the amplitudes of the reference signal corresponding to the generation of each pulse signal.

Then, the phase difference detecting section obtains a phase of the reference signal at each generation timing according to each of the detected amplitudes of the reference signal, and the phase difference $\Delta\theta$ between the obtained phases at the two generation timings for the pulse signals. The phase difference $\Delta\theta$ between the generation timings can be converted into a time lag $\Delta t$ by using a cycle Ts of the reference signal. Accordingly, the time lag calculating section performs the calculation to find an unknown generation time lag between two pulse signals having the unknown generation time lag.

Here, the correcting section corrects the phase difference detected by the phase difference detecting section relative to an error in the reference signal itself, or an error in the setting of the phase difference of approximately $\pi/2$ [rad] for obtaining the delay timing. Then, the time lag calculating section obtains the generation time lag $\Delta t$ on the basis of the phase difference corrected by the correction section.

Accordingly, even in a case where the reference signal has an error in the amplitudes and the phase difference, the time lag between the generation timings for the measurement pulse signals can be accurately measured.

In a time lag measuring device according to one preferred embodiment of the present invention, a correcting section includes a correction data storing part storing, therein, correction data (a reference table (a lookup table), a correction coefficient, a correction function or the like), and a correction calculating part performing a correction calculating processing using the correction data stored in the correction data storing part.

Specifically, (18) in one preferred embodiment of the time lag measuring device of the present invention, the correcting section is characterized by including the correction data storing part storing, therein, correction data for correcting the error and the correction calculating part performing a correction calculating processing using the correction data stored in the correction data storing part.

Here, the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that is to correspond to the time lag). Specifically, the above relationship, for example, includes: a relationship between a time lag obtained when correction pulse signals having a known time lag between the generation timings are inputted to the time lag measuring device, and the known time lag; a relationship between the obtained phase difference with the time lag (or the phase difference that is to correspond to the time lag); a relationship between the two obtained phases corresponding to the respective generation timings and the time lag (or the phase difference that should correspond to the time lag); or the like.

In addition, the correction data may be prohibited from being rewritten or be allowed to be rewritten after being stored in the correction data storing part. When the data is prohibited from being rewritten, an influence made on a measurement result due to an individual difference of the time lag measuring device can be eliminated.

On the other hand, when the data is allowed to be rewritten, not only the influence attributed to an individual difference of the time lag measuring device but also the influence attributed to the use environment, such as age deterioration of the time lag measuring device, can be eliminated.

In the time lag measuring device thus configured according to the one preferred embodiment of the present invention, the correction calculating part performs the correction calculating processing using the correction data previously stored in the correction data storing part to correct an error attributed to an error in the reference signal or an error in the setting of the phase difference of approximately $\pi/2$ [rad] for obtaining the delay timing. Thereby, even in a case where the reference signal has an error in the amplitudes and the phase difference, the time lag between the generation timings for the measurement pulse signals can be accurately measured.

Additionally, the correcting section can be built with such a simple configuration including the correction data storing part and the correction calculating part.

In other words, the time lag measuring device has a configuration only including the actual measurement mode for performing actual measurement, without including a structure (the correction mode) for generating the correction data stored in the correction data storing part. For this reason, the time lag measuring device can have a simpler configuration than a time lag measuring device including such correction mode.

A time lag measuring device according to one preferred embodiment of the present invention has a correction mode in addition to the actual measurement mode.

That is, (19) in one preferred embodiment of the time lag measuring device according to the present invention, the correcting section is characterized by including: a mode switching part switching between an actual measurement mode in which measurement pulse signals targeted for measuring the generation time lag are inputted, and a correction mode in which correction pulse signals are generated at generation timings with a known time lag are inputted; a correction data generating part generating correction data for correcting the error in accordance with a relationship between the known time lag and the phase difference of the correction pulse signals between the generation timings, the phase difference being calculated by the phase difference detecting section in response to input of each of the correction pulse signals in the correction mode; a correction data storing part storing therein the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

Here, as in the case with the correction data in the time lag measuring device according to the aforementioned embodiment (18), the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that should correspond to the time lag). Specifically, the indicated relationship, for example, includes: a relationship between a time lag obtained when correction pulse signals having an equal time lag between the generation timings are inputted to the time lag measuring device, and the time lag; a relationship between the obtained phase difference with the time lag (or the phase difference that is to correspond to the time lag); a relationship between the two obtained phases corresponding to the respective generation timings, and the time lag (or the phase difference that should correspond to the time lag); or the like.

Note that an exterior device comprises a section for generating correction pulse signals having a known time lag (for example, a sampling timing forming part), and it is not included in the time lag measuring device of the present invention.

The time lag measuring device thus configured according to the one preferred embodiment of the present invention also has the correction mode for generating the correction data to be stored in the correction data storing part, in addition to the actual measurement mode for performing actual measurement, and the mode switching part alternatively selects the correction mode and the actual measurement mode.

First, in the correction mode, correction pulse signals having the known time lag between the generation timings are inputted. Then, the phase difference detecting section calculates the phase difference between the generation timings for the correction pulse signals in response to input of the correction pulse signals. Thereafter, the correction data generating part generates the correction data for correcting an error in accordance with a relationship between the calculated phase difference and the known time lag.

After that, the correction data generated by the correction data generating part is stored in the correction data storing part. After the mode switching part switches to the actual measurement mode, the correction calculating part performs the correction calculating processing using the correction data stored in the correction data storing part to correct the phase difference corresponding to the time lag between the generation timings for measurement pulse signals obtained in the actual measurement mode.

As described above, in the preceding step of an actual measurement of a time lag, the mode can be switched to the correction mode, and then the correction data stored in the correction data storing part can be updated to the latest correction data. Accordingly, not only can an influence made on a measurement result due to an individual difference of the time lag measuring device be eliminated, but also an influence attributed to the use environment, such as age deterioration of the time lag measuring device, can be eliminated.

Note that the time lag measuring device of the present invention does not include a section for generating correction pulse signals having a known time lag (for example, a sampling timing forming part). Therefore, the time lag measuring device can have a simpler configuration than a time lag measuring device including a structure for generating such correction pulse signals.

A time lag measuring device according to one preferred embodiment of the present invention has a correction mode in addition to the actual measurement mode, and also includes a section for generating time lag pulses for correction at equal intervals (sampling timing forming part).

Specifically, (20) in one preferred embodiment of the time lag measuring device of the present invention, the correcting section is characterized by including: a sampling timing forming part generating correction pulse signals at generation timings with an equal time lag; a mode switching part switching between an actual measurement mode in which measurement pulse signals targeted for measuring the generation time lag are inputted, and a correction mode in which the correction pulse signals are inputted; a correction data generating part generating correction data for correcting the error in accordance with a relationship between the equal time lag and the phase difference of the correction pulse signals between the generation timings, the phase difference being calculated by the phase difference detecting section in response to input of each of the correction pulse signals in the correction mode; a correction data storing part storing the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

Here, as similar to the correction data of the time lag measuring device according to the aforementioned embodiments (18) or (19), the correction data may be in any format as long as the data is information expressed in a format of a relational expression (a correction coefficient to be multiplied or the like), a function, a lookup table (reference table) or the like indicating a relationship between an actual measurement result (including a detection result and a calculation result during the actual measurement) and a known time lag (or the phase difference that should correspond to the time lag). Specifically, the indicated relationship, for example, includes: a relationship between a time lag obtained when correction pulse signals having an equal time lag between the generation timings are inputted to the time lag measuring device, and the time lag; a relationship between the obtained phase difference and the time lag (or the phase difference that should correspond to the time lag); a relationship between the two obtained phases corresponding to the respective generation timings and the time lag (or the phase difference that should correspond to the time lag); or the like.

The time lag measuring device thus configured according to one preferred embodiment of the present invention also includes the correction mode for generating the correction data to be stored in the correction data storing part, in addition to the actual measurement mode for performing actual measurement, and the mode switching part alternatively selects the correction mode and the actual measurement mode.

First, in the correction mode, the sampling timing forming part generates correction pulse signals having an equal time lag between the generation timings by imitating measurement pulse signals. The phase difference detecting section calculates the phase difference between the generation timings for the correction pulse signals in response to input of the correction pulse signals. Then, in accordance with a relationship between the calculated phase difference and the equal time lag, the correction data generating part generates the correction data for correcting an error.

Thereafter, the correction data generated by the correction data generating part is stored in the correction data storing part. After the mode switching part switches to the actual measurement mode, the correction calculating part performs a correction calculating processing using the correction data stored in the correction data storing part to correct the phase difference corresponding to the time lag between the generation timings for measurement pulse signals obtained in the actual measurement mode.

In the preceding step of an actual measurement of a time lag, the mode is switched to the correction mode, and then new correction data is formed by generating correction pulse signals, as described above. Thereby, the correction data stored in the correction data storing part can be updated to the latest correction data. Accordingly, not only can an influence made on a measurement result due to an individual difference of the time lag measuring device be eliminated, but also an influence attributed to the use environment, such as age deterioration of the time lag measuring device, can be eliminated.

Moreover, a calibration processing can also be performed in a self-contained manner. Precisely, since it is not necessary to additionally prepare another external apparatus (an apparatus for generating correction pulse signals or the like), calibration can be performed in the correction mode even in a place without any external apparatus.

(21) One preferred embodiment of the time lag measuring device of the present invention is characterized in that the correction pulse signals are generated at equal intervals by the sampling timing forming part, and synchronized, once every several times, with the reference signals generated by the reference signal generating section.

(22) One preferred embodiment of the time lag measuring device of the present invention is characterized in that the correction pulse signals are generated at equal interval by the sampling timing forming part, are asynchronous with the reference signal generated by the reference signal generating section.

(23) One preferred embodiment of the time lag measuring device of the present invention is characterized in that the correction data is set to correspond with a ratio between the amplitudes of the reference signal that are detected by the amplitude detecting section in response to each of the correction pulse signals.

(24) One preferred embodiment of the time lag measuring device of the present invention is characterized in that the reference signal is one of a sinusoidal signal and a cosine wave signal.

The time lag measuring device thus configured according to the one preferred embodiment of the present invention (24) employs the sinusoidal signal or the cosine wave signal as the reference signal. Since the phase difference between the generation timing and the delay timing is approximately $\pi/2$ [rad], the reference signal at the delay timing behaves as a cosine wave signal or a sinusoidal signal relative to the generation timing. For this reason, the phase _ can be calculated by figuring out a ratio between the values (amplitude values) directly detected at the two timings and then by figuring out the arctan of the ratio. Then, the phase difference $\Delta\_$ can be easily detected from the two phases.

(25) One preferred embodiment of the time lag measuring device of the present invention is characterized in that the correction data is set to correspond with the arctangent value of a ratio between the amplitudes of the reference signal at the generation timing and at the delay timing for each correction pulse signal, the amplitudes being detected by the amplitude detecting section.

According to the time lag measuring device thus configured according to the one preferred embodiment of the present invention, the phase _ can be calculated by finding a ratio between the directly detected values (amplitude values), and then by calculating the arctan of the ratio. Thereafter, the phase difference $\Delta\_$ can be easily detected from two phases.

(26) One preferred embodiment of the time lag measuring device of the present invention is characterized in that: the reference signal is a sinusoidal signal or cosine wave signal; when the amplitude values of the reference signal at the respective generation timings at which the plurality of correction pulse signals are sequentially inputted in time series are plotted in time series, the correcting section corrects a variation in the amplitude values so that each amplitude value not plotted on a certain sinusoidal curved line or cosine wave curved line, among the plotted amplitude values, can be plotted on the certain sinusoidal curved line or cosine wave curved line; and when the amplitude values of the reference signal at the respective delay timings at which the plurality of correction pulse signals are sequentially inputted in time series are plotted in time series, the correcting section corrects a variation in the amplitude values so that each amplitude value not plotted on a certain sinusoidal curved line or cosine wave curved line, among the plotted amplitude values, can be plotted on the certain sinusoidal curved line or cosine wave curved line.

(27) One preferred embodiment of the time lag measuring device of the present invention is characterized in that: the correction data stored in the correction data storing part is data on discrete sampling points; and, in a case where the data on a relevant sampling point is not stored in the correcting section at the time of obtaining the generation time lag, the correcting section generates the data on the relevant sampling point through any of an interpolation process and a fitting process based on the data of the sampling points stored in the correcting section.

(28) One preferred embodiment of the time lag measuring device of the present invention is characterized in that the correction data stored in the correction data storing part is stored as a function with an oval shape obtained corresponding to elliptically discrete sampling points.

(29) One preferred embodiment of the time lag measuring device of the present invention is characterized by further including an approximate-time-lag detecting section detecting an approximate generation time lag between the two measurement pulse signals, and is characterized in that the time lag calculating section calculates the generation time lag between the two measurement pulse signals by using the approximate generation time lag detected by the approximate-time-lag detecting section, in addition to a precise time lag obtained by the time lag calculating section.

The approximate-time-lag detecting section may be any device as long as it is capable of detecting a time with resolution of a degree to allow 1 cycle of the aforementioned reference signal to be detected. Thus, a widely-known pulse counter or the like for detecting the approximate time lag by counting the number of pulses in the reference signals can be employed.

The time lag measuring device thus configured in the one preferred embodiment according to the present invention (29) is capable of detecting the approximate generation time lag between two pulse signals by use of the approximate generation time lag section. For this reason, even when the generation time lag between the two pulse signals is so long as to exceed 1 cycle of the reference signal, the generation time lag can be accurately measured.

In other words, the phase difference $\Delta\_$ between the two pulse signals detected by the time lag calculating section is calculated as a value within a range of 0 [rad] to $2\pi$ [rad]. However, since the reference signal is a periodic signal, the phase difference $\Delta\_$ potentially indicates $2\pi+\Delta\_, 4\pi+\Delta\_, \ldots$ as well as $\Delta\_$ of $2\pi$ or less. Thus, the phase difference $\Delta\_$ can be expressed as a general expression $2\pi(n-1)+\Delta\_$ (n; natural number).

On the other hand, the generation time lag between two pulse signals to be calculated needs to include, as a time, the first term of the above general expression $2\pi(n-1)$ [rad], and thereby the natural number n needs to be identified.

For this reason, even when the generation time lag between two pulse signals exceeds 1 cycle ($2\pi$ [rad]) of the reference signal, the approximate-time-lag detecting section is able to approximately detect this generation time lag with resolution on the order of 1 cycle of the reference signal, and then the time lag calculating section is able to identify the phase difference of $2\pi(n-1)$ [rad], which is the first term part in the general expression, on the basis of the approximate generation time lag detected by this approximate-time-lag detecting section. Thus, the time lag calculating section can identify and obtain, as a unique value, a time (a value obtained by multiplying $[2\pi(n-1)+\Delta\_]/2\pi$ by the cycle [sec] of the reference signal) corresponding to the phase difference that is a total sum of the first term and the second term, i.e., the generation time lag between the two pulse signals.

(30) One preferred embodiment of the time lag measuring device of the present invention is characterized in that: the amplitude detecting section detects both of an amplitude A11 of the sinusoidal signal as one of the reference signals and an amplitude A12 of the cosine wave signal as the other one of the reference signals at the generation timing for one of two measurement pulse signals targeted for measuring the generation time lag, the one of two measurement pulse signals chronologically preceding to the other; the phase difference detecting section calculates a ratio between the amplitudes A11 and A12 (A11/A12), and calculates the phase _start based on the amplitude ratio (A11/A12) from $\tan^{-1}\{(A11/A12)\}$; the correcting section corrects the phase _start to a phase _start'; the amplitude detecting section detects both of an amplitude A21 of the reference signal and an amplitude A22 of the reference signal at the generation timing for the other of the two measurement pulse signals which is chronologically subsequent to the other; the phase difference detecting section calculates a ratio between the amplitudes A21 and A22 (A21/A22), and calculates a phase _stop based on the amplitude ratio (A21/A22) from $\tan^{-1}\{(A21/A22)\}$; the correcting section corrects the phase _stop to the phase _stop'; and the time lag calculating section calculates the phase difference $\Delta\_$ of the two measurement pulse signals between the generation timings from (_stop'−_start').

The time lag measuring device thus configured according to the one preferred embodiment of the present invention is capable of accurately calculating a time lag through the simple calculation processes.

(31) One preferred embodiment of the time lag measuring device of the present invention is characterized in that the correction data is obtained by sampling the reference signal at least 6 sampling points in 1 cycle.

A distance measuring apparatus according to the present invention employs any of the time lag measuring devices according to the present invention.

Specifically, the distance measuring apparatus according to the present invention includes a measurement-pulse-wave emission unit emitting measurement pulse wave to an object of distance measurement; a reflected-pulse-wave detection unit detecting a reflected pulse wave obtained by reflecting the measurement pulse wave by the object of distance measurement; a time lag measuring device obtaining a first pulse signal at a timing when the measurement pulse wave is emitted from the measurement-pulse-wave emission unit, obtaining a second pulse signal at a timing when the reflected pulse wave is detected by the reflected-pulse-wave detection unit, and measuring a time lag between the timings at which the first pulse signal and the second pulse signal are obtained; and a distance calculation unit finding a distance to the object of distance measurement according to the time lag obtained by the time lag measuring device. The distance measuring apparatus is characterized in that the time lag measuring device is any one of the aforementioned time lag measuring devices (1) to (31) according to the present invention.

Here, as the distance measuring apparatus, included are a so-called survey instrument and a shape measurement apparatus identifying the shape profile or the like of an object by measuring the distance to the target.

Waves applicable as the measurement pulse wave emitted to an object of distance measurement by the measurement-pulse-wave emission unit include various widely-known electromagnetic waves, such as a micro wave and light wave (a laser beam, infrared light or the like), for example, which have been heretofore used as a beam for distance measurement.

In the distance measuring apparatus thus configured according to the present invention, the measurement-pulse-wave emission unit emits the measurement pulse wave to an object of distance measurement, and the reflected-pulse-wave detection unit detects the reflected pulse wave that is this measurement pulse wave returning by being reflected by the object of distance measurement.

Then, the provided time lag measuring device obtains the first pulse signal at the emission timing for the measuring pulse wave, and obtains the second pulse signal at the detection timing for the reflected pulse wave. Hence, the time lag measuring device accurately measures a time lag between the timing for obtaining the first pulse signal and the timing for obtaining the second pulse signal. The distance calculation unit obtains the distance to the object of distance measurement on the basis of the time lag obtained by the time lag measuring device.

As a result, the distance measuring apparatus can accurately measure the time lag between the two pulse signals, and accordingly can measure the distance calculated according to the time lag.

A distance measuring method according to the present invention is for carrying out the operations of the distance measuring apparatus according to the present invention.

Specifically, the distance measuring method according to the present invention is characterized by comprising the steps of: generating at least two reference signals having a phase difference of approximately $\pi/2$ [rad] and a known cycle; emitting a measurement pulse wave to an object of distance measurement; obtaining an amplitude of each of the two reference signals at a timing at which an emission of the measuring pulse wave is detected; obtaining an amplitude of each of the two reference signals at a timing at which a reflected pulse wave is detected, the reflected pulse wave being obtained from the measurement pulse wave reflected by the object of distance measurement; obtaining a phase of the reference signals at each detection timing for the pulse waves and a phase difference thereof between the detection timings according to two amplitudes detected for each of the reference signals; correcting the detected phase difference relative to an error attributed to one of an error between the two reference signals and an error in at least one of the reference signals; obtaining a time lag between the detection timing for the measurement pulse wave and the detection timing for the reflected pulse wave according to the corrected phase difference; and finding a distance to the object of distance measurement according to the time lag.

In the distance measuring method thus configured according to the present invention, two reference signals having a phase difference of $\pi/2$ [rad] are sampled at each generation timing for two pulse signals with an unknown time lag, and the amplitude of each of the reference signals is detected for each sampling (for each pulse signal).

Then, the phase of each of the reference signals is obtained, for each sampling, based on the detected amplitude of each of the reference signals, and the phase difference $\Delta\_$ between the obtained phases at the generation timings for the pulse signals. The phase difference $\Delta\_$ between the generation timings can be converted into a time lag $\Delta t$ by using a cycle Ts of the reference signals. Accordingly, this calculation is performed to find an unknown generation time lag between two pulse signals having the unknown generation time lag $\Delta t$.

Here, the detected phase difference is corrected relative to an error included in the phase difference due to an error between the two reference signals or an error in at least one of the reference signals, and the generation time lag Δt is obtained based on the corrected phase difference.

Accordingly, even in a case where the reference signals have an error in the amplitudes and the phase difference, the time lag between the generation timings for the measurement pulse signals can be accurately measured.

In addition, as the two pulse signals generated with the unknown time lag, employed are a pulse signal generated at the detection timing for the measurement pulse wave emitted to an object of distance measurement, and a pulse signal generated at the detection timing for the reflected pulse wave that is the measurement pulse wave returning by being reflected by the object of distance measurement. Thereby, the distance to the object of distance measurement can be accurately measured on the basis of the measured time lag.

Another different distance measuring method according to the present invention is characterized by comprising the steps of: generating a single reference signal having a known cycle; emitting a measurement pulse wave to an object of distance measurement; detecting an emission of the measuring pulse wave; detecting a reflected pulse wave obtained by reflecting the measurement pulse wave by the object of distance measurement; obtaining an amplitude of the reference signal at a timing at which an emission of the measuring pulse wave is detected and at a delay timing that delays from the detection timing for the measuring pulse by a time corresponding to a phase difference of approximately π/2 [rad] in the reference signal; obtaining the amplitude of the reference signal at a timing at which the reflected pulse wave is detected and at a delay timing that delays from the detection timing for the reflected pulse wave by a time corresponding to a phase difference of approximately π/2 [rad] in the reference signal; obtaining a phase of the reference signal at each of the detection timings for the pulse waves and a phase according to the two detected amplitudes of the measurement pulse wave and the two detected amplitudes of the reflected pulse wave; correcting the obtained phase difference relative to one of an error in the reference signal and an error in the phase difference of approximately π/2 [rad]; obtaining a time lag between the detection timing for the measurement pulse wave and the detection timing for the reflected pulse wave according to the corrected phase difference; and finding a distance to the object of distance measurement according to the time lag.

In the different distance measuring method thus configured according to the present invention, the single reference signal is sampled at each generation timing for two pulse signals with an unknown time lag, and at a delay timing with a time lag corresponding to a phase difference of approximately π/2 [rad], from each generation timing. Then, the amplitude of the reference signal is detected at each of the timings for the two pulse signals.

Thereafter, the phase of the reference signal at each generation timing is obtained according to the detected amplitudes of the reference signal, and the phase difference Δ_ of the pulse signals between the obtained phases at the generation timings is obtained. The phase difference Δ_ between the generation timings can be converted into a time lag Δt by using a cycle Ts of the reference signals. Accordingly, by this calculation it is possible to find an unknown generation time lag Δt between two pulse signals having the unknown generation time lag.

Here, the detected phase difference is corrected relative to an error attributed to an error in the reference signal or an error in a delay time for setting the delay time, and the generation time lag Δt is obtained on the basis of the corrected phase difference.

Accordingly, even in a case where the reference signals have an error in the amplitudes and the phase difference, the time lag between the generation timings for the measurement pulse signals can be accurately measured.

Moreover, a pulse signal generated at the detection timing for the measurement pulse wave emitted to the object of distance measurement, and a pulse signal generated at the detection timing for the reflected pulse wave that is the measurement pulse wave returning by being reflected by the object of distance measurement are employed as the aforementioned two pulse signals generated with the unknown time lag. Thereby, the distance to the object of distance measurement can be accurately measured on the basis of the measured time lag.

Effects of the Invention

According to the time lag measuring device of the present invention, an error included in the detected phase difference is corrected, the error attributed to one of an error in the reference signal, an error in the phase difference for the delay timing, and an error between the two reference signals, and the generation time lag Δt is obtained on the basis of the phase difference thus corrected. Accordingly, even in a case where the reference signals have an error in the amplitudes and the phase difference, the time lag between the generation timings for the measurement pulse signals can be accurately measured.

In addition, in the distance measuring apparatus and the distance measuring method according to the present invention, the time lag between the pulse signals can be accurately obtained by use of the time lag measuring device according to the present invention. Consequently, the distance calculated according to the time lag can be made accurate.

BRIEF DESCRIPTION OF THE DRAWINGS

FIG. 3 is a diagram for explaining the principle of time lag measurement by the time lag measuring device in FIG. 2.

FIG. 8 is a diagram showing a relation between sampling values (amplitude values) of reference signals and a phase.

FIG. 10 is a diagram showing an error in the phase when the locus of the sampling values forms an oval curved line.

FIG. 13 is a diagram (first) explaining an operation for identifying the oval curved line shown in FIG. 12.

FIG. 14 is a diagram (second) explaining an operation for identifying the oval curved line shown in FIG. 12.

FIG. 17 is a diagram explaining a process for correcting variations of sampling points deviated from the waveforms of the reference signals.

FIG. 18 is a diagram explaining the principle for making a correction based on cumulative phases.

FIG. 19 is a diagram explaining an interpolation process in the case where there is no correction data.

FIG. 30 is a diagram showing a relation between sampling values (amplitude values) and the phase when a single reference signal is sampled at two timings (generation timing and delay timing). FIG. 30A is a diagram showing the timings for input signals and the delay timing for the input signals, FIG. 30B is a diagram showing a sampling at each timing, and FIG. 30C is a diagram showing the principle for obtaining a phase difference on the basis of the values obtained by sampling.

Figure 1:
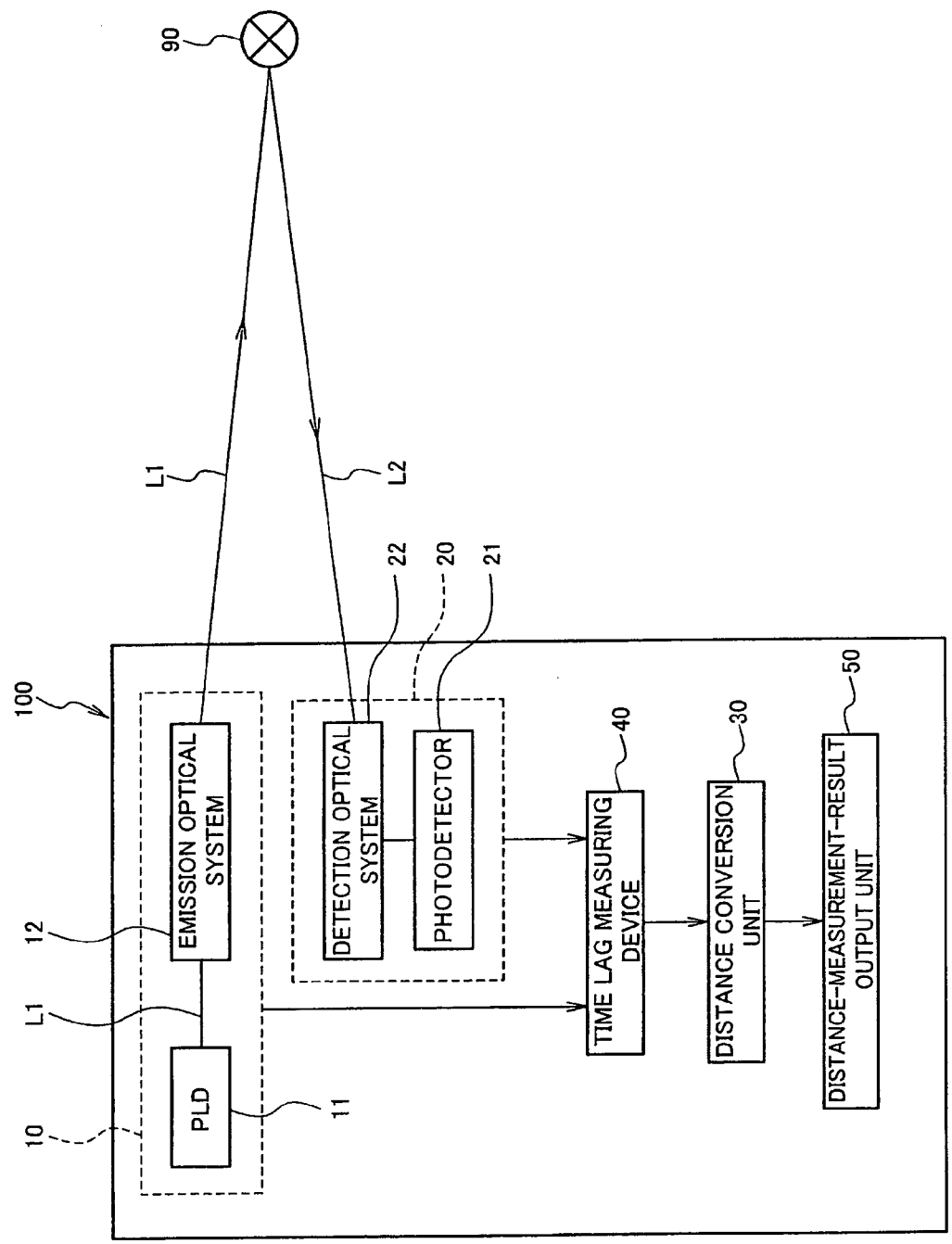
FIG. 1 is a block diagram showing a survey instrument including a time lag measuring device according to one embodiment of the present invention.

DESCRIPTION OF REFERENCE NUMERALS 10 measuring beam emission unit (measurement-pulse-wave emission unit)
11 PLD (light source)
20 reflected laser beam detection unit (reflected-pulse-wave detection unit)
21 photodetector
30 distance conversion unit
40 time lag measuring device
41 reference signal generating section
42 amplitude detecting section
43 phase difference detecting section
44 time lag calculating section
45 approximate-time-lag detecting section
46 correcting section
46a mode switching part
46b sampling timing forming part
46c correction data generating part
46d correction data storing part
46e correction data calculating part
50 distance-measurement-result output unit
90 object of distance measurement
100 survey instrument (distance measuring apparatus)
L1 laser beam
L2 reflected laser beam
M1 start signal (first pulse signal)
M2 stop signal (second pulse signal)
N correction pulse signal
S1, S2 reference signal A11, A12, A21, A22 amplitude value

BEST MODE FOR CARRYING OUT THE INVENTION

Hereinafter, by referring to the drawings, a most preferred embodiment will be described for a time lag measuring device, a distance measuring apparatus and a distance measuring method according to the present invention. FIG. 1 is a diagram showing a configuration of a survey instrument 100 that is an embodiment of the distance measuring apparatus according to the present invention, including the time lag measuring device of the present invention as one component.

Embodiment 1

The illustrated survey instrument 100 has a configuration including: a measuring beam emission unit 10 (measurement-pulse-wave emission unit) that emits a pulsed laser beam L1 (measuring pulse wave) to an object of distance measurement (hereinafter, called a distance-measuring object) 90; a reflected laser beam detection unit 20 (reflected-pulse-wave detection unit) that detects a reflected laser beam L2 (reflected pulse wave) obtained by reflecting the laser beam L1 by the distance-measuring object 90; a time lag measuring device 40 that outputs a pulsed start signal M1 (first pulse signal) at an emission timing of the laser beam L1 from the measuring beam emission unit 10, outputs a pulsed stop signal M2 (second pulse signal) at a detection timing of the reflected laser beam L2 by the reflected laser beam detection unit 20, and then measures a time lag Δt between the output timing of the start signal M1 and the output timing of the stop signal M2; a distance conversion unit 30 (distance calculation unit) that obtains a distance to the distance-measuring object 90 according to the time lag Δt obtained by the time lag measuring device 40; and a distance-measurement-result output unit 50 that visually outputs this distance measurement result.

Here, the measuring beam emission unit 10 has a configuration including: a semiconductor laser (PLD) 11 that is a light source for emitting the pulsed laser beam L1; and an emission optical system 12 including a lens and the like for guiding the laser beam L1 emitted from the PLD 11, to the distance-measuring object 90. The laser beam L1 emitted from the PLD 11 is a pulsed laser beam having a relatively large peak power, and has a duty ratio on the order of 0.01%.

The reflected laser beam detection unit 20 includes a photodetector 21 for detecting the reflected laser beam L2, and a detection optical system 22 for guiding the reflected laser beam L2 from the distance-measuring object 90, to the photodetector 21. Note that the photodetector 21 may be an element capable of detecting the pulsed reflected laser beam L2, and that an avalanche photodiode (APD), for example, or the like is used as the photodetector 21.

The time lag measuring device 40 measures an output time lag Δt between two pulse signals M1, M2 outputted internally at the detection timing of the laser beam L1 and the detection timing of the reflected laser beam L2.

Figure 2:
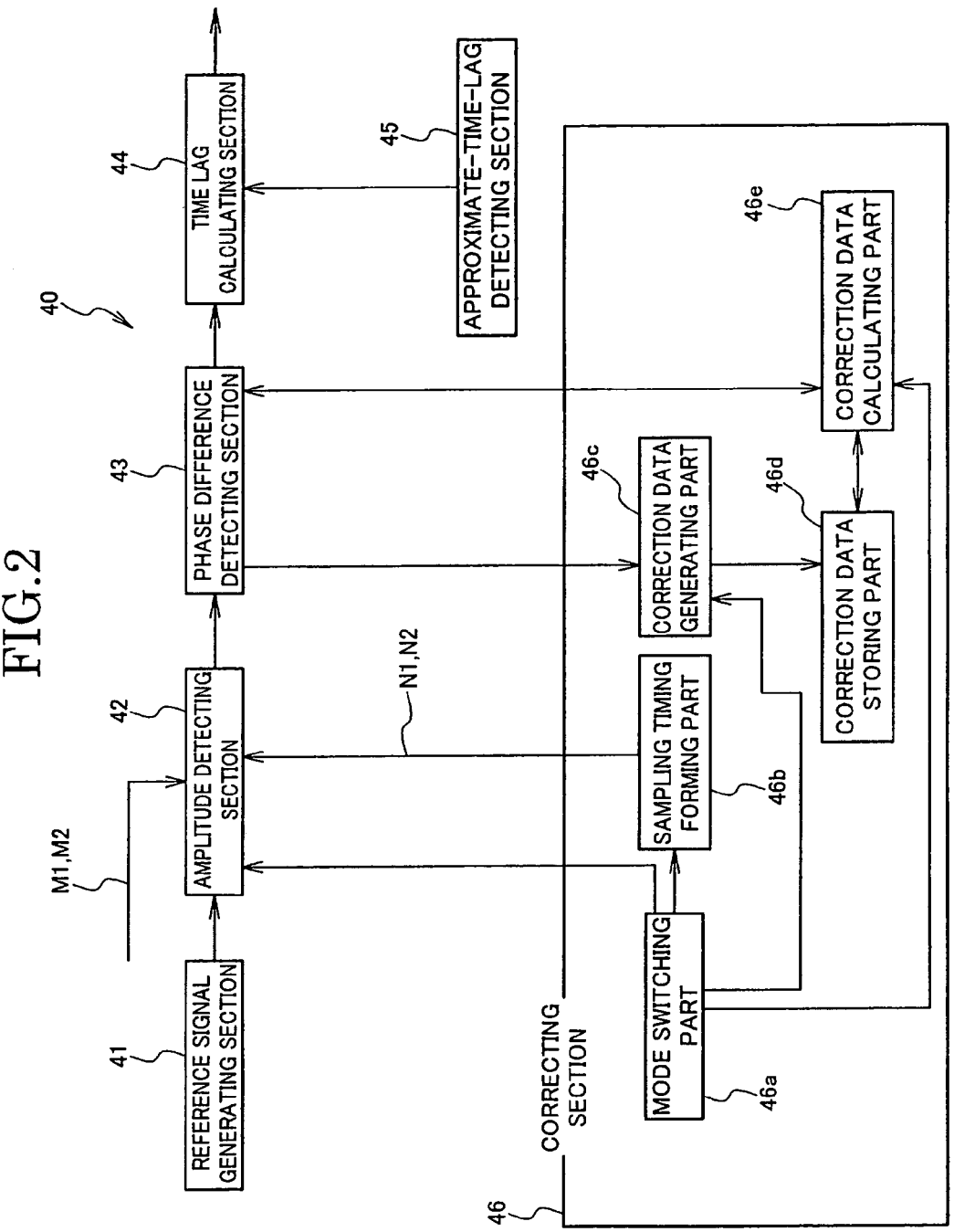
FIG. 2 is a block diagram showing the time lag measuring device in the survey instrument in FIG. 1.

This time lag measuring device 40 is according to an embodiment of the time lag measuring device of the present invention, and includes, as shown in FIG. 2: a reference signal generating section 41 (reference signal generating section) that generates two reference signals S1, S2 having a phase difference of π/2 [rad] therebetween; an amplitude detecting section 42 (amplitude detecting section) that detects the amplitudes A11 (the amplitude of the reference signal S1 at a generation timing of a start signal M1), A12 (the amplitude of the reference signal S2 at the generation timing of the start signal M1), A21 (the amplitude of the reference signal S1 at a generation timing of a stop signal M2), A22 (the amplitude of the reference signal S2 at the generation timing of the stop signal M2) of the two reference signals S1, S2 at each of the generation timings of the two pulse signals M1, M2; a phase difference detecting section 43 (phase difference detecting section) that calculates, on the basis of the obtained amplitudes A11, A12, A21, A22, a phase difference Δ_ in the reference signal S1 (or the reference signal S2) between the generation times of the two pulse signals M1, M2; a correcting section 46 (correcting section) that corrects an error in the phase difference Δ_ detected by the phase difference detecting section 43, the error attributed to an error between the two reference signals S1, S2, or an error in at least one of the reference signals S1, S2; an approximate-time-lag detecting section 45 (approximate-time-lag detecting section) that detects an approximate time lag ta between the generation timings of the two pulse signals M1, M2; and a time lag calculating section 44 (time lag calculating section) that calculates a generation time lag Δt between the start signal M1 and the stop signal M2, on the basis of the phase difference Δ_ corrected by the correcting section 46, the cycle Ts of the reference signals S1, S2, and the approximate time lag ta detected by the approximate-time-lag detecting section 45.

Then, the correcting section 46 includes: a sampling timing forming part 46b (sampling timing forming part) that generates correction pulse signals N1, N2 which imitate the pulse signals M1, M2 (measurement pulse signals) to be measured, and which have a time lag ΔT between the generation timings, the time lag ΔT being an equal interval; a mode switching part 46a (mode switching part) that switches between an actual measurement mode in which the measurement pulse signals M1, M2 are inputted, and a correction mode in which the correction pulse signals N1, N2 are inputted; a correction data generating part 46c (correction data generating part) that generates correction data for correcting an error according to a relationship between the known time lag ΔT and a phase difference Δ_ between the generation timings of the correction pulse signals N1, N2, the phase difference Δ_ calculated by the phase difference detecting section 43 in response to input of the correction pulse signals N1, N2 in the correction mode; a correction data storing part 46d that stores therein the correction data generated by the correction data generating part 46c; and a correction calculating part 46e (correction calculating part) that performs a correction calculating processing using the correction data stored in the correction data storing part 46d to correct the phase difference Δ_ corresponding to the time lag Δt between the generation timings of the measurement pulse signals M1, M2 obtained in the actual measurement mode.

Here, as the above two reference signals S1, S2 in this embodiment, employed are, for example, a reference signal S1 of a sine wave (A0 sin_; A0 denotes the value of the maximum amplitude) shown in FIG. 3A, and a reference signal S2 of the cosine wave (A0cos_) having a phase difference of π/2 from this sine wave reference signal S1. However, the reference signals S1, S2 are not limited to the combination of these sinusoidal and cosine wave signals, but may be any combination of other signals as long as they are two signals of a periodic function with a relationship having a phase difference of π/2 therebetween.

Moreover, the approximate-time-lag detecting section 45 may be capable of detecting a time with a resolution on the order of one cycle Ts of the reference signals S1 and S2. For example, it is possible to employ one detecting an approximate time lag ta (=Pc_Ts) by counting the number of pulses Pc in the reference signal S1 or S2 with a widely-known pulse counter or the like.

The distance-measurement-result output unit 50 may be a display device, such as a monitor for display output, or may be a printer for print output, as long as it visually outputs the distance measurement result.

Here, by referring to FIG. 3, general description will be given for the principle of an operation in which the time lag measuring device 40 calculates the generation time lag Δt between the start signal M1 and the stop signal M2.

Figure 3A:
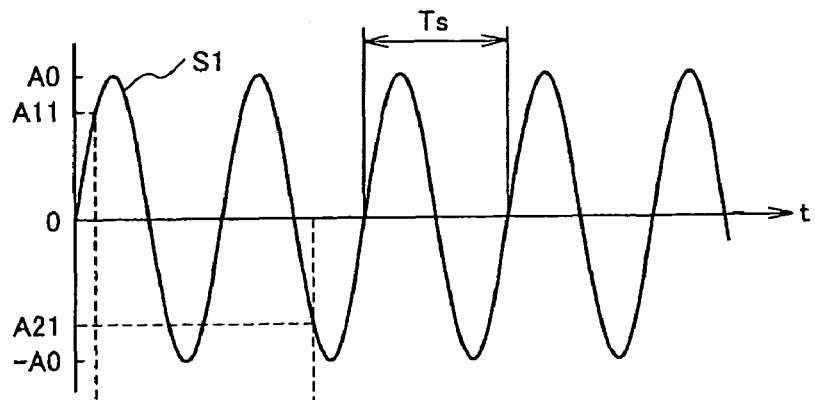
FIG. 3A is a diagram showing a sine wave representing a reference signal S1.
Figure 3B:
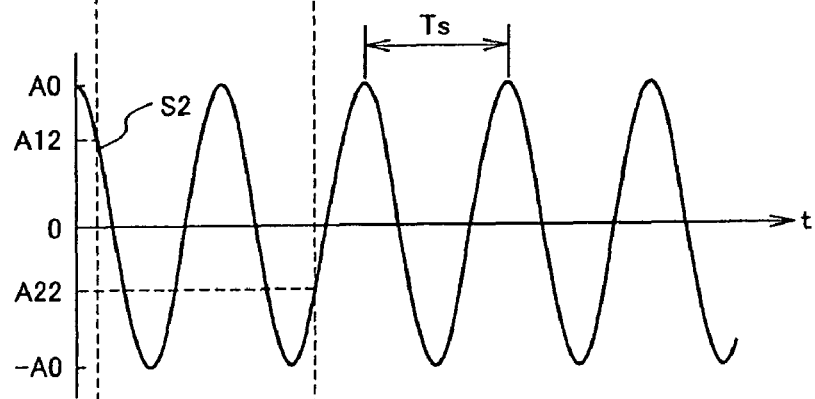
FIG. 3B is a diagram showing a cosine wave representing a reference signal S2.

Firstly, the reference signal generating section 41 of the time lag measuring device 40 generates the sinusoidal signal S1 shown in FIG. 3A and the cosine wave signal S2 shown in FIG. 3B.

Figure 3C:
FIG. 3C is a diagram showing a start signal M1 and a stop signal M2.

Next, the time lag measuring device 40 generates the start signal M1 shown in FIG. 3C at the emission timing of the laser beam L1 by the PLD 11. The amplitude detecting section 42 samples and holds both of the reference signals S1, S2 in response to this start signal M1, and detects the amplitude values A11, A12 of the respective reference signals S1, S2 obtained by the sample-hold operation.

Figure 3D:
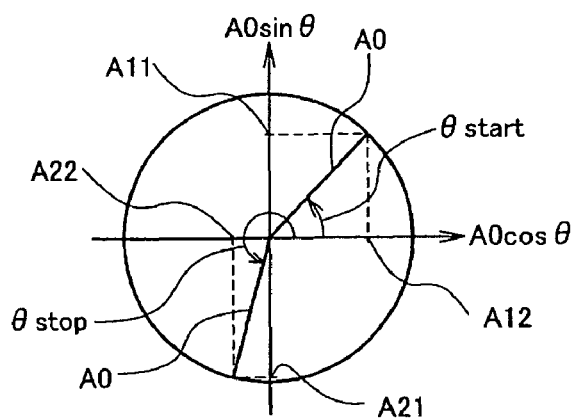
FIG. 3D is a diagram showing the principle of obtaining a phase difference on the basis of sampling values of the reference signals M1, M2 in response to the start signal M1, and sampling values of the reference signals M1, M2 in response to the stop signal M2.

Subsequently, the phase difference detecting section 43 obtains the phase _start of the detected amplitude values A11, A12, after the generation of the reference signals. Specifically, as shown in FIG. 3D, the amplitude values A11, A12 are expressed as:

$$A11 = A0 \sin\_start \quad (1)$$

$$A12 = A0 \cos\_start \quad (2)$$

by use of the phase _start after the generation of the reference signals. Since $$A11/A12 = \tan\_start \quad (3),$$

the phase difference detecting section 43 calculates the phase _start of the reference signals S1, S2 at the generation timing of the start signal M1, from $$\_start = \tan^{-1}(A11/A12) \quad (4),$$

and causes an unillustrated memory area to temporarily memorize this.

On the other hand, the time lag measuring device 40 generates the stop signal M2 shown in FIG. 3C at the detection timing of the reflected laser beam L2 by the photodetector 21. The amplitude detecting section 42 samples and holds both of the reference signals S1, S2 in response to this stop signal M2, and detects the amplitude values A21, A22 of the respective reference signals S1, S2 obtained by the sample-hold operation.

Subsequently, the phase difference detecting section 43 obtains the phase θstop of the detected amplitude values A21, A22 after the generation of the reference signals. Specifically, as shown in FIG. 3D, the amplitude values A21, A22 are expressed as:

$$A21 = A0 \sin\theta stop \quad (5)$$

$$A22 = A0 \cos\theta stop \quad (6)$$

by use of the phase θstop after the generation of the reference signals. Since $$A21/A22 = \tan\theta stop \quad (7),$$

the phase difference detecting section 43 calculates the phase θstop of the reference signals S1, S2 at the generation timing of the stop signal M2, from $$\theta stop = \tan^{-1}(A21/A22) \quad (8),$$

and causes the unillustrated memory area to temporarily memorize this.

Then, the phase difference detecting section 43 reads the two phases _start, _stop stored in the memory area, and calculates the phase difference Δ_ between the phases of the reference signals S1, S2 corresponding to a time period between the generation timing of the start signal M1 and the generation timing of the stop signal M2, by use of $$\Delta\_ = \_stop - \_start \quad (9).$$

Here, when the time lag Δt between the two pulse signals M1, M2 is shorter than 1 cycle Ts of the reference signals S1, S2, the time lag Δt between the two pulse signals M1, M2 can be calculated on the basis of the foregoing phase difference Δ_ and the cycle Ts, from $$\Delta t = (\Delta\_/2\pi)Ts \quad (10).$$

The phase difference Δ_ calculated from the equation (9) by the phase difference detecting section 43 takes a value within a range of 0 [rad] to 2π [rad]. However, since the reference signals S1, S2 are periodic signals, the calculated phase difference Δ_ potentially includes 2π+Δ_, 4π+Δ_, ... in addition to Δ_ that is less than 2π [rad]. Thus, the phase difference Δ_ can be expressed as a general expression 2π(n−1)+Δ_ (n; natural number).

On the other hand, for the time lag Δt between the two pulse signals M1, M2 to be calculated, the first item in the above general expression also has to be converted, and thereby the natural number n needs to be specified.

For this reason, even when the time lag Δt between the two pulse signals M1, M2 exceeds 1 cycle (2π [rad]) of the reference signals S1, S2, the approximate-time-lag detecting section 45 detects an approximate value of this time lag Δt with a resolution on the order of 1 cycle of these reference signals S1, S2.

Then, by referring to the approximate time lag ta detected by the approximate-time-lag detecting section 45, the time lag calculating section 44 selects, as the time lag Δt to be obtained, the time lag closest to the approximate time lag ta among the time lags Δt (=(Δ_/2π)Ts) calculated from an equation (10) corresponding to the phase differences Δ_ (={Δ_, 2π+Δ_, 4π+Δ_, ..., 2π(n−1)+Δ_, ...}) detected by the phase difference detecting section 43.

The distance conversion unit 30 performs a time-to-distance conversion processing on the time lag Δt thus obtained by the time lag measuring device 40, and thereby obtains the distance to the distance-measuring object 90 corresponding to the time lag Δt. The obtained distance is visually outputted for display or printed out by the distance-measurement-result output unit 50.

Figure 9:
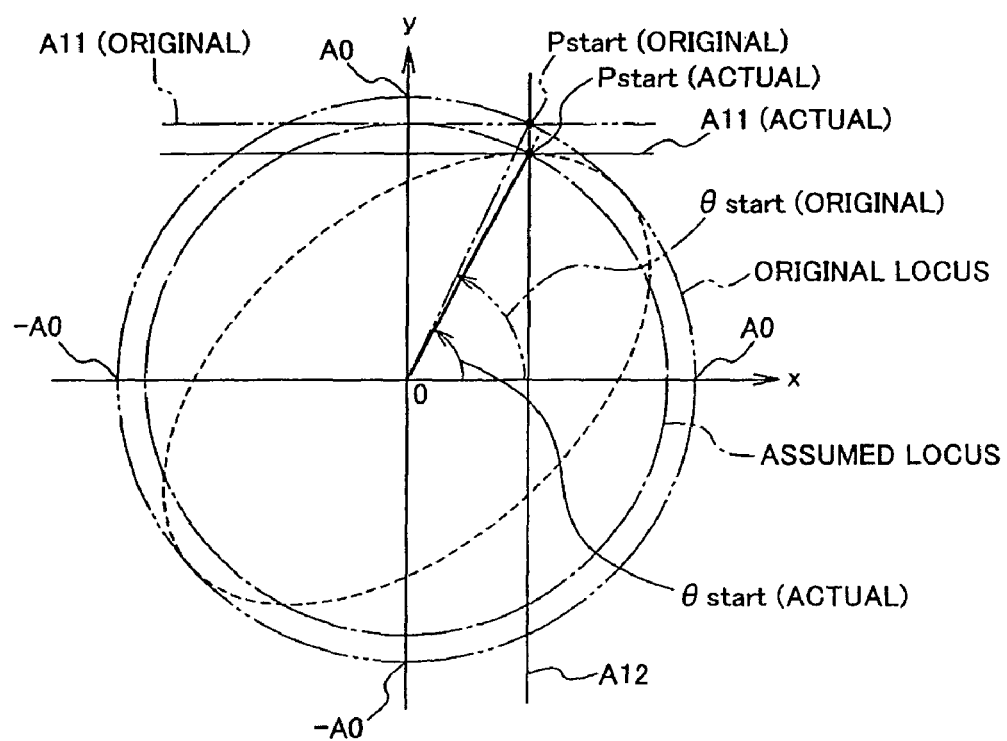
FIG. 9 is a diagram showing a state where the locus of sampling values forms an oval curved line.

The above describes the basic principle of measuring the time lag Δt by the distance measuring apparatus 100 and the time lag measuring device 40 according to this embodiment. However, due to an individual difference, age deterioration and the like, the actual time lag measuring device 40 does not always strictly maintain the two reference signals S1, S2 as having the maximum amplitudes completely equal to each other at A0, and having the phase difference of π/2 [rad]. For this reason, there is a case where a slight difference (error) between the maximum amplitudes occurs, or where the phase difference is slightly deviated from π/2 [rad]. In the case of the reference signals S1, S2 having such an error, the intersection (x, y)=(A11, A12) of the amplitude values A11, A12, which is to be originally on the circumference of the perfect circle {(x, y)|x=A0 cos _, y=A0 sin _} shown in FIG. 3D, is on a position away from this circumference, for example, is on the oval curved line shown by the dashed line in FIG. 9.

Then, if the phase difference Δ_ is calculated on the assumption that the intersection (x, y) exists on the outer periphery (circumference) of the perfect circle even though the intersection actually is on such an oval curved line (the outer periphery of an oval), an error occurs in the phase difference Δ_.

Figure 10A:
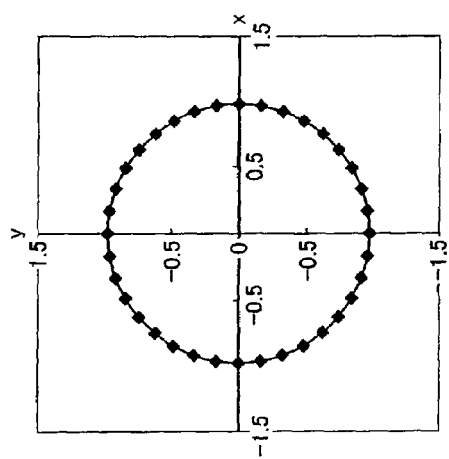
FIG. 10A is a diagram equivalent to the diagram in FIG. 3D in a case where there is no error.
Figure 10B:
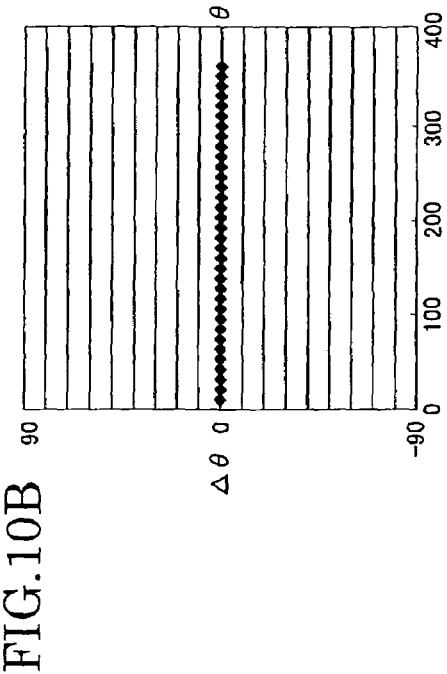
FIG. 10B is a diagram showing an error in the phase difference in the case of FIG. 10A.

Specifically, in the case of the original locus (x, y)=(cos_, sin_) allowing the intersection to exist on the circumference of the perfect circle shown in FIG. 10A, an error amount in the phase difference Δ_ is always 0 with respect to the phase _ (0≦_≦2π [rad] (360°)) about the original point (0, 0).

Figure 10C:
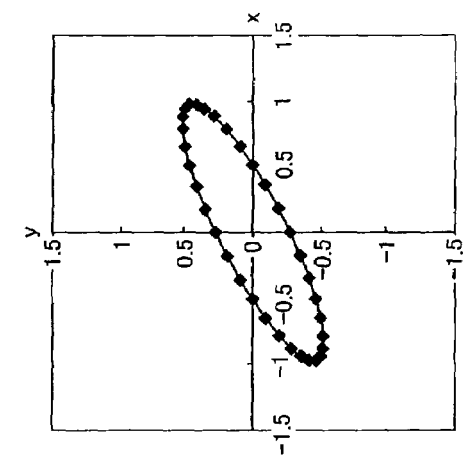
FIG. 10C is a diagram equivalent to the diagram in FIG. 3D in a case where there is an error.
Figure 10D:
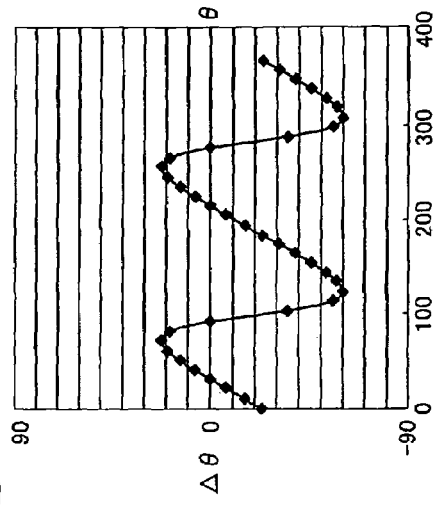
FIG. 10D is a diagram showing an error in the phase difference in the case of FIG. 10C.

On the other hand, in the case of the locus (x, y)=(cos_, 0.5 sin (_+60°)) (the reference signal S2 has errors in which the maximum amplitude is ½, and in which the phase delays by 60°) causing the intersection to be on the circumference of an oval shown in FIG. 10C, an error amount in the phase difference Δ_ with respect to the phase _ (0≦_≦2π [rad] (=360°)) about the original point (0, 0) shows a cyclically varying values that differ according to the phase _.

Then, the aforementioned correcting section 46 corrects such an error. The correcting sections 46 corrects the actual curved locus of the oval shown by the dashed line in FIG. 9, to the circumference of the perfect circle shown by the alternate long and two short dashes line. Firstly, a function representing the obtained oval curved line is obtained by fitting.

Figure 11:
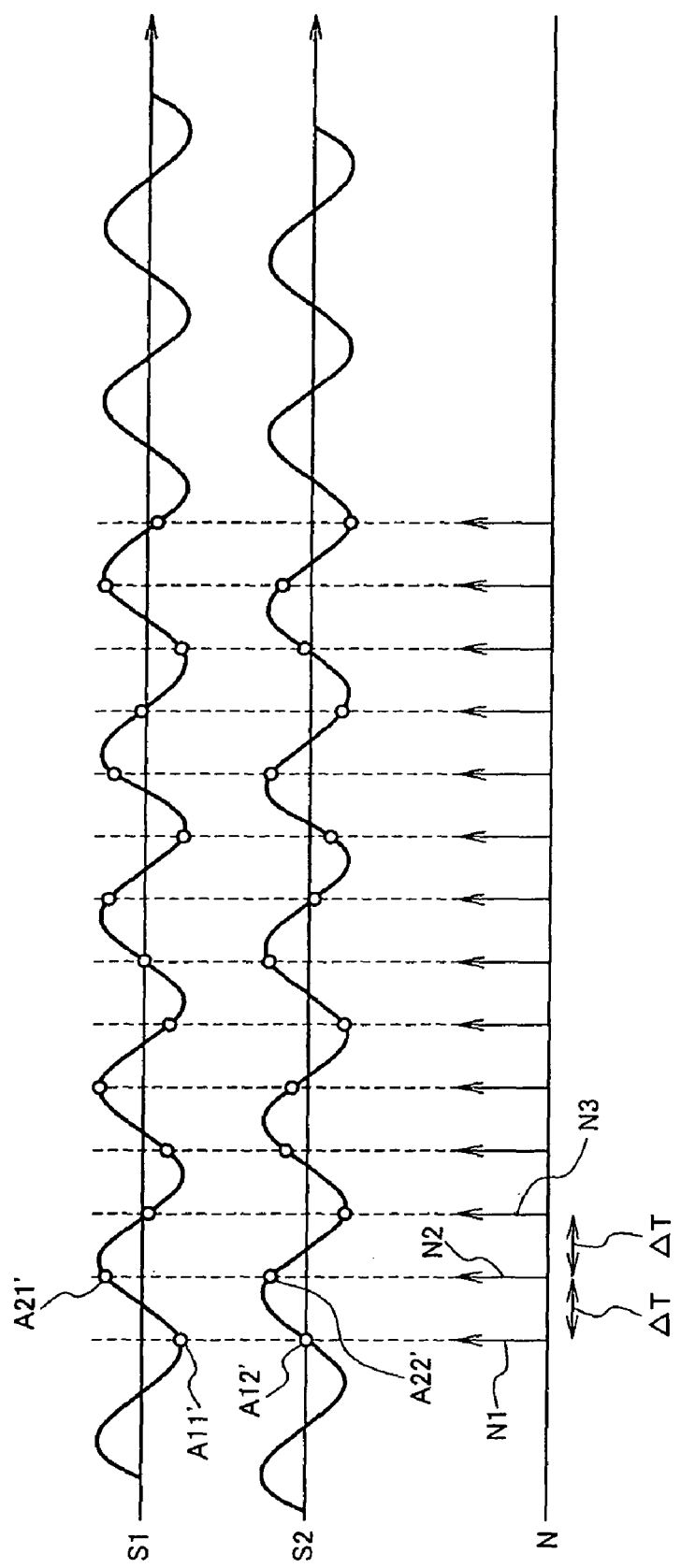
FIG. 11 is a diagram showing a relation between the reference signals and correction pulse signals.

More precisely, before the measurement pulse signals M1, M2 are detected as measuring objects having an unknown generation time lag, the reference signals S1, S2 are sampled at timings of the correction pulse signals N1, N2, . . . as shown in FIG. 11, by use of the correction pulse signals N1, N2, . . . having an equal generation time lag ΔT and imitating the measurement pulse signals M1, M2. Thereby, sets of amplitudes (A11', A12'), (A21', A22'), . . . are obtained. According to these sets of amplitudes (A11', A12'), (A21', A22'), . . . , specified is a relationship between the phase difference Δ_ between the correction pulse signals N1, N2, . . . and the generation time lag ΔT (the equal time interval; constant) between the correction pulse signals N1, N2, . . . .

Here, the correcting section 46 will be described in more detail. In the correcting section 46: the mode switching part 46a switches from the actual measurement mode for measuring the measurement pulse signals M1, M2, to the correction mode for measuring the correction pulse signals N1, N2, . . . ; the sampling timing forming part 46b generates a large number of correction pulse signals N1, N2, . . . at equal time intervals of a cycle ΔT while shifting the phases of the correction pulse signals N1, N2, . . . relative to the reference signals S1, S2; and, as shown in FIG. 11, the amplitude detecting section 42 samples the reference signals S1, S2, at each of the generation timings of the correction pulse signals N, and obtains the sets of amplitudes (A11', A12'), (A21', A22'), . . . of the reference signals S1, S2 at the respective generation timings.

Figure 12:
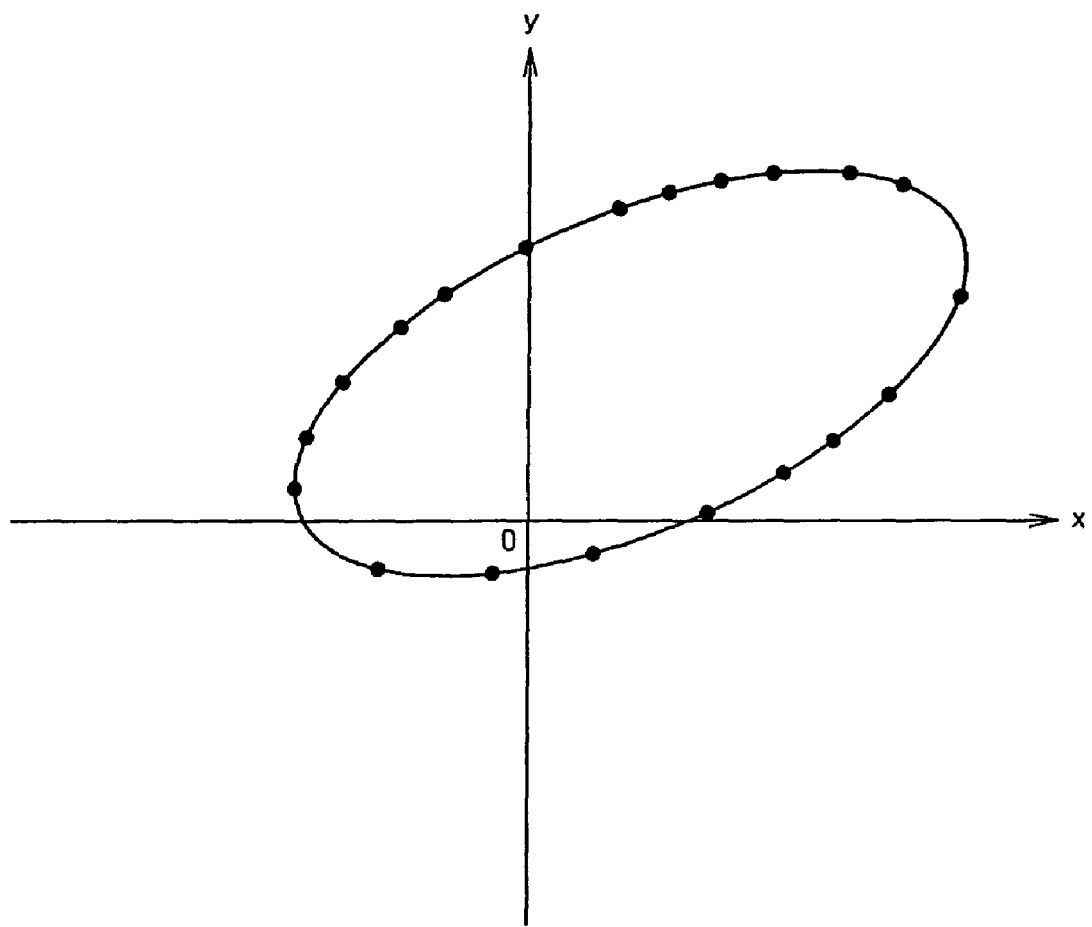
FIG. 12 is a diagram showing an oval curved line formed by a locus of sampling values.

When the intersections of these sets of amplitudes (x, y)= (A12', A11'), (A22', A21'), . . . are sequentially connected to each other, the intersections form an oval curved line as shown in FIG. 12. Then, the phase difference detecting section 43 obtains a phase _ at each of these intersections, i.e., a phase _ at each timing, and a difference Δ_ between the phases _ at the generation timings adjacent to each other in time series, and then outputs those obtained to the correction data generating part 46c.

According to relationships between these phases _ or the phase differences Δ_ and the equal time lag ΔT, the correction data generating part 46c generates correction data for correcting an error in the reference signals S1, S2. The generated correction data is stored in the correction data storing part 46d, and then the mode switching part 46a switches the mode from the correction mode to the actual measurement mode. In this actual measurement mode, the correction calculating part 46e corrects the difference Δ_ by using the correction data stored in the correction data storing part 46d, the difference Δ_ being obtained by the phase difference detecting section 43 in the measurement of the measurement pulse signals M1, M2.

The process for generating the correction data by the correction data generating part 46c will be described below in detail. First, one of the generating methods is based on the relationship between the oval curved line shown in FIG. 12 and the circumference of the perfect circle to be originally drawn, and is implemented by specifying the oval curved line as a function.

Figure 13A:
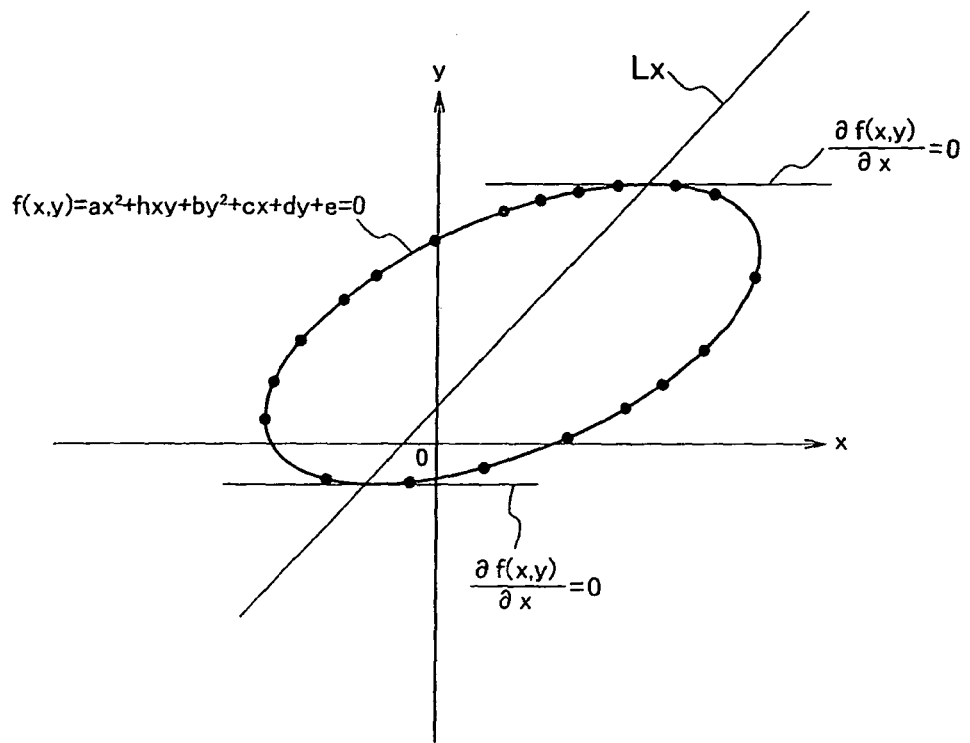
FIG. 13A is a diagram in which two tangent lines parallel to the X axis and a straight line Lx connecting two contact points are drawn in order to identify the oval shape.

A function for the oval curved line shown in FIG. 12 is set as the following equation:

$$f(x, y) = ax^2 + hxy + by^2 + cx + dy + e = 0 \quad (11),$$

and each coefficient is found. First, two tangent lines (∂f(x, y)/∂x=0) parallel to the x axis are obtained as shown in FIG. 13A, and the intersections of these tangent lines with the curved line f(x, y) are obtained. Thereafter, the straight line Lx connecting the two intersections is obtained.

Here, the straight line Lx is $$\partial f(x, y)/\partial x = 2ax + hy + c = 0 \quad (12).$$

Figure 13B:
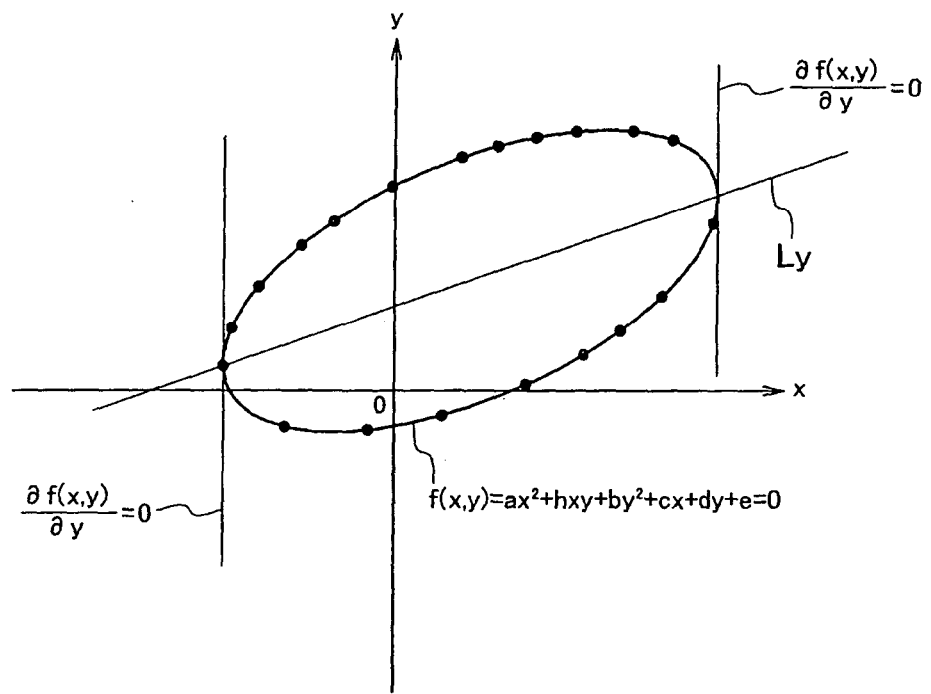
FIG. 13B is a diagram in which two tangent lines parallel to the y axis and a straight line Lx connecting two contact points are drawn in order to identify the oval shape.

Similarly, as shown in FIG. 13B, two tangent lines (∂f(x, y)/∂y=0) parallel to the y axis are obtained as shown in FIG. 13B, and the intersections of these tangent lines with the curved line f(x, y) are obtained. Thereafter, the straight line Ly connecting the two intersections is obtained.

Here, the straight line Ly is $$\partial f(x, y)/\partial y = hx + 2by + d = 0 \quad (13).$$

Next, the intersections of these straight lines Lx, Ly are obtained. These intersections are the solutions of the simultaneous equations (12) and (13). The simultaneous equations have a solution:

$$(x, y) = (\_, \_) \quad (15),$$

where $$h^2 - 4ab \neq 0 \quad (14).$$

Figure 14A:
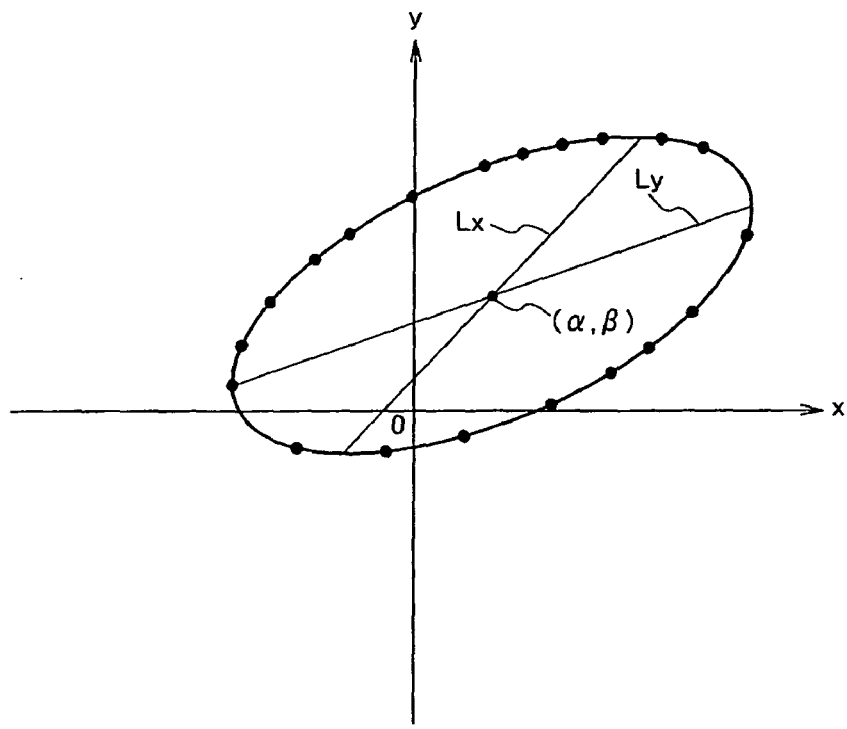
FIG. 14A is a diagram showing an intersection (_, _) of the two straight lines Lx and Ly.
Figure 14B:
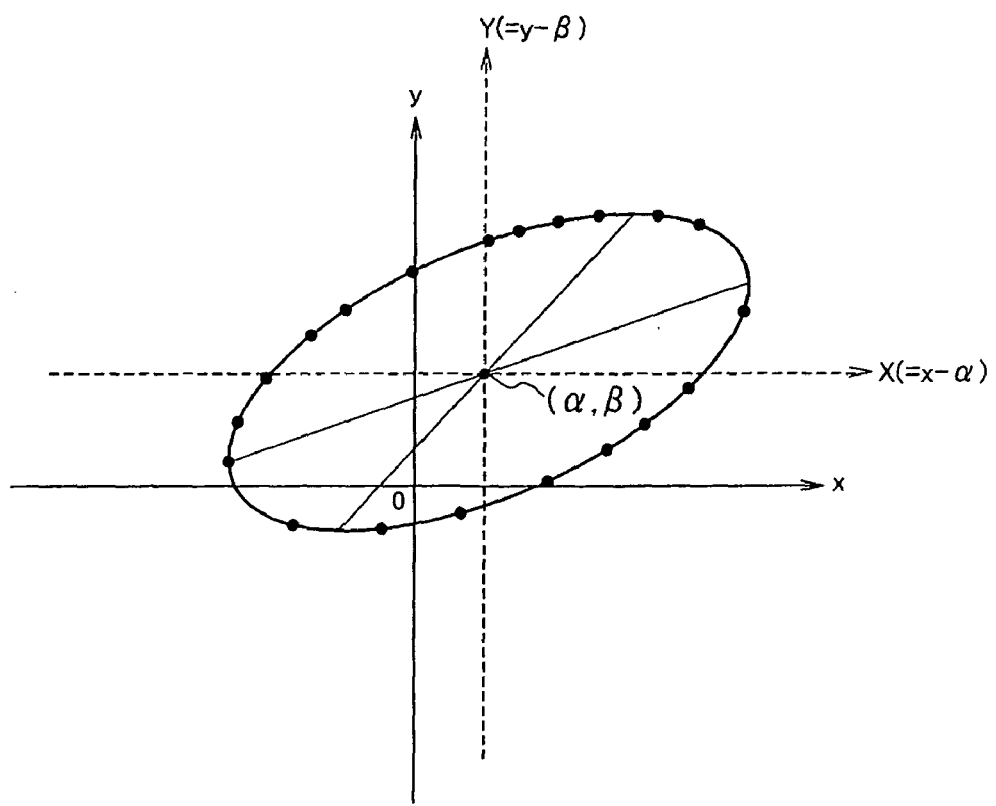
FIG. 14B is a diagram showing an XY coordinate system having the intersection (_, _) as the original point (0, 0).

At this time, the solution shown by the equation (15) is the center of the oval curved line (see FIG. 14).

Subsequently, an xy coordinate system is converted into an XY coordinate system so that the position of the intersection shown by the equation (15) can be the original point O (0, 0) (FIG. 14). At this time, f(x, y) shown by the equation (11) in the xy coordinate system is expressed as $$f(X, Y) = aX^2 + hXY + bY^2 + k = 0 \quad (16)$$

Figure 15:
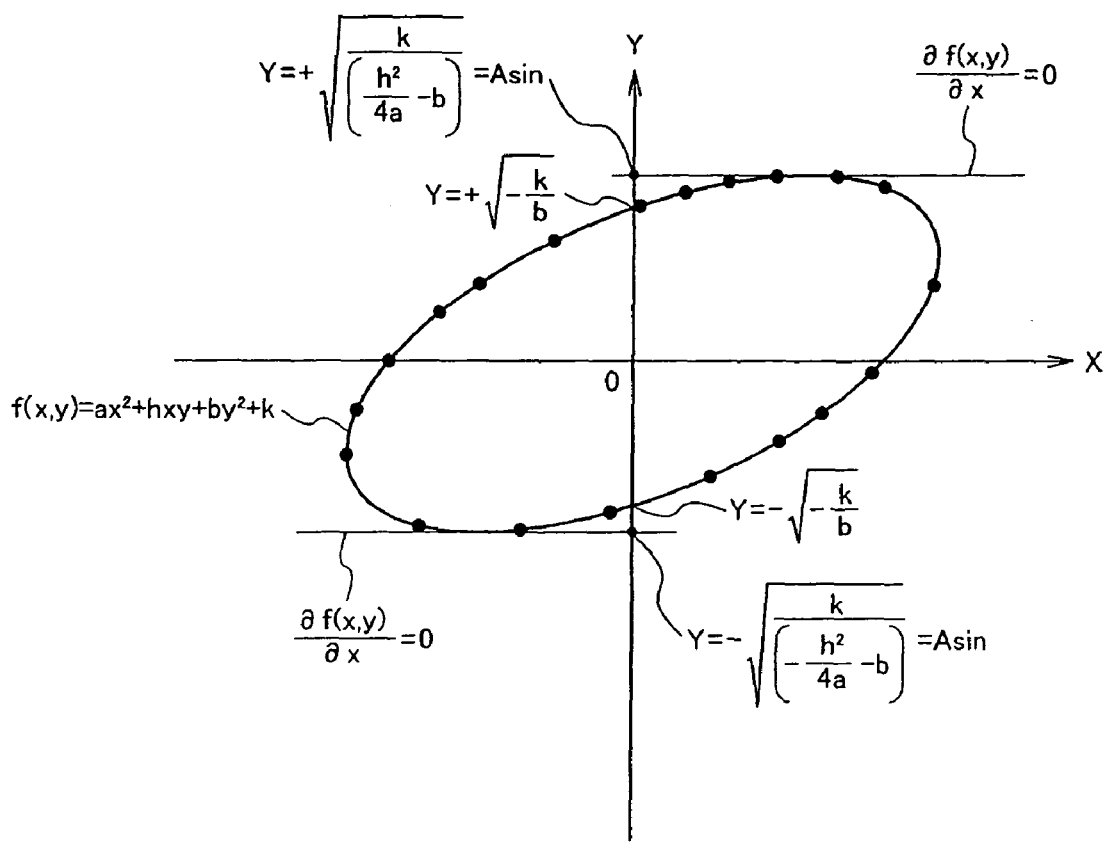
FIG. 15 is a diagram (third) explaining an operation for identifying the oval curved line shown in FIG. 12.

(where k=f(_, _)) in the XY coordinate system, and the oval curved line f(X, Y) is expressed as shown in FIG. 15.

Here, the maximum amplitude of the reference signal S1 is obtained. Precisely, the equation (16) is partially differentiated with respect to X, and a value X is $$X = -(h/2a)Y \quad (18)$$

obtained from $$\partial f(X, Y)/\partial x = 2aX + hY = 0 \quad (17),$$

where the partial differential value ∂f(X, Y)/∂X is 0. Accordingly, the maximum amplitude Ymax (=$A_{sin}$) is derived as $$Y\max = \pm\{k/(h^2/(4a) - b)\}^{1/2} \quad (19)$$

by substituting the equation (18) into the equation (16).

On the other hand, for the phase difference between the reference signals S1 and S2, the amplitude of the sinusoidal signal (the Y tangent side where the oval curved line is in contact with the Y axis in FIG. 15) when X=0 (the cosine wave signal as the reference signal S2 is 0) is obtained from the equation (16), and then the phase difference between the reference signals S1 and S2 can be obtained on the basis of a ratio between the obtained amplitude and the maximum amplitude value (equation (19)) of the sinusoidal signal as the reference signal S1.

Specifically, the Y tangent side is obtained from $$f(X, Y) = bY^2 + k = 0 \quad (20),\text{ as}$$

$$Y_{X=0} = \pm(-k/b)^{1/2} \quad (21).$$

Accordingly, the phase difference $\_{sin}$ (=$\_$) from the cosine wave signal S2 is obtained as $$\_{sin} = \sin^{-1}\{(-k/b)^{1/2}/(k/(h^2/4a-b))^{1/2}\} \quad (22).$$

Here, since the sinusoidal signal S1 and the cosine wave signal S2 are signals physically having a phase difference of 90[°] (=π/2 [rad]), the phase difference $\Delta\_{sin}$ expressed as $$\Delta\_{sin} = \pi/2 - \_{sin} \quad (23)$$

indicates a variation from the phase difference of π/2 between the two reference signals S1, S2.

Figure 16:
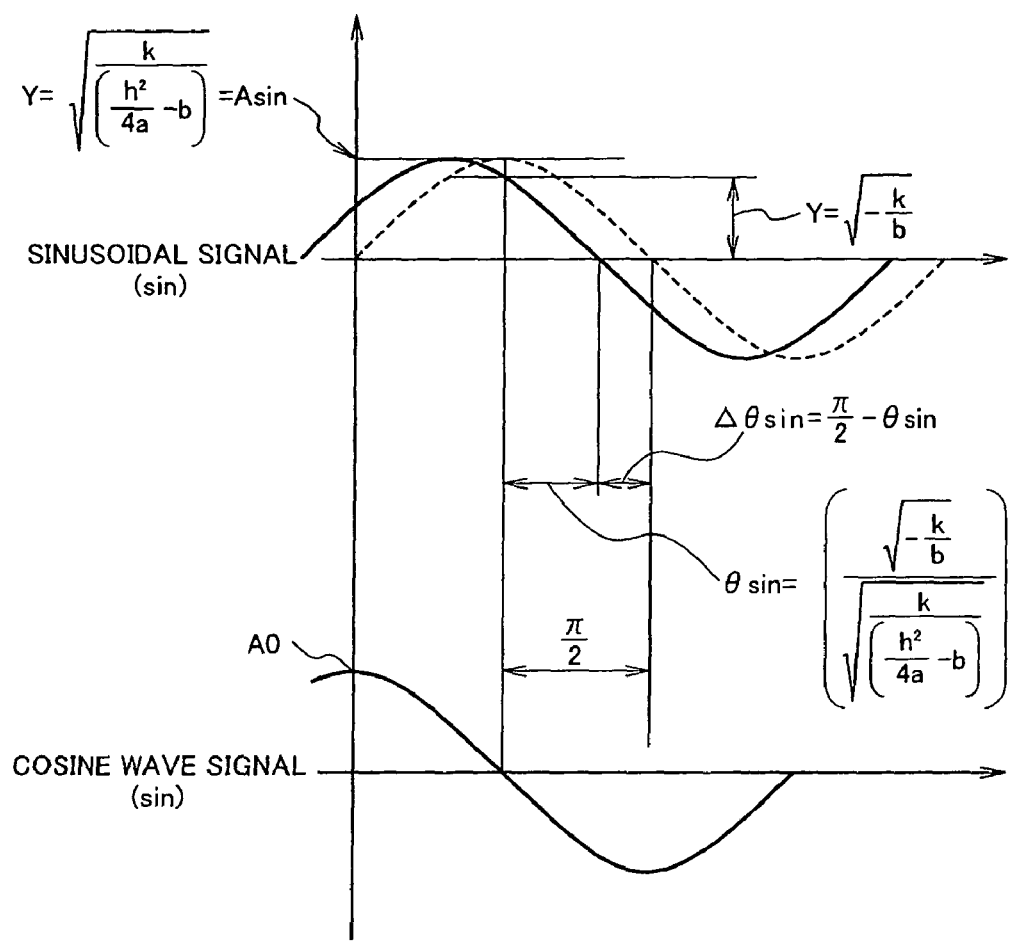
FIG. 16 is a diagram explaining the principle for making a correction based on the waveforms of the reference signals.

The above relation indicates, as shown in FIG. 16, a state where the maximum amplitude of the sinusoidal signal S1 is a value different from originally-set A0 (equation (19)), and where the phase difference of the sinusoidal signal S1 from the cosine wave signal S2 varies from originally-set π/2 (equation (22)). Thus, the relation is obtained by quantifying an error such as this variation or the like, and is stored as the correction data in the correction data storing part 46d.

In addition, though the description is omitted, as in the case where the maximum amplitude of the sinusoidal signal S1 is found from the equations (17) to (19), the maximum amplitude of the cosine wave signal S2 can be a value different from originally-set A0. Accordingly, the maximum amplitude $X_{max}$ (=$A_{cos}$) is obtained in such a way that: the equation (16) is partially differentiated with respect to Y; the value Y where the partial differential value ∂f(X, Y)/∂Y is 0 (zero) is obtained; and the obtained value Y is substituted into the equation (16).

Moreover, when the sinusoidal signal S1 and the cosine wave signal S2 are plotted with the vertical axis assigned the amplitude obtained by sampling these two signals at timings of the correction pulse signals N and with the horizontal axis assigned the sampling intervals, the amplitude of the sinusoidal signal S1 and the amplitude of the cosine wave signal S2 should exist on the sine wave and the cosine wave, respectively. For those, such as points f3 and f4, varying from the sine wave and the cosine wave, each of the variations may be corrected by shifting the point f3 or f4 to the intersection f3' or f4' of the sine wave or the cosine wave, and the straight line passing through the point f3 or f4 and extending in an amplitude direction.

When the generation time interval ΔT for the correction pulse signals N is set to be an equal time interval, there is an applicable method other than the aforementioned method of controlling variations in the amplitude detection step. In this method, for example, the phases are calculated by the phase difference detecting section 43 on the basis of the amplitude detected by use of the correction pulse signals, and are summed up over time. Thereby, as shown in FIG. 18, the calculated cumulative phases are plotted with the horizontal axis assigned the elapsed time T and with the vertical axis assigned the cumulative phase. Here, the plot intervals in a horizontal axis direction should be equal intervals (time intervals ΔT), and the plot intervals in a vertical direction should also be equal intervals by nature. For this reason, the plot is approximated by a linear expression (the slope is constant) as shown by the dashed line in the drawing.

The variation from this linear expression indicates an error varying from a real value, the error including both the amplitude difference between the reference signals S1, S2 and the variation from the phase difference π/2. The correction data can be obtained from this value.

As described above, the correcting section 46 of the time lag measuring device 40 in this embodiment includes: the sampling timing forming part 46b (sampling timing forming part) that generates the correction pulse signals N1, N2, ..., imitating the measurement pulse signals M1, M2 and having the equal time lags ΔT between the generation timings; the mode switching part 46a (mode switching part) that switches between the actual measurement mode in which the measurement pulse signals M1, M2 are inputted, and the correction mode in which the correction pulse signals N1, N2 are inputted; the correction data generating part 46c (correction data generating part) that generates the correction data for correcting an error according to a relationship between the equal time lag ΔT and each phase difference Δ\_ between the generation timings of the correction pulse signals N1, N2, the phase difference Δ\_ being calculated by the phase difference detecting section 43 in response to input of the correction pulse signals N1, N2 in the correction mode; the correction data storing part 46d that stores therein the correction data generated by the correction data generating part 46c; and the correction calculating part 46e (correction calculating part) that performs the correction calculating process using the correction data stored in the correction data storing part 46d to correct the phase difference Δ\_ corresponding to the time lag Δt between the generation timings of the measurement pulse signals M1, M2 obtained in the actual measurement mode.

Then, after being detected in the actual measurement mode and corrected by the correction calculating part 46e of the correcting section 46 according to the aforementioned operations, the phase difference Δ\_ corresponding to the generation time lag Δt between the two measurement pulse signals M1, M2 are inputted to the time lag calculating section 44. Then, on the basis of the corrected phase difference Δ\_ thus inputted, the time lag calculating section 44 calculates the time lag Δt corresponding to this phase difference.

After that, the time lag Δt measured by the time lag measuring device is inputted to the distance conversion unit 30 (see FIG. 1), and the distance conversion unit 30 calculates the distance D to the distance-measuring object 90 from the following equation (25) by using the inputted time lag Δt. Note that the constant c in the equation (25) denotes the speed of light [m/sec].

$$D = c\Delta t/2 \quad (25)$$

The thus measured distance D to the distance-measuring object 90 is outputted by the distance-measurement-result output unit 50, and a user of this survey instrument 100 can know the distance D.

Incidentally, the distance-measurement-result output unit 50 is a display device or the like for displaying, as numeric information, the distance D to the distance-measuring object 90 that is the distance measurement result, may display information on various settings and the like of this survey instrument 100 in addition to this distance D.

In this way, according to the time lag measuring device 40 and the survey instrument 100 in this embodiment, only measuring at once the reference signals S1, S2 at each of the generation timings of a signal set of the start signal M1 and the stop signal M2 allows the obtaining of an accurate generation time lag between the two signals M1, M2. Thus, the time required to measure the time lag and the distance can be reduced.

Moreover, for a phase difference detected by the phase difference detecting section 43, the correcting section 46 corrects an error included in the phase difference, the error attributed to an error between the two reference signals S1, S2 or an error in at least one of the reference signals S1, S2. Then, the time lag calculating section 44 obtains the generation time lag Δt by using this phase difference corrected by the correcting section 46. Accordingly, even when the reference signals S1, S2 have errors in the maximum amplitude and in the phase difference ($\pi/2$ [rad]) between the two reference signals S1, S2, the time lag between generation timings of the measurement pulse signals M1, M2 can be accurately measured.

In addition, the sinusoidal signal and the cosine wave signal having a phase difference of $\pi/2$ are employed as the reference signals S1, S2. For this reason, the phase _ can be found by calculating a ratio between the actually detected values (amplitude values) and then by calculating the arctan of the ratio. Moreover, the phase difference Δ_ can be detected from the phase difference between the two.

Since the temporal change amount of the phase calculated from the arctan is always constant, constant resolution and detection sensitivity can be obtained regardless of the generation timings of these two pulse signals for the reference signals.

Moreover, in the aforementioned embodiment, each of the reference signals S1, S2 of the sine wave and the cosine wave is sampled in response to clocks generated at equal time intervals, and amplitude sets each composed of a combination of the amplitudes of the reference signals S1, S2 obtained as a result of this sampling are expressed on a two-dimensional coordinate system. Thereafter, the correction data is generated by obtaining correction information necessary for converting the oval curved line (FIG. 12), obtained by connecting these plotted amplitude sets, into the circumference curved line of the perfect circle with the original point at the center. Alternatively, the correction data is generated on the basis of relationships between the phase differences (cumulative phase difference) obtained by sampling the reference signals S1, S2 in response to the clock signals N generated at equal time intervals ΔT, and the straight line on which ideal phase differences (cumulative phase differences) are aligned. However, the time lag measuring device and the distance measuring apparatus of the present invention are not limited to this embodiment.

Figure 20:
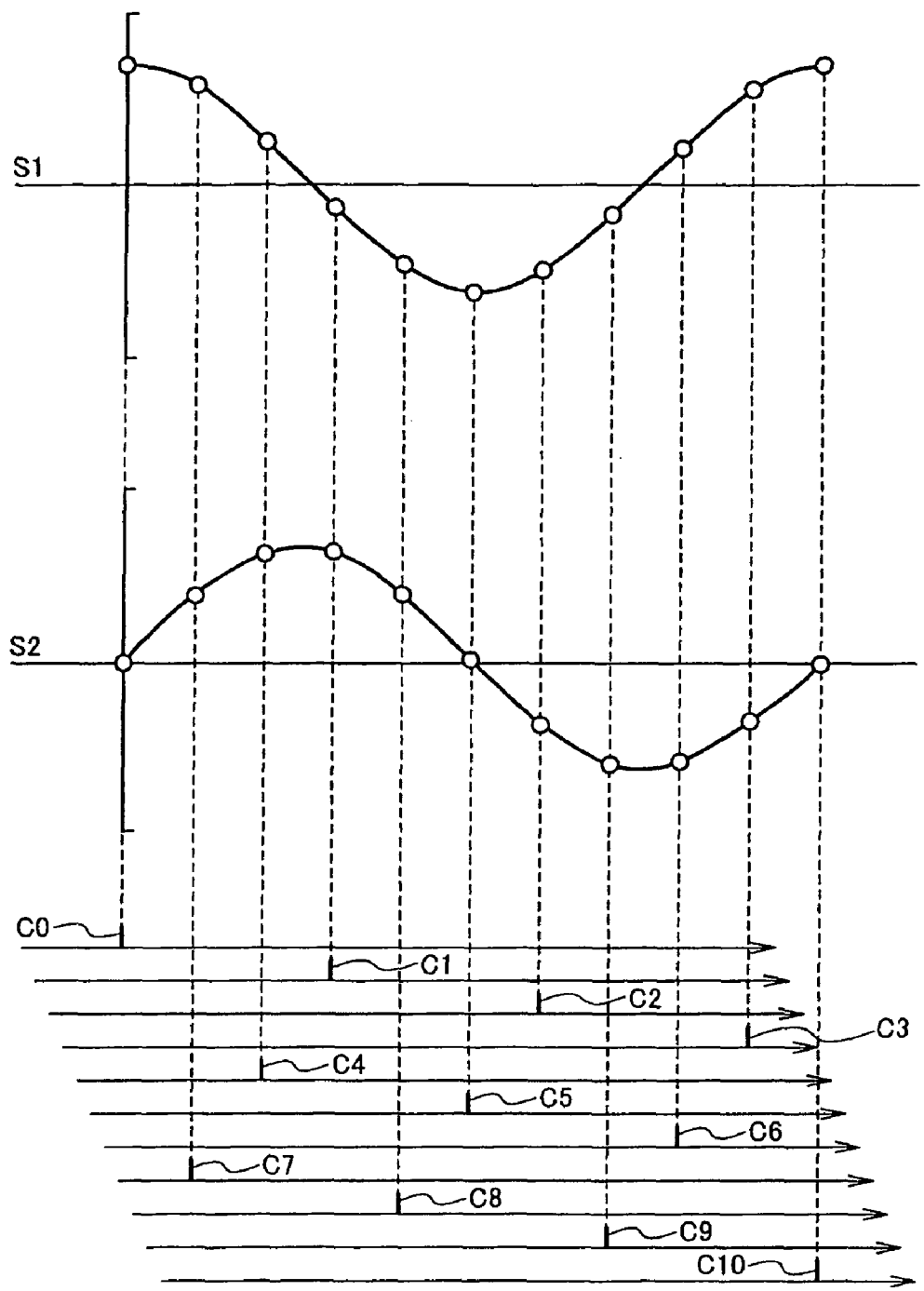
FIG. 20 is a schematic diagram for showing a state where the reference signals are sampled in response to clock signals generated at equal time intervals regardless of whether the clock signals are synchronized with the reference signals.

For instance, a method shown in FIG. 20 can be applied as one example of the other methods of generating correction data. Specifically, the reference signals S1, S2 are sampled in response to clock signals Ci (C0, C1, . . . , C10, . . . in time series) having a generation cycle longer than these reference signals S1, S2, and being generated at equal time intervals.

Figure 22:
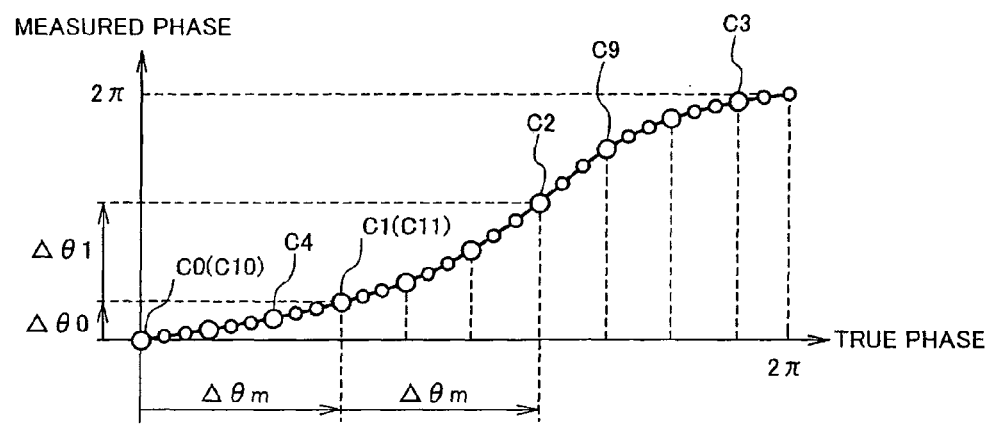
FIG. 22 is a diagram explaining the generation of a relationship table for correction.

In FIG. 22, the generation cycle of the clock signals is set to be 1.3 times longer than the generation times of the reference signals. This lock signal Ci may be either synchronous with the reference signals S1, S2, or asynchronous with the reference signals S1, S2.

Then, the phase difference Δ_ corresponding to each pair of clock signals (C0 and C1, C1 and C2, . . . , C9 and C10, . . . ) adjacent in time series is obtained on the basis of the amplitudes of the reference signals S1, S2 detected at each of the sampling points with the clock signals Ci.

Figure 21:
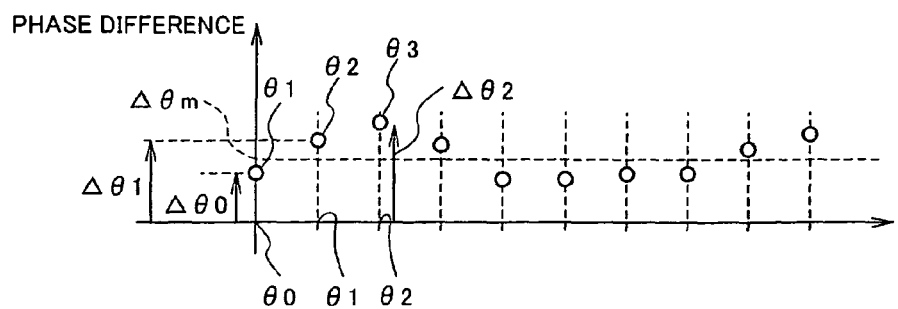
FIG. 21 is a diagram for showing one example of variations in the phase differences calculated on the basis of the amplitudes of reference signals, the amplitudes obtained by sampling the reference signals.

Since the generation intervals of the clock signals Ci are constant, the calculated phase differences Δ_ should take a constant value by nature. However, the calculated phase differences Δ_ do not always take the constant value, and a variation may occur due to the foregoing errors and the like, as shown in FIG. 21.

For this reason, the mean value Δ_m [rad] of these phase differences Δ_ having such errors is calculated, and the frequency fc of the clock signal C is calculated from $$fc = 2\pi \_ f_{TCXO}/\Delta\_m$$

where $f_{TCXO}$ denotes the frequency of the reference signals S1, S2.

Then, as shown in FIG. 22, the phase differences Δ_ corresponding to each interval between the above sampling points C0 to C9 are plotted with the true phase (one cycle of the true phase $T=1/f_{TCXO}$) assigned to the horizontal axis and with the measured phase assigned to the vertical axis (a phase range exceeding $2\pi$ [rad] is plotted as a phase less than $2\pi$ [rad] by subtracting an integral multiple of the $2\pi$ [rad] from the phase range). For example, a relationship table indicated by an S-shaped curved line shown in the drawing can be obtained.

In FIG. 22, a white circle point of a relatively large size shows the phase _ (or the phase difference Δ_) corresponding to each of the sampling points C0 to C9. Plotted points corresponding to the sampling points after C10 each match with the true phase of any one of the already-measured sampling points (a value in a horizontal direction) in the case where the clock signals Ci are synchronous with the reference signals S1, S2. For instance, C10 overlaps with C0 at the positions in the horizontal direction, and C11 overlaps with C1 at the positions in the horizontal direction.

On the other hand, in the case where the clock signals Ci are asynchronous with the reference signals S1, S2, plotted points corresponding to the sampling points after C10 each do not match with the true phase of any one of the already-measured sampling points (a value in a horizontal direction). The points are plotted in the positions expressed by white circles of a relatively small size in FIG. 22.

As described above, the relationship table within the range of 0 to $2\pi$ [rad] is formed as the correction data by the accumulation of these plotted points.

Figure 23:
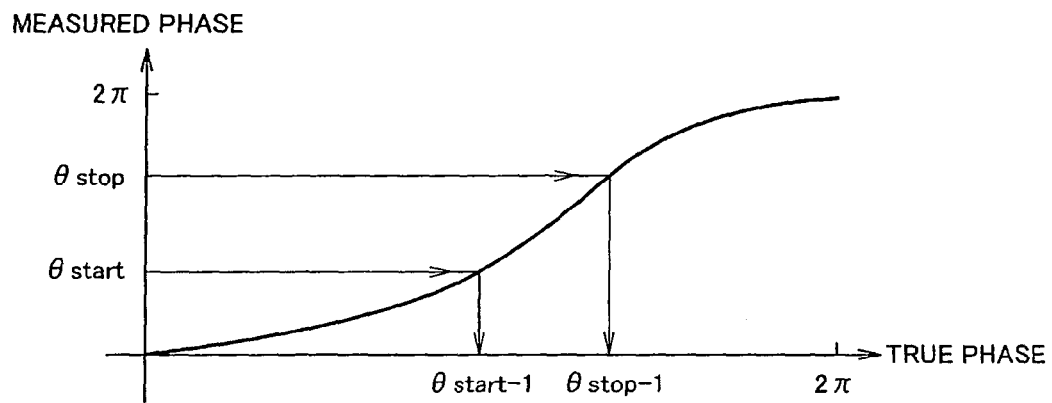
FIG. 23 is a diagram explaining an operation for correcting a phase difference on the basis of the relationship table for correction.

Then, the correction data thus obtained can be used directly for the correction. More precisely, the true phases _start-1, _stop-1 corresponding to the respective measured phases _start, _stop can be obtained on the basis of the previously-set relationship table (the correction data; see FIG. 23).

Then, by using the obtained true phases _start-1, _stop-1 and the frequency $f_{TCXO}$ of the reference signals S1, S2, the time lag T can be calculated from the following equation:

$$T = ((\_stop\text{-}1 - \_start\text{-}1)/2\pi)\_(1/f_{TCXO}).$$

Although the foregoing method of obtaining correction information is applicable to both cases of the clock signals Ci synchronous with the reference signals S1, S2 and of the clock signals Ci asynchronous with the reference signals S1, S2, the description is provided here only for the obtaining method applicable only to the synchronous case.

Figure 24:
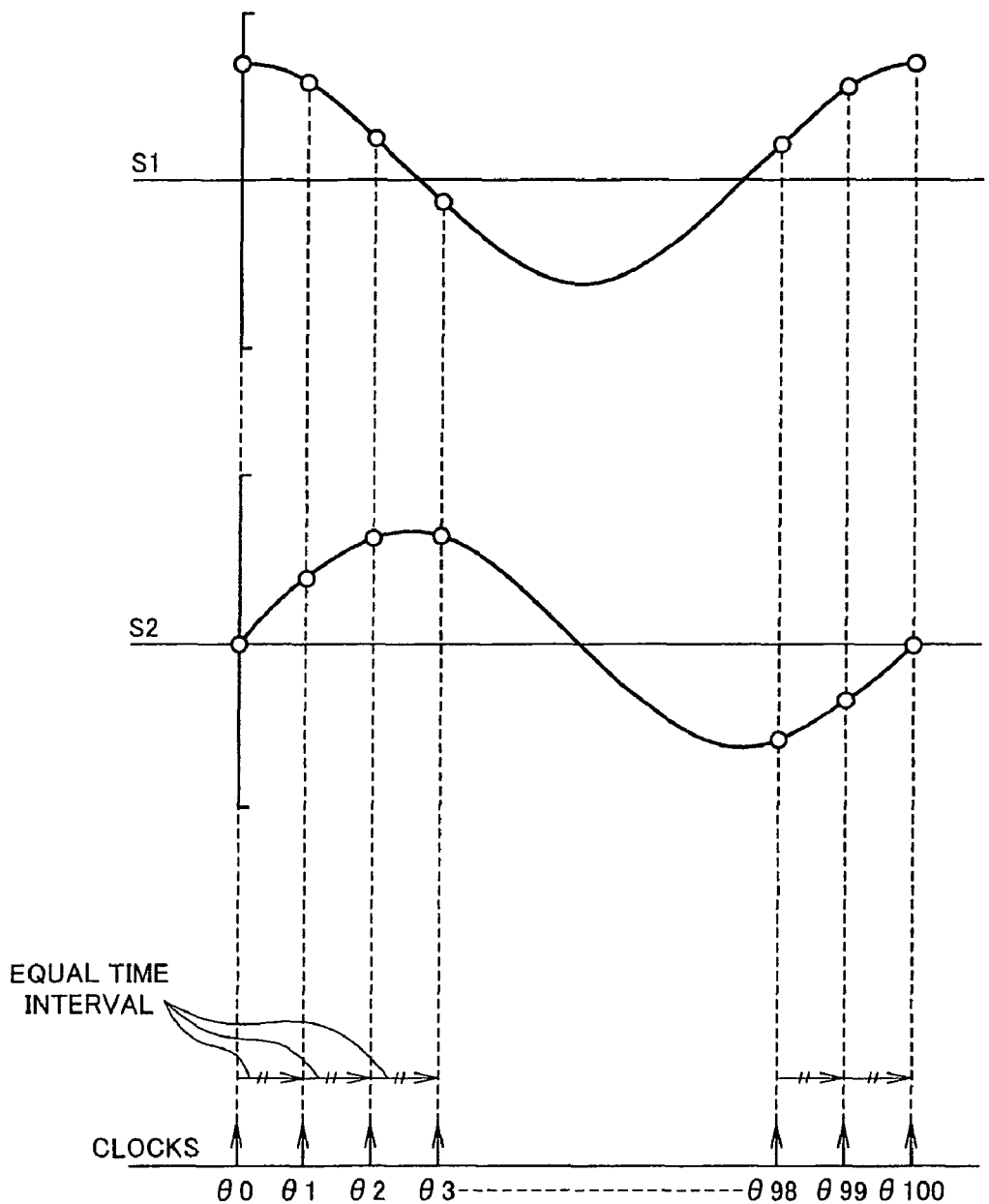
FIG. 24 is a schematic diagram showing a state where reference signals are sampled in response to clock signals synchronized with the reference signals and generated at equal time intervals.

First, as shown in FIG. 24, the reference signals S1, S2 are sampled in response to clock signals having a generation cycle shorter than the reference signals S1, S2 and generated at equal time intervals. Incidentally the clock signals are synchronized with the reference signals S1, S2, and 100 clock signals are generated at equal time intervals within one cycle of the reference signals S1, S2, and 100 sampling data pieces are obtained from each of the reference signals S1, S2.

At this time, the true phase difference Δ_ between the reference signals S1, S2 corresponding to a time interval between clocks adjacent in time series is (2π/100) [rad].

Figure 25:
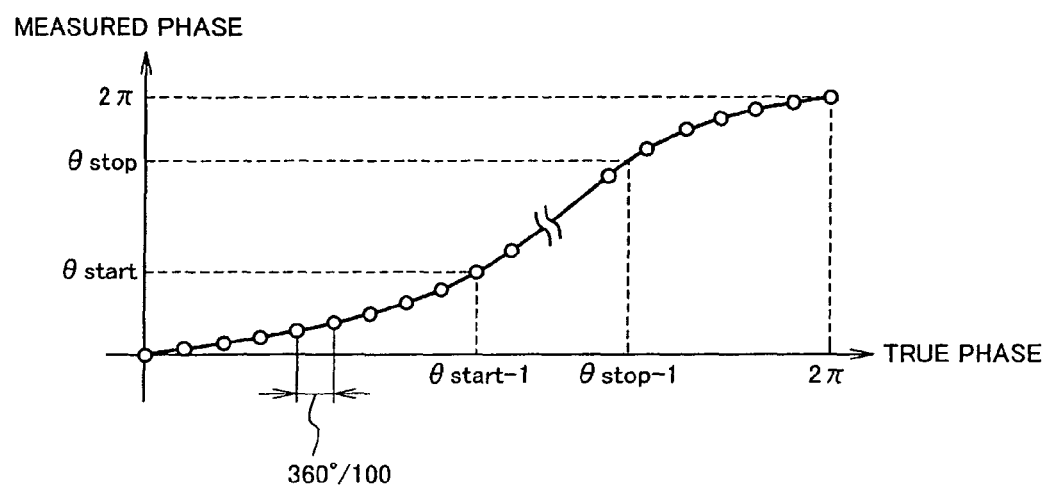
FIG. 25 is a diagram explaining the generation of a relationship table for correction and also explaining an operation for correcting a phase difference on the basis of the relationship table for correction.

On the other hand, the measured phase difference Δ_ calculated on the basis of the respective amplitudes of the reference signals S1, S2 obtained by sampling includes an error as described above, and thereby does not always take a constant value. As similar to FIG. 22, the phase differences Δ_ corresponding to the aforementioned 100 sampling points are plotted with the true phase (the phase difference of (2π/100) [rad] corresponding to a time interval between clocks adjacent in time series) assigned to the horizontal axis and with the measured phase assigned to the vertical axis. As a result, by the accumulation of the plotted phase differences, the relationship table indicated by an S-shaped curved line shown in FIG. 25 can be obtained as the correction data within the range of 0 to 2π [rad].

Then, the correction data thus obtained can be directly used for correction. More precisely, the true phases _start-1, _stop-1 corresponding to the respective measured phases _start, _stop can be obtained on the basis of the previously-set relationship table (the correction data; see FIG. 25).

Then, by using the obtained true phases _start-1, _stop-1 and the frequency $f_{TCXO}$ of the reference signals S1, S2, the time lag T can be calculated from the following equation:

$$T=((\_stop-1-\_start-1)/2\pi)\_(1/f_{TCXO}).$$

Figure 4:
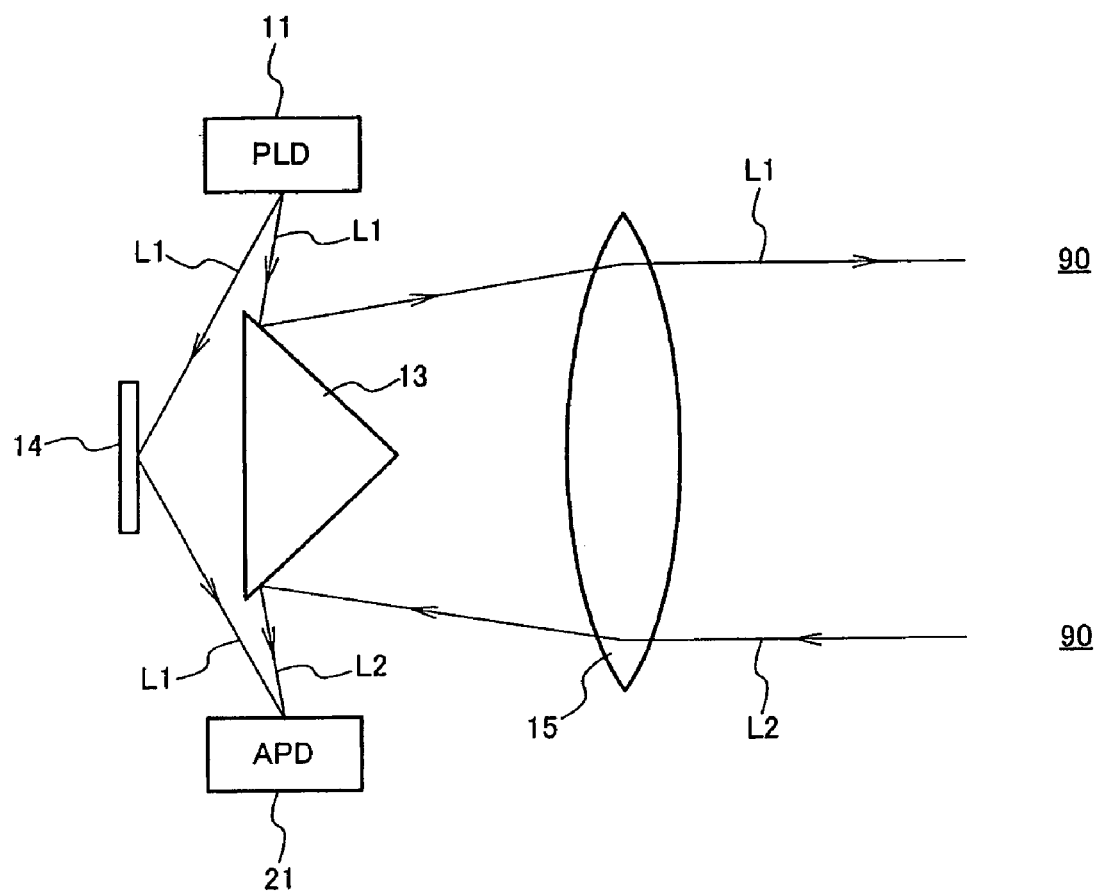
FIG. 4 is a diagram showing a specific optical system in the survey instrument in FIG. 1.

Moreover, a configuration shown in FIG. 4, for example, can be applied as the measuring beam emission unit 10 and the reflected laser beam detection unit 20.

The illustrated optical system is configured to function as both the emission optical system 12 and the detection optical system 22, and thereby has a configuration including a mirror 14 for guiding the laser beam L1 emitted by the PLD 11 to the photodetector (APD) 21 by reflecting the laser beam L1; and a prism 13 and a lens 15 for guiding the laser beam L1 to the distance-measuring object 90 and for guiding the reflected laser beam L2 to the photodetector 21.

Note that the illustrated configuration is only one example, and that the time lag measuring device and the distance measuring apparatus according to the present invention are not limited to such a configuration.

Figure 5:
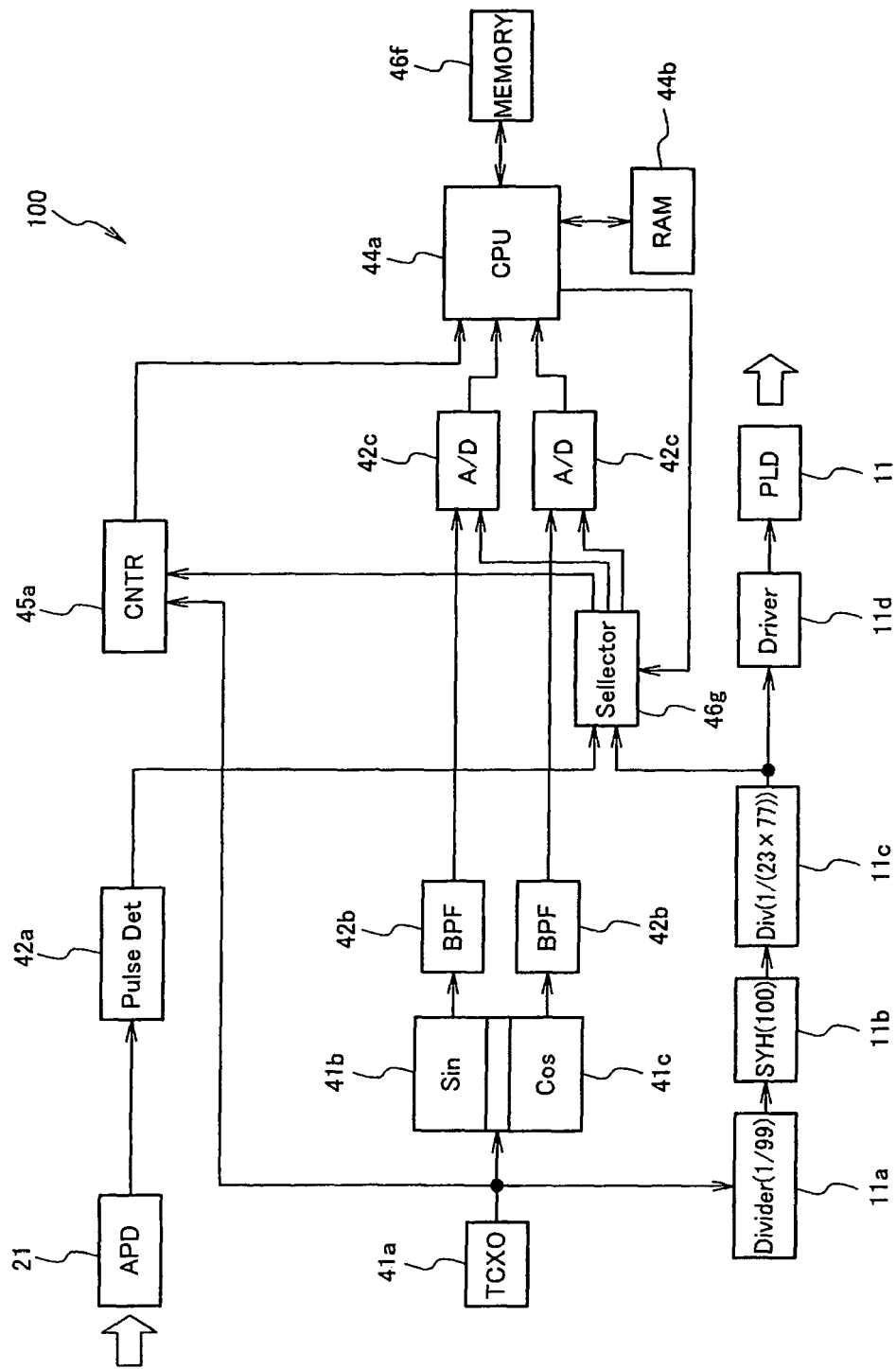
FIG. 5 is a diagram showing a specific control system (with synchronization) in the survey instrument in FIG. 1.

In addition, a configuration shown in FIG. 5, for example, can be applied to a specific control system for the time lag measuring device 40.

The illustrated control system is switched to the correction mode by the mode switching part (Selector) 46g.

First, in the correction mode, the mode switching part 46g accepts input from a second divider (Div) 11c to be described later, while interrupting input from the pulse detector 42a. In accordance with pulses of 15 [MHz] outputted from an oscillator circuit (TXCO) 41a, a sine wave (Sin) generating part 41b and a cosine wave (Cos) generating part 41c respectively generate the reference signal S1 of a sine wave and the reference signal S2 of a cosine wave having a phase difference of π/2. Then, the bands of these reference signals S1, S2 are limited by corresponding bandpass filters (BPF) 42b, 42b.

On the other hand, a first divider (Divider) 11a performs 1/99 frequency division on the pulses of 15 [MHz] outputted from the oscillator circuit (TXCO) 41a, and thereby the pulses become 151.51 [kHz]. Then, the pulses are multiplied by 100 by a synthesizer (SYH) 11b, and become 15.151 [MHz]. The 100th cycle of the resultant pulse and the 99th cycle of an output pulse of 15 [MHz] are synchronized at the phase difference 0.

The second divider (Div) 11c further performs 1/(23_77) frequency division on the signal of 15.151 [MHz] obtained by the multiplication by the synthesizer 11b. The frequency-divided output pulses have a pulse output time interval that is a known ΔT, and inputted as the correction pulse signals N1, N2, ... to the mode switching part 46g. At the generation timings of these correction pulse signals N, each of A/D converters (A/D) 42c, 42c samples and holds at least six sets of the band-limited reference signals S1 or S2. The sample-held values, that is, sets of amplitude values (A11, A12), (A21, A22), (A31, A32), (A41, A42), (A51, A52), (A61, A62), ... are inputted to a CPU 44a.

The reason why six or more sets of amplitude values are needed here is to determine constants a, b, c, d, e and h for specifying f(x, y) of the equation (11).

As the correction data generating part 46c, the CPU 44a generates correction data based on the six or more sets thus inputted in the aforementioned procedure. Then, the CPU 44a stores the generated correction data in a memory 46f functioning as the correction data storing part 46d.

Incidentally, arithmetic expressions, other various constants and the like are stored in a RAM 44b connected to the CPU 44a.

Next, in the actual measurement mode, the mode switching part 46g accepts input from the pulse detector 42a. Then, in accordance with pulses of 15 [MHz] outputted from the oscillator circuit (TXCO) 41a, the sine wave (Sin) generating part 41b and the cosine wave (Cos) generating part 41c respectively generate the reference signal S1 of a sine wave and the reference signal S2 of a cosine wave having a phase difference of π/2. Thereafter, the bands of these reference signals S1, S2 are limited by the corresponding bandpass filters (BPF) 42b, 42b.

The first divider (Divider) 11a performs 1/99 frequency division on the pulses of 15 [MHz] outputted from the oscillator circuit (TXCO) 41a, and thereby the pulses become 151.51 [kHz]. Then, the pulses are multiplied by 100 by a synthesizer (SYH) 11b, and become 15.151 [MHz]. The 100th cycle of the resultant pulse and the 99th cycle of the output pulse of 15 [MHz] are synchronized at the phase difference 0.

The second divider (Div) 11c further performs 1/(23_77) frequency division on the signal of 15.151 [MHz] obtained by the multiplication by the synthesizer 11b. The frequency-divided output pulses are inputted to a driver (DRIVER) 11d. This driver 11d drives the PLD 11, and the PLD 11 outputs the pulsed laser beam L1.

Accordingly, the pulsed laser beams L1 are repeatedly emitted from the PLD 11 at a frequency of approximately 8.5 [kHz], and the reflected laser beams L2 are repeatedly detected with the repeated emissions. As a result, the time lag between the start signal M1 and the stop signal can be measured two or more times. Such two-or-more-time measurement results in an improvement in the reliability of the measurement result.

Each of the A/D converters (A/D) 42c, 42c samples and holds the band-limited reference signals S1 or S2 at the generation timings of the start signal M1 and the stop signal M2, which are generated by the pulse detector (Pulse Det) 42a on the basis of the laser beam L1 and the reflected laser beam L2 detected by the photodetector (APD) 21. These sample-held values, that is, the amplitude values A11, A12 and the amplitude values A21, A22 are inputted to the CPU 44a.

After that, the CPU 44*a* functioning as the correction calculating part 46*e* reads out the correction data from the memory 46*f*, performs the correction process to correct the phases of these inputted sample-held values (amplitude values) by use of the read-out correction data, and calculates the phase difference on the basis of these corrected phases. Thereafter, on the basis of the obtained phase difference, the CPU 44*a* obtains the generation time lag Δt between the start signal M1 and the stop signal M2 actually measured.

On the other hand, the output pulses from the oscillator circuit 41*a* are also inputted to a pulse counter (CNTR) 45*a*. This pulse counter 45*a* counts the number of pulses of the output pulses inputted between the generation timing of the start signal M1 and the generation timing of the stop signal M2, the two signals being generated by the pulse detector 42*a*. The counting result is inputted to the CPU 44*a*, and is used by the CPU 44*a* to calculate the approximate time lag ta.

In this way, the CPU 44*a* can obtain the time lag Δt on the basis of the approximate time lag ta and the generation time lag Δt with high resolution, even when the generation time lag Δt exceeds one cycle of the reference signals S1, S2.

Although what is illustrated in FIG. 5 is a control system configured to synchronize the reference signal S1 (or the reference signal S2) with the start signal M1, these signals do not always need to be synchronized. The two signals S1 (or S2) and M1 may be completely asynchronous, that is, the two signals S1 (or S2) and M1 may be completely asynchronous with each other without mutual dependence while depending only on the respective signals individually outputted from two transmission circuits that are independent of each other, for example, as shown in FIG. 6.

Note that, although the time lag measuring device and the distance measuring apparatus according to the present invention are capable of accurately measuring a time lag between two pulse signals generated with the time lag therebetween, only by detecting each of the two pulse signals once in the actual measurement mode, it is preferable to enhance the reliability of a measurement result in an actual measurement by measuring the time lag two or more times, and then by calculating the mean value, standard deviation or the like of the two or more measurement results.

Incidentally, although what is illustrated in FIG. 5 is the control system configured to synchronize the reference signal S1 (or the reference signal S2) with the start signal M1 or the correction pulse signals N, these signals do not always need to be synchronized. These signals S1 (or S2), M1 and N may be completely asynchronous, that is, these signals S1 (or S2), M1 and N may be completely asynchronous with each other without mutual dependence while depending only on the respective signals individually outputted from two oscillator circuits that are independent of each other, for example, as shown in FIG. 6.

Figure 6:
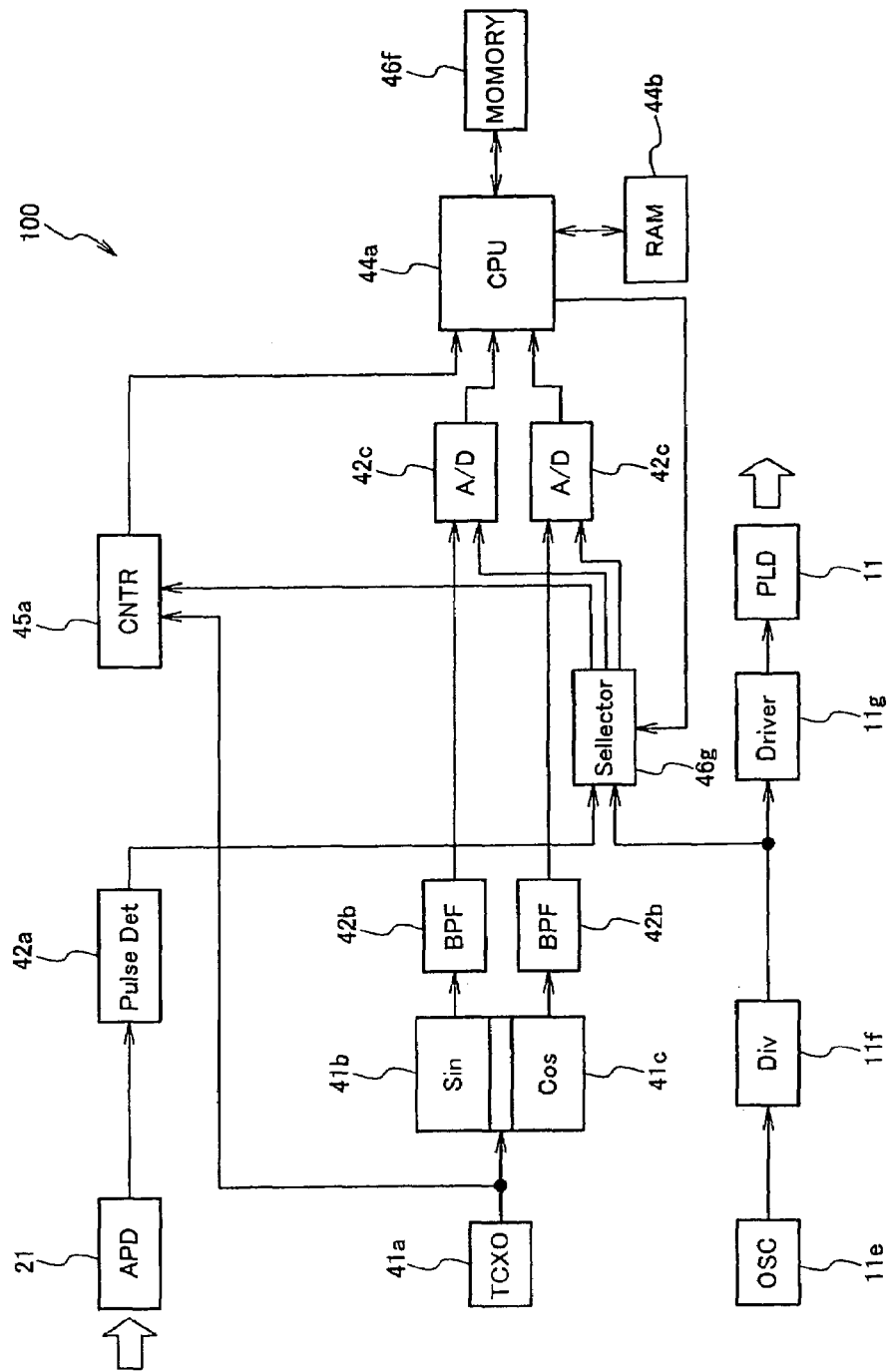
FIG. 6 is a diagram showing a specific control system (without synchronization) in the survey instrument in FIG. 1.
Figure 7:
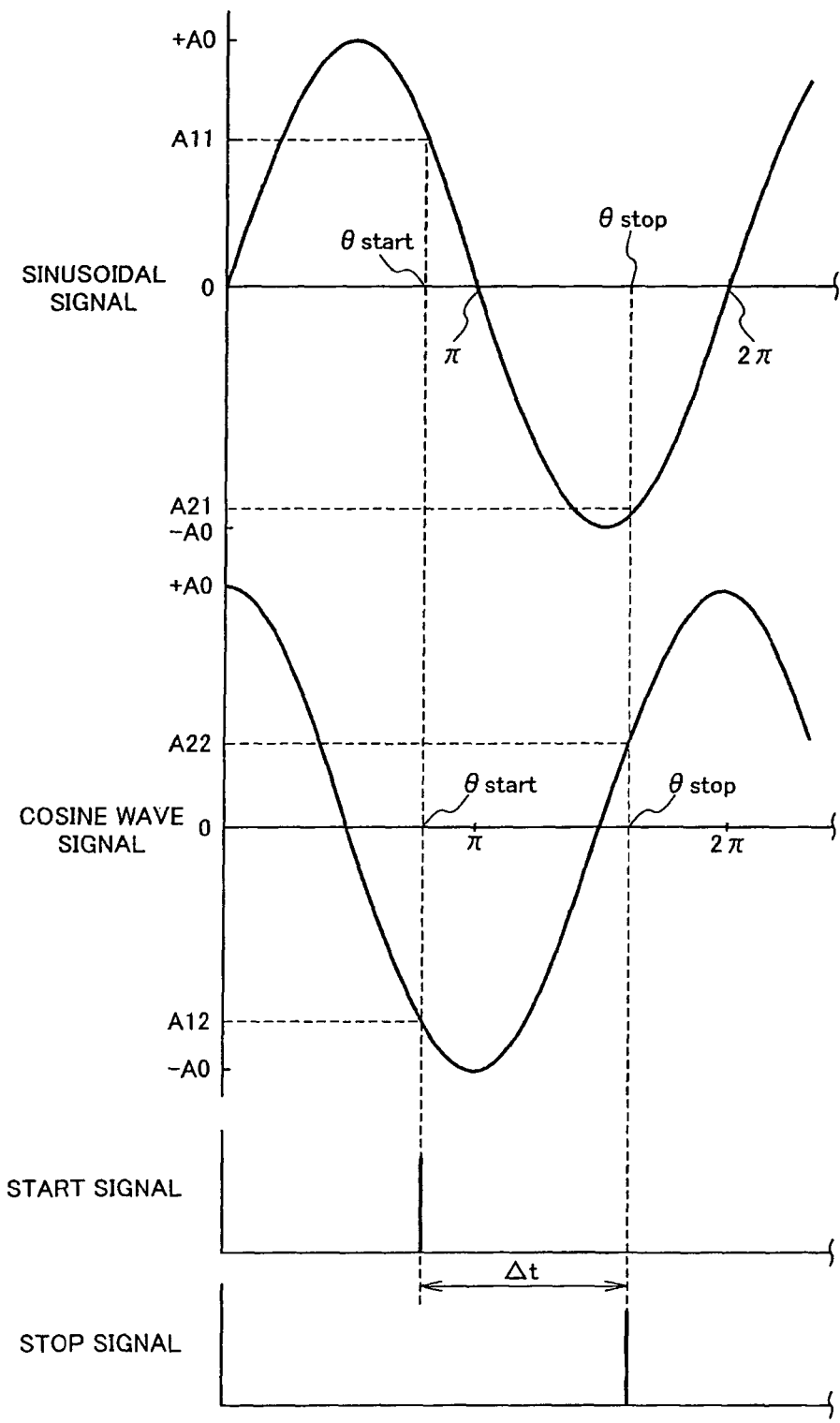
FIG. 7 is a diagram showing a relation between reference signals and measurement pulse signals.

The controller shown in this FIG. 6 is composed of a control system for generating the reference signals S1, S2 and a control system (a system for generating the measurement pulse signal) for causing a PLD 11 to emit a laser beam L1, and a control system for generating correction pulse signals N, both of which are completely separated and independent from each other. The control system for generating the reference signals S1, S2 is the same as the control system shown in FIG. 5, while the control system for causing the PLD 11 to emit the laser beam L1 and the control system for generating the correction pulse signals N depend on the output pulses from an oscillator (OSC) 11*e* that is separate from and independent of the oscillator circuit 41*a*. In the actual measurement mode, the frequency of the output pulses outputted from the oscillator 11*e* is divided by a divider (Div) 11*f*; a driver (DRIVER) 11*g* drives the PLD 11 in accordance with the frequency-divided output pulses; and the laser beam L1 is outputted from the PLD 11 at timings completely independent of the timings of the reference signal S1 or S2.

On the other hand, in the correction mode, the correction pulse signals N are outputted at timings completely independent of the timings of the reference signal S1 or S2.

The time lag measuring device and the distance measuring apparatus each having the control system thus configured can also improve the reliability of the measurement result by performing measurements two or more times.

In addition, although the survey instrument 100 according to this embodiment has been described as employing the semiconductor laser as the light source, a type of light source for distance measuring apparatuses according to the present invention is not limited to this type of light source. Any one of a light source for emitting another type of laser beam, a light source for emitting light other than a laser beam, and a measuring wave emitting source for generating a measuring wave such as a microwave or the like other than light is employable. Even with use of any one of these light sources, it can provide the same function as this embodiment, and thus produces the same effect as well.

As the correcting section 46 for correcting an error attributed to an error between the two reference signals S1, S2 or an error in at least one of the reference signals S1, S2, the time lag measuring device 40 of the survey instrument 100 of this embodiment employs the configuration including the sampling timing forming part 46*b*, the mode switching part 46*a*, the correction data generating part 46*c*, the correction data storing part 46*d* and the correction calculating part 46*e*. The sampling timing forming part 46*b* generates the correction pulse signals N imitating the measurement pulse signals M1, M2. The time lags between the generation timings of the correction pulse signals N are equal intervals. The mode switching part 46*a* switches between the actual measurement mode in which the measurement pulse signals M1, M2 are inputted, and the correction mode in which the correction pulse signals N are inputted. In the correction mode, in response to input of the correction pulse signals N, the correction data generating part 46*c* generates the correction data for correcting an error according to a relationship between the equal time lag and each phase difference between the generation timings of the correction pulse signals N. The phase difference is calculated by the phase difference detecting section 43. The correction data storing part 46*d* stores therein the correction data generated by the correction data generating part 46*c*. The correction calculating part 46*e* performs the correction calculating process using the correction data stored in the correction data storing part 46*d* to correct the phase difference corresponding to the time lag between the generation timings of the measurement pulse signals obtained in the actual measurement mode. Thereby, the time lag measuring device 40 is provided not only with the actual measurement mode for actually performing measurement but also with the correction mode for generating the correction data to be stored in the correction data storing part. One of the correction mode and the actual measurement mode is selected by the mode switching part. If the mode is switched to the correction mode in a preceding step of actual measurement, new correction data is formed by generating correction pulse signals. Thus, the correction data stored in the correction data storing part 46*d* can be updated to the latest correction data. This update makes it possible to prevent an individual difference of the time lag measuring device 40 from making an influence on the measurement result, and also to prevent the influence attributed to the use environment, such as age deterioration of the time lag measuring device 40.

Moreover, a calibration process can also be performed in a self-contained manner. Precisely, since it is not necessary to additionally prepare another external apparatus (an apparatus for generating correction pulse signals or the like), calibration can be performed during the process in the correction mode even in a place without any external apparatus.

Note that the correcting section 46 can also have another configuration excluding the sampling timing forming part 46b while including only the mode switching part 46a, the correction data generating part 46c, the correction data storing part 46d and the correction calculating part 46e. In this case, the mode switching part 46a switches between the actual measurement mode in which measurement pulse signals are inputted, and the correction mode in which correction pulse signals N are inputted. Here, the measurement pulse signals are pulse signals to be measured to find the generation time lag, and the correction pulse signals N are generated by imitating the measurement pulse signals M1, M2, and have known time lags between the generation timings. In the correction mode, in response to input of the correction pulse signals N, the correction data generating part 46c generates the correction data for correcting an error according to a relationship between the known time lag and each phase difference between the generation timings of the correction pulse signals N. The phase difference is calculated by the phase difference detecting section 43. The correction data storing part 46d stores therein the correction data generated by the correction data generating part 46c. The correction calculating part 46e performs the correction calculating process using the correction data stored in the correction data storing part 46d to correct the phase difference corresponding to the time lag between the generation timings of the measurement pulse signals M1, M2 obtained in the actual measurement mode.

In short, the sampling timing forming part 46b in the configuration shown in FIG. 2 may not be directly included in the time lag measuring device 40 or the survey instrument 100 (distance measuring apparatus), and the output of the correction pulse signals having the known time lag by this sampling timing forming part 46b can be performed by an external apparatus used in a state connected to the time lag measuring device 40 or the survey instrument 100, or in an equivalent state.

The configuration can be simplified by excluding a section (sampling timing forming part) for generating the pulse signals having the known time lag for correction, as described above as compared with the time lag measuring device 40 or the survey instrument 100 also including a structure for generating such pulse signals having the known time lag for correction.

In addition, the correcting section 46 may employ a configuration including the correction data storing part 46d and the correction calculating part 46e without having the correction mode in which the foregoing correction data is generated. In this case, the correction data storing part 46d stores therein the correction data for error correction, and the correction calculating part 46e performs the correction calculating process using the correction data stored in the correction data storing part 46d.

Without having the correction mode as described above, the configuration can be further simplified as compared with the time lag measuring device 40 or the survey instrument 100 including such correction mode.

Incidentally, in the case of any of the foregoing correcting sections 46, the correction data stored in the correction data storing part 46d is data on discrete sampling points. As a result, there is a case where no data at a relevant sampling point is stored in the correction data storing part 46d when the generation time lag $\Delta t$ is found.

Figure 19A:
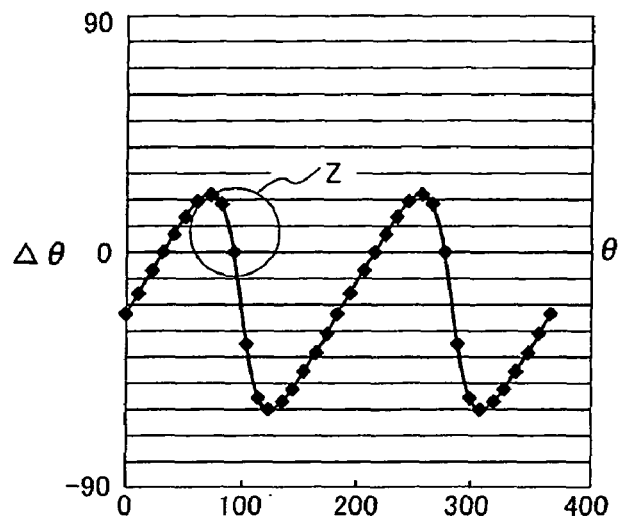
FIG. 19A is a diagram showing an error in the phase difference equivalent to that in FIG. 10D, when the reference signals S1, S2 are sampled at equal time intervals.
Figure 19B:
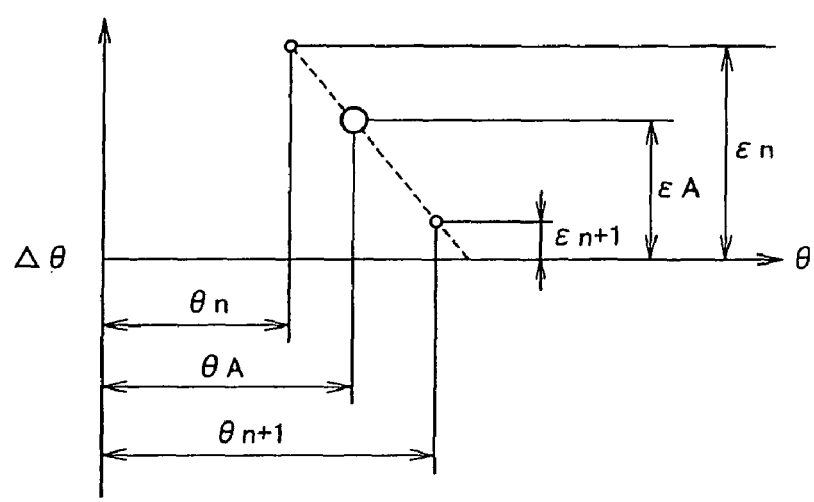
FIG. 19B is an enlarged diagram showing a detail of a Z portion in FIG. 19A.

For example, when there is an error having the locus (x, y) that causes the intersection of the amplitude values to exist on the circumference of the oval shown in FIG. 10C, error amounts in the phase differences $\Delta\_$ for the phases $\_$ ($0 \leq \_ \leq 2\pi$ [rad] (=360°)) about the original point (0, 0) take cyclically-varying values, phase $\_$ by phase $\_$, as shown in FIG. 19A. In a case where a sampling point, for which a correction is to be made, exists between the existing sampling points $\_n$, $\_{n+1}$ in a Z part, for example, and accordingly has no correction data, the correcting section 46 may generate the data ($\_A$, $\_A$) of the necessary sampling point between these two points through an interpolation process or a fitting process using the data ($\_$, $\Delta\_$)=($\_n$, $\_n$), ($\_{n+1}$, $\_{n+1}$) of the existing sampling points, as shown in FIG. 19B.

By applying, for example, a linear interpolation process as the interpolation process, the data can be obtained by using $$\_A = \_n + (\_{n+1} - \_n)(\_A - \_n)/(\_{n+1} - \_n) \tag{26}$$

Note that, as the interpolation process, a quadratic or higher interpolation process (cubic spline interpolation process or the like) may be applied or another fitting process may be applied in addition to the aforementioned linear interpolation.

Moreover, in the foregoing embodiment, the cycle (the generation time interval) of the correction pulse signals N has been described as shorter than the cycle Ts of the reference signals S1, S2. However, the time lag measuring device and the distance measuring apparatus of the present invention are not limited to this embodiment, and the cycle (the generation time interval) of the correction pulse signals N may be longer than the cycle Ts of the reference signals S1, S2.

Modified Example 1

Figure 26:
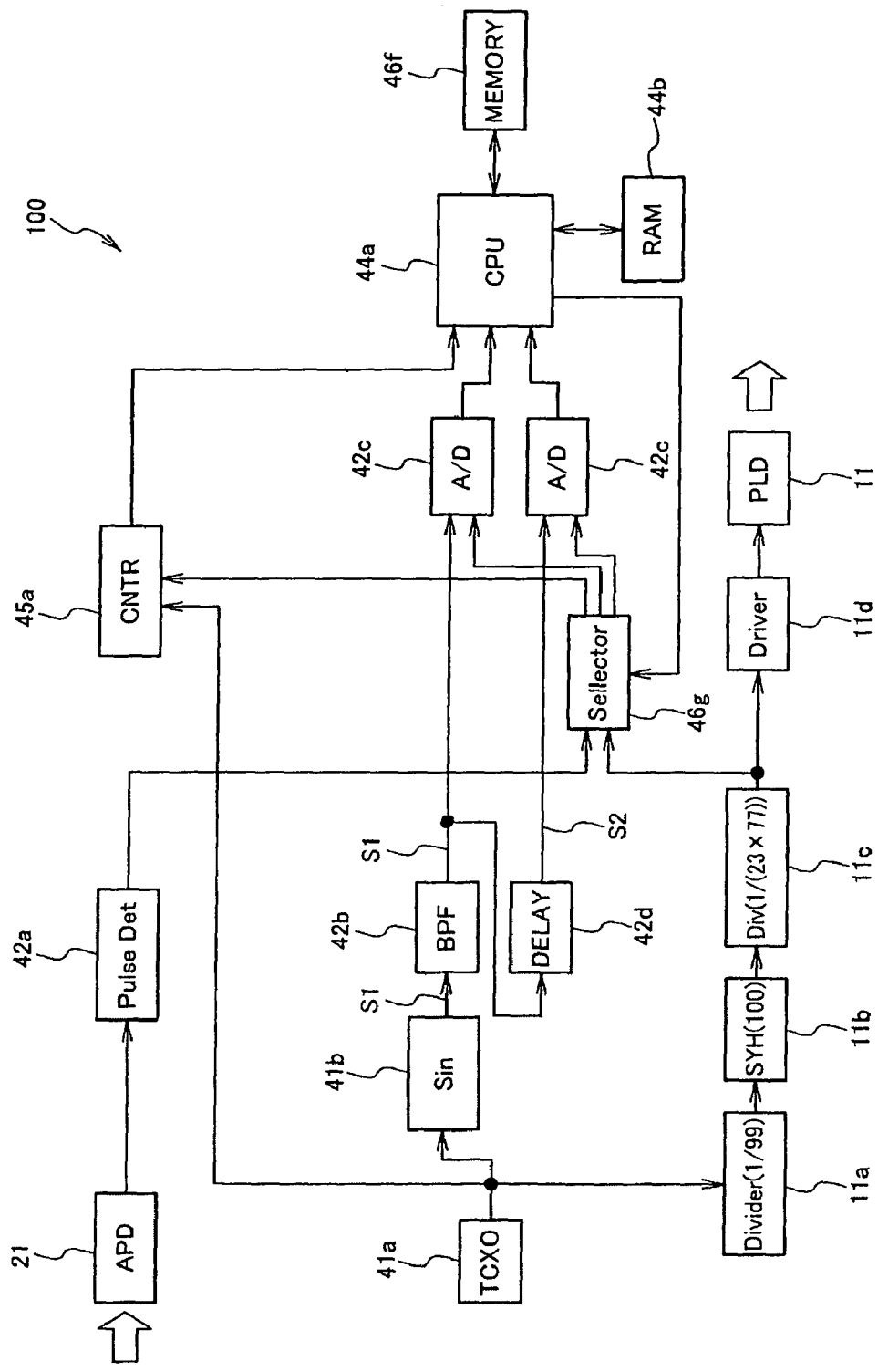
FIG. 26 is a diagram of a control system equivalent to that in FIG. 5, showing a modified example in which a reference signal generating section generates only a sinusoidal signal as one of the reference signals, and generates the other reference signals on the basis of the generated sinusoidal signal.

Each mode of the aforementioned embodiment has a configuration in which the reference signal generating section 41 separately generates and also separately outputs the first reference signal S1 of the sinusoidal signal and the second reference signal S2 of the cosine wave signal, for example, as shown in FIG. 5. However, as shown in FIG. 26, for example, another configuration may be applied in which the reference signal generating section 41 does not include the cosine wave generating part (Cos) 41c but includes a delay circuit 42d for processing the sinusoidal reference signal S1 generated by a sine wave generating part (Sin) 41b, to delay the reference signal S1 by a time corresponding to a phase difference of $\pi/2$ [rad] (($\pi/2$) [rad]$\_(2n-1)$; n=1, 2, ...) in the reference signal S1.

In other words, the reference signal generating section 41 primitively generates only one reference signal (sinusoidal signal) S1, and the delay circuit 42d generates a new reference signal from the primitively-generated reference signal S1 by delaying the phase of the reference signal S1 by $\pi/2$ [rad].

Since this newly-generated reference signal has a phase difference of $\pi/2$ [rad] relative to the reference signal, that is, the sinusoidal signal, the generated reference signal is a cosine wave signal S2.

Then, the same function and effect as in the embodiment shown in FIG. 5 can be substantially obtained by outputting the sinusoidal signal S1 and the cosine wave signal S2.

When one of two reference signals is original and when the other is generated according to original signal, as described above, a difference between the signal waveforms of the two reference signals, such as a difference between the amplitudes, for example, is unlikely to occur. Consequently, an error in the phase calculation based on the amplitudes can be reduced.

Figure 27:
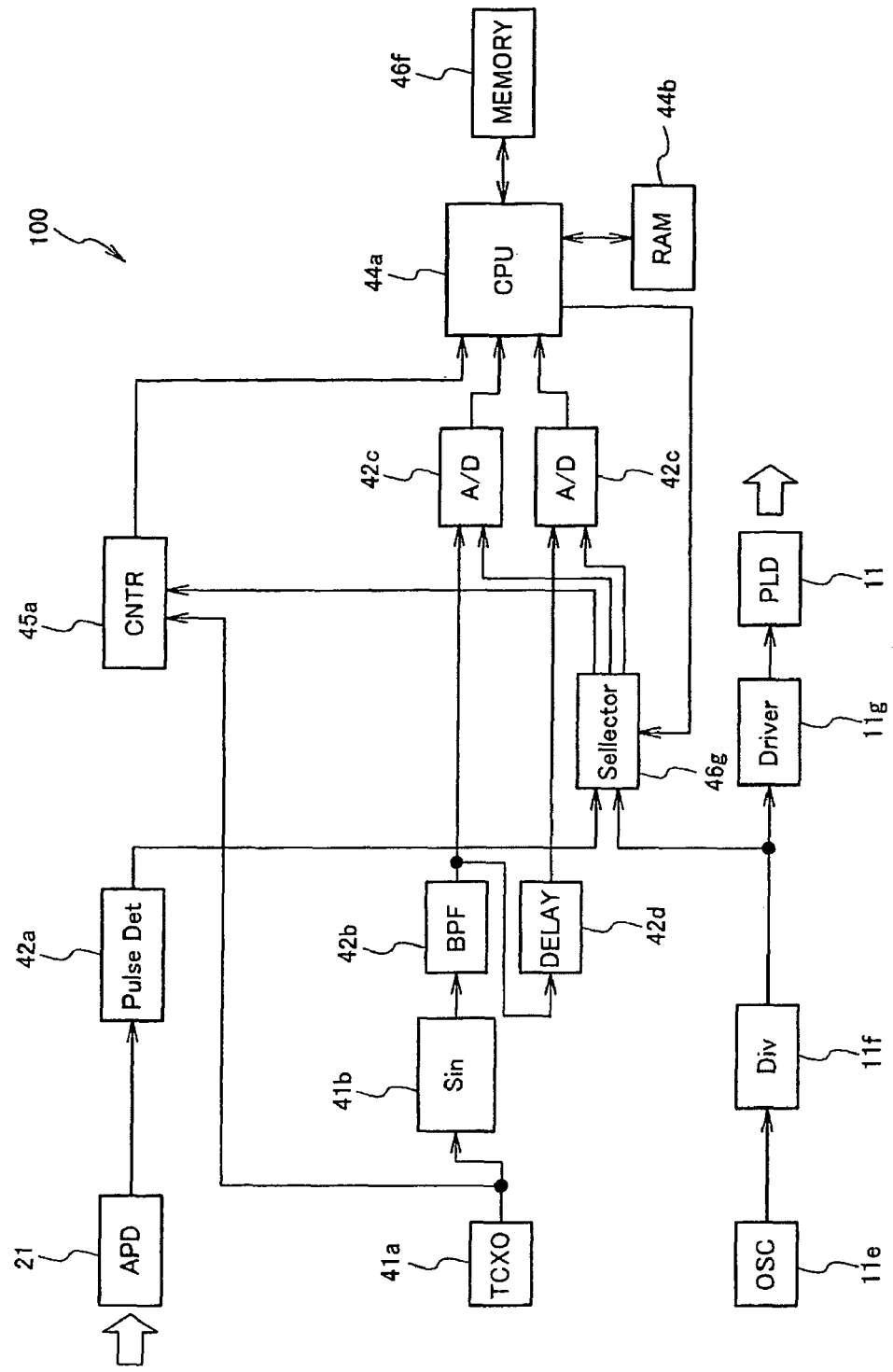
FIG. 27 is a diagram of a control system equivalent to FIG. 6, showing a modified example in which a reference signal generating section generates only a sinusoidal signal as one of the reference signals, and generates the other reference signals on the basis of the generated sinusoidal signal.

If a configuration using such delay circuit 42d is applied to the embodiment shown in FIG. 6, for example, a configuration shown in FIG. 27, for example, is obtained. With the embodiment of this configuration, the same function and effect as in the embodiment shown in FIG. 6 can be substantially obtained Embodiment 2

Each of the modes described as Embodiment 1 is for a case where there are two reference signals, and shows that the phase difference between the two reference signals is approximately π/2 [rad], and that the two reference signals are sampled at the same time (at the same timing). A time lag measuring device and a distance measuring apparatus according to the present invention are not limited to this embodiment, and can employ a configuration that can be substantially considered as the same as this embodiment.

Specifically, a set of sampling values (amplitude values) may be obtained by sampling a single reference signal at two timings with a time lag corresponding to the phase difference, instead of obtaining a set of sampling values by sampling two reference signals having a phase difference at the same time.

Figure 28:
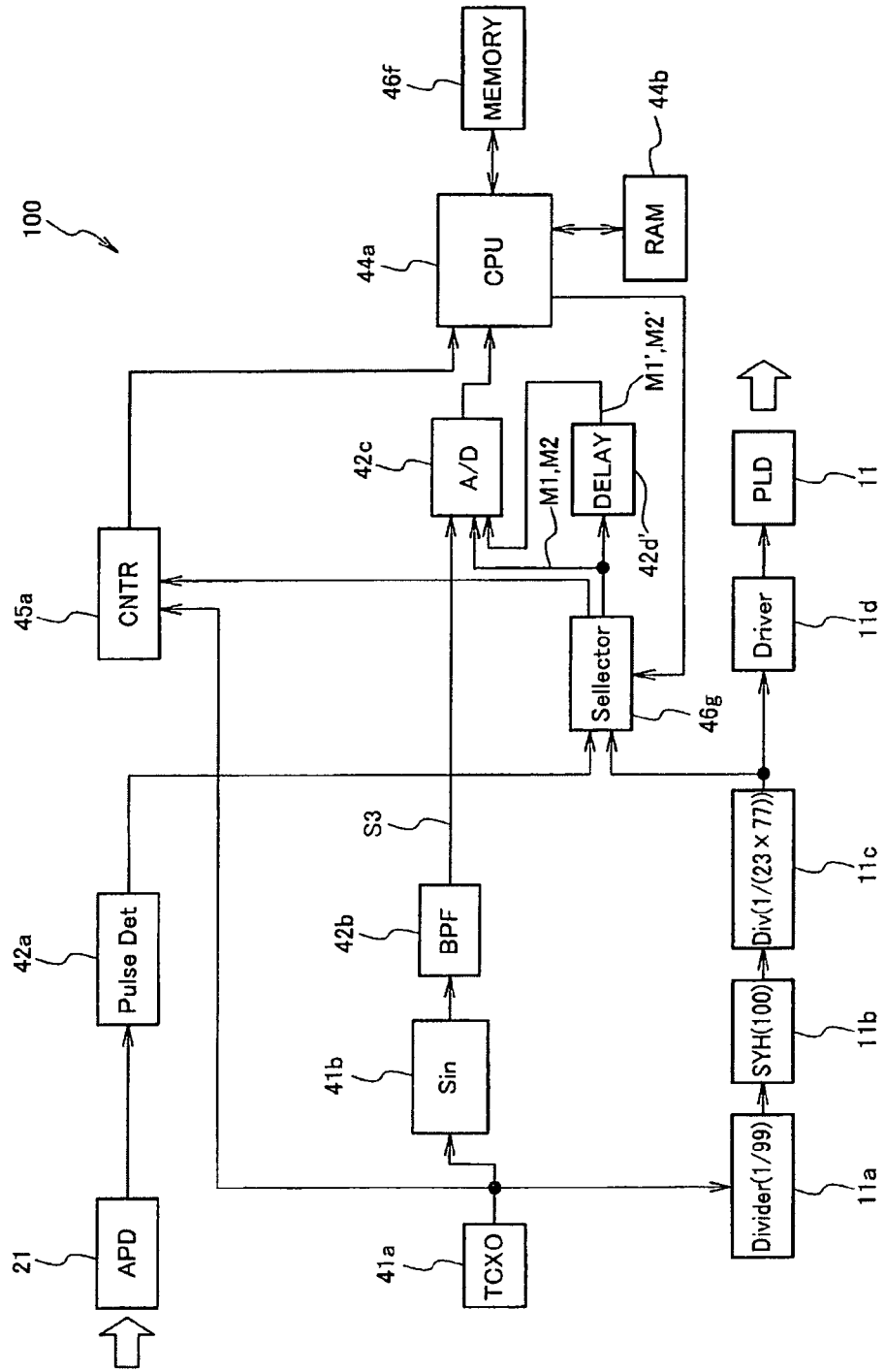
FIG. 28 is a diagram of a control system equivalent to that in FIG. 26, showing an embodiment in which a reference signal generating section generates only a sinusoidal signal as one of the reference signals, and in which the generated sinusoidal signal is sampled at two timings (generation timing and delay timing) corresponding to each other.

For example, FIG. 28 shows a mode corresponding to the embodiment shown in FIG. 26. In the illustrated embodiment, a mode switching part 46g accepts input from a second divider (Div) 11c, to be described later, while interrupting input from a pulse detector 42a in the correction mode. In addition, a sine wave (Sin) generating part 41b generates a sinusoidal reference signal S1 in accordance with pulses of 15 [MHz] outputted from an oscillator circuit (TXCO) 41a, and the band of this reference signal S1 is limited by a corresponding bandpass filter (BPF) 42b.

On the other hand, a first divider (Divider) 11a performs 1/99 frequency division on the pulses of 15 [MHz] outputted from the oscillator circuit (TXCO) 41a, and thereby the pulses become 151.51 [kHz]. Then, the pulses are multiplied by 100 by a synthesizer (SYH) 11b, and become 15.151 [MHz]. The 100th cycle of the resultant pulse and 99th cycle of the output pulse of 15 [MHz] are synchronized at the phase difference 0.

The second divider (Div) 11c further performs 1/(23_77) frequency division on the signal of 15.151 [MHz] obtained by the multiplication by the synthesizer 11b. The frequency-divided output pulses have a known pulse output time interval of ΔT, and the output pulses are inputted as correction pulse signals N1, N2, . . . to a mode switching part 46g. The A/D converter (A/D) 42c samples and holds the band-limited reference signal S1 at the generation timings of the correction pulse signals N.

Then, the output pulse N1 (N2) inputted to the mode switching part 46g is delayed by a phase of π/2 [rad] in the reference signal S1 by a delay circuit 42d', and the delayed output pulse N1' (N2') is inputted to the A/D converter (A/D) 42c. At these timings, the band-limited reference signal S1 is sampled and held.

This delay circuit 42d' is a pulse delaying part for delaying inputted signals (correction pulse signals N (N1, N2, . . . ), the start signal M1, the stop signal M2 and the like) by a time corresponding to a phase difference of π/2 [rad] in the reference signal S1. As shown in FIG. 30, the A/D converter 42c (amplitude detecting section 42) inputs, to the CPU 44a, values sampled and held at two timings, that is, a set of amplitude values (A11', A12'). Here, one of the two timings is a first timing (a generation timing; time t1), and the other is a timing (a delay timing; time t1'=t1+Δt1 (Δt1=Ts/4)) obtained by delaying the first timing by π/2 [rad].

Similarly, values sampled and held at two timings which are the generation timing (time t2) and the delay timing (time t2'=t2+Δt2 (Δt2=Ts/4)) corresponding to the generation timing, that is, a set of amplitude values (A21', A22') are inputted to the CPU 44a.

Figure 8A:
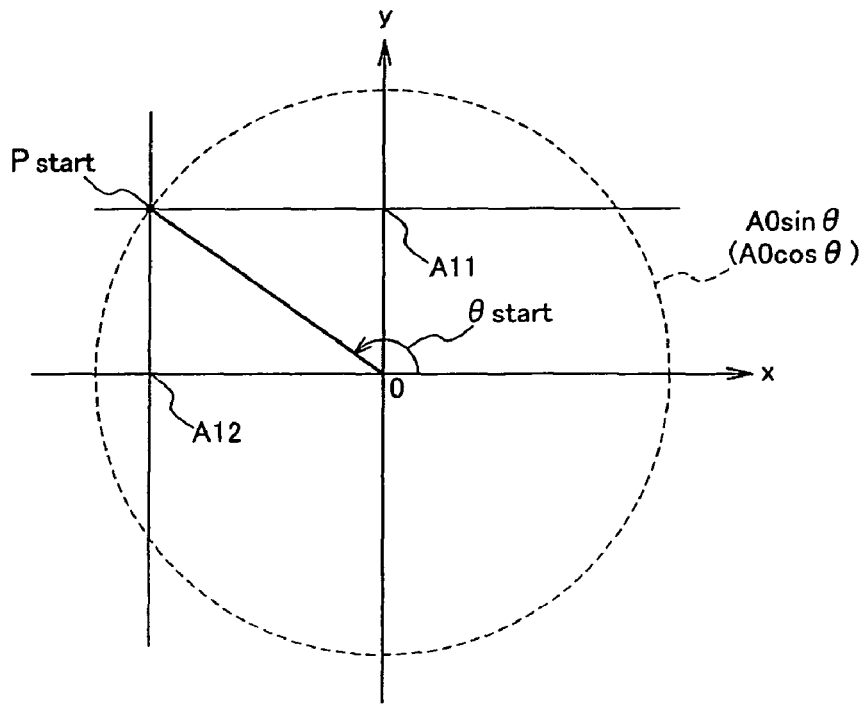
FIG. 8A is a diagram showing the principle for obtaining a phase shift amount on the basis of the values obtained by sampling the sinusoidal signal and the cosine wave signal at the same timing (the start signal)
Figure 8B:
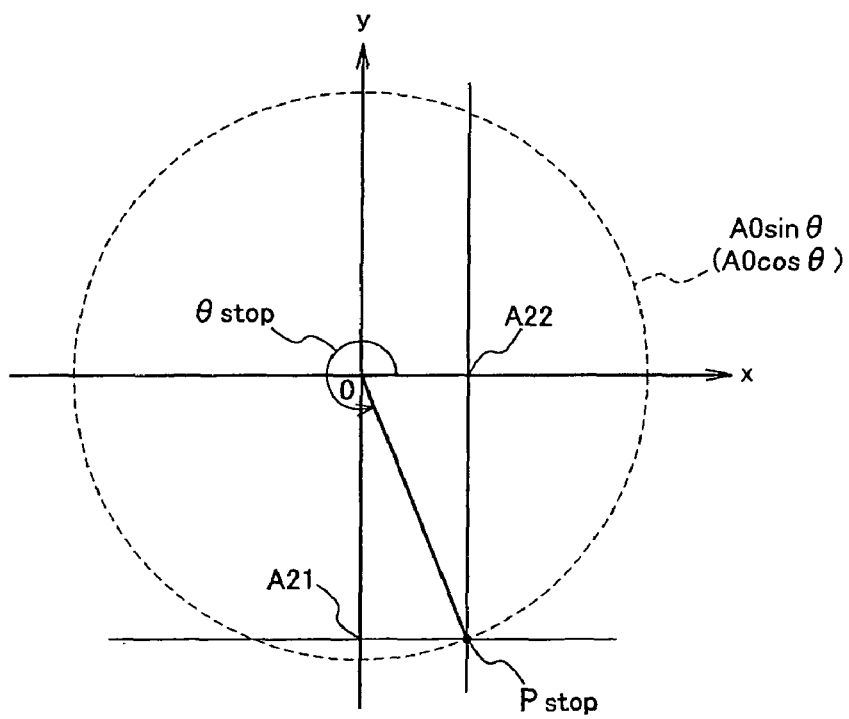
FIG. 8B is a diagram showing the principle for obtaining a phase shift amount on the basis of the values obtained by sampling the sinusoidal signal and the cosine wave signal at the same timing (the stop signal).

Assuming that the amplitude value sampled at the generation timing as described above is a value on a sinusoidal signal S3, the amplitude value sampled at the delay timing can be recognized as a value on a signal having a phase delayed by π/2 [rad] from that of the sinusoidal signal S3, that is, a cosine wave signal. When the amplitude value A11' obtained by sampling at the generation timing is assigned to the vertical axis while the amplitude value A12' obtained by sampling at the delay timing is assigned to the horizontal axis, a set of amplitude values (A11', A12') at these timings corresponding to each other is expressed as shown in FIG. 30C. This expression on the two-dimensional coordinates is substantially identical with the expression using the two reference signals (a phase difference of π/2 [rad] shown in FIG. 8.

Then, the other components are identical with the components having the same reference numerals in the embodiment shown in FIG. 5 or 26, and the functions are substantially identical therewith. Accordingly, the same effect as the embodiment shown in FIG. 5 or 26 can be produced.

Note that all modified examples and the like applicable to the embodiments in FIGS. 5 and 26 can be applied to the embodiment shown in FIG. 28.

Figure 29:
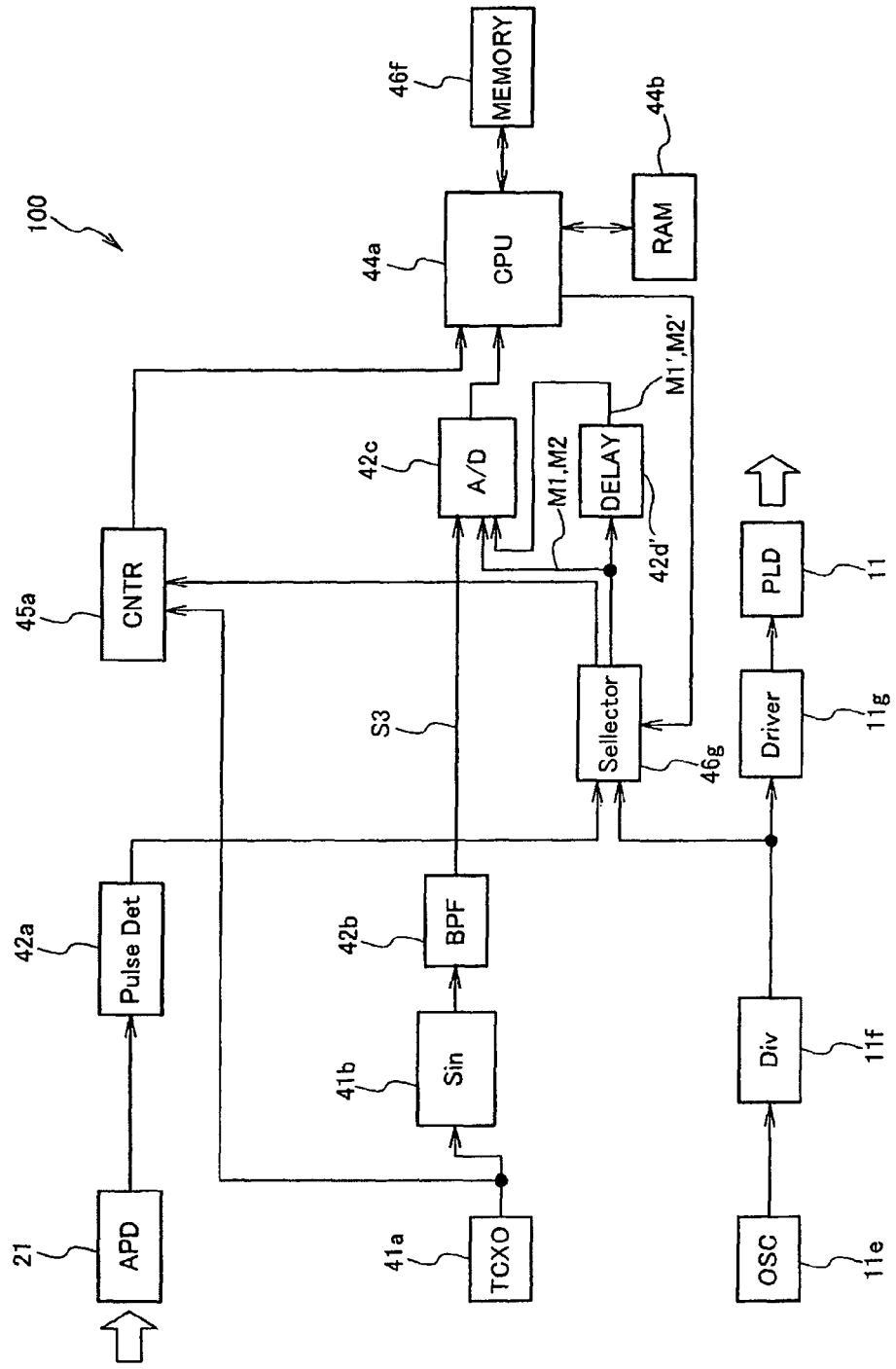
FIG. 29 is a diagram of a control system equivalent to FIG. 27, showing an embodiment in which a reference signal generating section generates only a sinusoidal signal as one of the reference signals, and in which the generated sinusoidal signal is sampled at two timings (generation timing and delay timing) corresponding to each other.

As similar to the embodiment in FIG. 28, FIG. 29 shows an embodiment equivalent to the embodiment shown in FIG. 27. In this embodiment, a delay circuit 42d' is also a pulse delaying part for delaying inputted signals (correction pulse signals N (N1, N2, . . . ), the start signal M1, the stop signal M2 and the like) by a time corresponding to a phase difference of π/2 [rad] in the reference signal S1. As shown in FIG. 30, an A/D converter 42c (amplitude detecting section 42) inputs, to a CPU 44a, values sampled and held at two timings, that is, a set of amplitude values (A11', A12'). Here, one of the two timings is a first timing (a generation timing; time t1), and the other is a timing (a delay timing; time t1'=t1+Δt1 (Δt1=Ts/4)) obtained by delaying the first timing by π/2 [rad].

Similarly, values sampled and held at two timings which are the generation timing (time t2) and the delay timing (time t2'=t2+Δt2 (Δt2=Ts/4)) corresponding to the generation timing, that is, a set of amplitude values (A21', A22') is inputted to the CPU 44a.

Assuming that the amplitude value sampled at the generation timing as described above is a value on a sinusoidal signal S3, the amplitude value sampled at the delay timing can be recognized as a value on a signal having a phase delayed by π/2 [rad] from that of the sinusoidal signal S3, that is, a cosine wave signal. When the amplitude value A11' obtained by sampling at the generation timing is assigned to the vertical axis while the amplitude value A12' obtained by sampling at the delay timing is assigned to the horizontal axis, a set of amplitude values (A11', A12') at these timings corresponding to each other is expressed as shown in FIG. 30C. This expression on the two-dimensional coordinates is substantially identical with the expression using the two reference signals (a phase difference of π/2 [rad] shown in FIG. 8.

Then, the other components are identical with the components having the same reference numerals in the embodiment shown in FIG. 6 or 27, and the functions are substantially identical therewith. Accordingly, the same effect as the embodiment shown in FIG. 6 or 27 can be produced.

Note that all modified examples and the like applicable to the embodiments in FIGS. 6 and 27 can be applied to the embodiment shown in FIG. 29.

Heretofore, the present invention has been described in terms of the exemplary embodiments, but the present invention is not limited to these. Those skilled in the art should easily understand that various improvements and modifications can be added to the configuration of the present invention without deviating from the scope and spirit of the present invention. As described above, the present invention is intended to include such improvements and modifications of the present invention, and accordingly such improvements and modifications are also included in the scope of claims and the scope of the equivalents.

The present application is based on and claims priority from Japanese Patent Application Number 2005-171571, filed with the Japanese Patent Office on Jun. 10, 2005, the disclosure of which including the specification, drawings and scope of claims is hereby incorporated by reference herein in its entirety.

INDUSTRIAL APPLICABILITY

In the aforementioned embodiments, the survey instrument has been described as an example of one embodiment of the distance measuring apparatus of the present invention including the time lag measuring device of the present invention. However, the time lag measuring device of the present invention is applicable not only to a shape measurement apparatus for specifying the shape profile and the like of a distance measuring object by measuring a distance to the object, but also to various apparatus and fields required to accurately find a distance calculated according to a time lag.

The invention claimed is:

1. A time lag measuring device for measuring an unknown time lag between generations of two pulse signals, comprising:
   a reference signal generating section generating a reference signal having a known cycle;
   an amplitude detecting section obtaining two amplitudes of the reference signal at a timing at which each of the pulse signals are generated, so as to substantially achieve a same effect as in a case where the amplitudes of the reference signal are sampled at two timings associated with respective generation timings for the two pulse signals, the two timings being spaced with an interval corresponding to a phase difference of approximately $\pi/2$ [rad] of the reference signal;
   a phase difference detecting section obtaining a phase of the reference signal at a generation timing for each of the pulse signals and a phase difference thereof between the generation timings according to the two amplitudes obtained at the generation timing for each of the pulse signals;
   a correcting section correcting the phase difference detected by the phase difference detecting section relative to one of an error in the reference signal and an error in the phase difference of approximately $\pi/2$ [rad]; and
   a time lag calculating section obtaining a time lag between the generations of two measurement pulse signals according to the phase difference corrected by the correcting section.

2. A time lag measuring device for measuring an unknown time lag between generations of two pulse signals, comprising:
   a reference signal generating section generating at least two reference signals having a phase difference of approximately $\pi/2$ [rad], and a known cycle;
   an amplitude detecting section obtaining respective amplitudes of the two reference signals at a timing at which the pulse signals are generated;
   a phase difference detecting section obtaining a phase of the reference signals at a timing at which each of the pulse signals is generated and a phase difference thereof between respective generation timings according to two amplitudes of each of the reference signals obtained by the amplitude detecting section;
   a correcting section correcting the phase difference detected by the phase difference detecting section relative to an error attributed to one of an error between the two reference signals and an error in at least one of the reference signals; and
   a time lag calculating section obtaining the time lag between the generations of the two pulse signals according to the phase difference corrected by the correcting section.

3. The time lag measuring device according to claim 2, wherein the correcting section comprises:
   a correction data storing part storing therein correction data for correcting the error; and
   a correction calculating part performing a correction calculating processing using the correction data stored in the correction data storing part.

4. The time lag measuring device according to claim 3, wherein:
   the correction data stored in the correction data storing part is data on discrete sampling points; and
   in a case where data on a relevant sampling point is not stored in the correcting section at the time of obtaining the generation time lag, the correcting section generates the data on the relevant sampling point through one of an interpolation process and a fitting process based on the data on the sampling points stored in the correcting section.

5. The time lag measuring device according to claim 4, wherein the correction data is obtained by sampling the reference signal at at least 6 sampling points in one cycle thereof.

6. The time lag measuring device according to claim 3, wherein the correction data stored in the correction data storing part is stored as a function with an oval shape obtained corresponding to elliptically discrete sampling points.

7. The time lag measuring device according to claim 3, wherein the correcting section comprises:
   a mode switching part switching between an actual measurement mode in which measurement pulse signals are inputted and a correction mode in which correction pulse signals are inputted, the measurement pulse signal being targeted for measuring the generation time lag, the correction pulse signals being generated at timings with a known time lag;
   a correction data generating part generating correction data for correcting the error in accordance with a relationship between the known time lag and a phase difference of the correction pulse signals between the generation timings, the phase difference being calculated by the phase difference detecting section in response to input of each of the correction pulse signals in the correction mode;
   a correction data storing part storing therein the correction data generated by the correction data generating part; and
   a correction calculating part performing a correction calculating processing using the correction data stored in the correction data storing part to correct the phase difference corresponding to the time lag between the generation timings for the measurement pulse signals obtained in the actual measurement mode.

8. The time lag measuring device according to claim 7, wherein
the correction data stored in the correction data storing part is data on discrete sampling points; and
in a case where data on a relevant sampling point is not stored in the correcting section at the time of obtaining the generation time lag, the correcting section generates the data on the relevant sampling point through one of an interpolation process and a fitting process based on the data on the sampling points stored in the correcting section.

9. The time lag measuring device according to claim 7, wherein the correction data stored in the correction data storing part is stored as a function with an oval shape obtained corresponding to elliptically discrete sampling points.

10. The time lag measuring device according to claim 2, wherein the correcting section comprises:
a sampling timing forming part generating correction pulse signals at timings with an equal time lag;
a mode switching part switching between an actual measurement mode in which measurement pulse signals targeted for measuring the generation time lag are inputted, and a correction mode in which the correction pulse signals are inputted;
a correction data generating part generating correction data for correcting the error in accordance with a relationship between the equal time lag and the phase difference of the correction pulse signals between the generation timings, the phase difference being calculated by the phase difference detecting section in response to input of each of the correction pulse signals in the correction mode;
a correction data storing part storing therein the correction data generated by the correction data generating part; and
a correction calculating part performing a correction calculating processing using the correction data stored in the correction data storing part to correct the phase difference corresponding to the time lag between the generation timings of the measurement pulse signals obtained in the actual measurement mode.

11. The time lag measuring device according to claim 10, wherein the correction pulse signals are generated at equal intervals by the sampling timing forming part, and synchronized, once every several times, with the reference signals generated by the reference signal generating section.

12. The time lag measuring device according to claim 10, wherein the correction pulse signals are generated at equal intervals by the sampling timing forming part, and asynchronous with the reference signals generated by the reference signal generating section.

13. The time lag measuring device according to claim 10, wherein:
the correction data stored in the correction data storing part is data on discrete sampling points; and
in a case where data on a relevant sampling point is not stored in the correcting section at the time of obtaining the generation time lag, the correcting section generates the data on the relevant sampling point through one of an interpolation process and a fitting process based on the data on the sampling points stored in the correcting section.

14. The time lag measuring device according to claim 10, wherein the correction data stored in the correction data storing part is stored as a function with an oval shape obtained corresponding to elliptically discrete sampling points.

15. The time lag measuring device according to claim 2, wherein the correction data is set to correspond with a ratio between the amplitudes of the reference signals that are detected by the amplitude detecting section in response to each of the correction pulse signals.

16. The time lag measuring device according to claim 2, wherein the two reference signals are a sinusoidal signal and a cosine wave signal.

17. The time lag measuring device according to claim 16, wherein the correction data is set to correspond with an arctangent value of a ratio between the amplitudes of the reference signals that are detected by the amplitude detecting section in response to each of the correction pulse signals.

18. The time lag measuring device according to claim 2, wherein:
the two reference signals are a sinusoidal signal and a cosine wave signal;
when the amplitude values of the sinusoidal signal at the respective timings at which the plurality of correction pulse signals are sequentially inputted in time series are plotted in time series, the correcting section corrects a variation in the amplitude values so that each amplitude value not plotted on a certain sinusoidal curved line, among the plotted amplitude values, is plotted on the certain sinusoidal curved line; and
when the amplitude values of the cosine wave signal at the respective timings at which the plurality of correction pulse signals are sequentially inputted in time series are plotted in time series, the correcting section corrects a variation in the amplitude values so that each amplitude value not plotted on a certain cosine wave curved line, among the plotted amplitude values, is plotted on the certain cosine wave curved line.

19. The time lag measuring device according to claim 2, further comprising an approximate-time-lag detecting section detecting an approximate generation time lag between the two measurement pulse signals, and
wherein the time lag calculating section calculates the generation time lag between the two measurement pulse signals by using the approximate generation time lag detected by the approximate-time-lag detecting section in addition to a precise time lag obtained by the time lag calculating section.

20. The time lag measuring device according to claim 2, wherein:
the amplitude detecting section detects both of an amplitude A11 of the sinusoidal signal as one of the reference signals and an amplitude A12 of the cosine wave signal as the other one of the reference signals at the generation timing for one of two measurement pulse signals targeted for measuring the generation time lag, the one of two measurement pulse signals chronologically preceding to the other;
the phase difference detecting section calculates a ratio between the amplitudes A11, A12 (A11/A12), and calculates a phase $\theta$ start based on the amplitude ratio (A11/A12) from $\tan^{-1}\{(A11/A12)\}$;
the correcting section corrects the phase $\theta$ start to a phase $\theta$ start';
the amplitude detecting section detects both of an amplitude A21 of the sinusoidal signal and an amplitude A22 of the cosine wave signal at the generation timing for the other of the two measurement pulse signals which is chronologically subsequent;

the phase difference detecting section calculates a ratio between the amplitudes A21, A22 (A21/A22), and calculates a phase θ stop based on the amplitude ratio (A21/A22) from $\tan^{-1}\{(A21/A22)\}$;

the correcting section corrects the phase stop to a phase θ stop'; and the time lag calculating section calculates a phase difference Δθ of the two measurement pulse signals between the generation timings from (θ stop'-θ start').

21. A time lag measuring device for measuring an unknown time lag between generations of two pulse signals, comprising:

a reference signal section generating a single reference signal having a known cycle;

a pulse delaying section delaying each of the two pulse signals by a time corresponding to a phase difference of approximately π/2 of the reference signal;

an amplitude detecting section obtaining respective amplitudes of the reference signal at a timing at which each of the pulse signals is generated and at a delay timing delayed by the pulse delaying section;

a phase difference detecting section obtaining a phase of the reference signal for each of the pulse signals and a phase difference of the pulse signals between the generation timings according to two amplitudes detected for each of the pulse signals by the amplitude detecting section;

a correcting section correcting the phase difference detected by the phase difference detecting section relative to one of an error in the reference signal and an error in the phase difference of approximately π/2 ; and a time lag calculating section obtaining the generation time lag between the two measurement pulse signals according to the phase difference corrected by the correcting section.

22. The time lag measuring device according to claim 21, wherein the correcting section comprises:

a correction data storing part storing therein correction data for correcting the error; and a correction calculating part performing a correction calculating processing using the correction data stored in the correction data storing part.

23. The time lag measuring device according to claim 22, wherein the correction data stored in the correction data storing part is data on discrete sampling points; and in a case where the data on a relevant sampling point is not stored in the correcting section at the time of obtaining the generation time lag, the correcting section generates the data on the relevant sampling point through one of an interpolation process and a fitting process based on the data of the sampling points stored in the correcting section.

24. The time lag measuring device accroding to claim 23, wherein the correction data is obtained by sampling the reference signal at at least 6 sampling points in one cycle thereof.

25. The time lag measuring device according to claim 22, wherein the correction data stored in the correction data storing part is stored as a function with an oval shape obtained corresponding to elliptically discrete sampling points.

26. The time lag measuring device according to claim 21, wherein the correcting section comprises:

a mode switching part switching between an actual measurement mode in which measurement pulse signals are inputted and a correction mode in which correction pulse signals are inputted the measurement pulse signals being targeted for measuring the generation time lag, the correction pulse signals being generated at generation timings with a known time lag;

a correction data generating part generating correction data for correcting the error in accordance with a relationship between the known time lag and the phase difference of the correction pulse signals between the generation timings, the phase difference being calculated by the phase difference detecting section in response to input of each of the correction pulse signals in the correction mode;

a correction data storing part storing therein the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

27. The time lag measuring device according to claim 26, wherein the correction data stored in the correction data storing part is data on discrete sampling points; and in a case where data on a relevant sampling point is not stored in the correcting section at the time of obtaining the generation time lag, the correcting section generates the data on the relevant sampling point through one of an interpolation process and a fitting process based on the data on the sampling points stored in the correcting section.

28. The time lag measuring device according to claim 26, wherein the correction data stored in the correction data storing part is stored as a function with an oval shape obtained corresponding to elliptically discrete sampling points.

29. The time lag measuring device according to claim 17, wherein the correcting section comprises:

a sampling timing forming part generating correction pulse signals at generation timings with an equal time lag;

a mode switching part switching between an actual measurement mode in which measurement pulse signals targeted for measuring the generation time lag are inputted, and a correction mode in which the correction pulse signals are inputted;

a correction data generating part generating correction data for correcting the error in accordance with a relationship between the equal time lag and the phase difference of the correction pulse signals between the generation timings, the phase difference being calculated by the phase difference detecting section in response to input of each of the correction pulse signals in the correction mode;

a correction data storing part storing therein the correction data generated by the correction data generating part; and a correction calculating part performing a correction calculating processing using the correction data stored in the correction data storing part to correct the phase difference corresponding to the time lag between the generation timings for the measurement pulse signals obtained in the actual measurement mode.

30. The time lag measuring device according to claim 29, wherein the correction pulse signals are generated at equal intervals by the sampling timing forming part, and synchronized, once every several times, with the reference signals generated by the reference signal generating section.

31. The time lag measuring device according to claim 29, wherein the correction pulse signals are generated at equal intervals by the sampling timing forming part, and asynchronous with the reference signals generated by the reference signal generating section.

32. The time lag measuring device according to claim 29, wherein the correction data stored in the correction data storing part is data on discrete sampling points; and
   in a case where data on a relevant sampling point is not stored in the correcting section at the time of obtaining the generation time lag, the correcting section generates the data on the data on the sampling points stored in the correcting section.

33. The time lag measuring device according to claim 29, wherein the correction data stored in the correction data storing part is stored as a function with an oval shape obtained corresponding to elliptically discrete sampling points.

34. The time lag measuring device according to claim 21, wherein the correction data is set to correspond with a ratio between the amplitudes of the reference signals that are detected by the amplitude detecting section in response to each of the correction pulse signals.

35. The time lag measuring device according to claim 21, wherein the reference signal is one of a sinusoidal signal and a cosine wave signal.

36. The time lag measuring device according to claim 35, wherein the correction data is set to correspond with an arctangent value of a ratio between the amplitudes of the reference signals at the generation timing and at the delay timing for each of the correction pulse signals, the amplitudes being detected by the amplitude detecting section.

37. The time lag measuring device according to claim 21, wherein:
   the reference signal is one of a sinusoidal signal and a cosine wave signal;
   when the amplitude values of the reference signal at the respective generation timings at which the plurality of correction pulse signals are sequentially inputted in time series are plotted in time series, the correcting section corrects a variation in the amplitude values so that each amplitude value not plotted on a certain sinusoidal curved line or cosine wave curved line, among the plotted amplitude values, is plotted on the certain sinusoidal curved line or cosine wave curved line; and
   when the amplitude values of the reference signal at the respective delay timings at which the plurality of correction pulse signals are sequentially inputted in time series are plotted in time series, the correcting section corrects a variation in the amplitude values so that each amplitude value not plotted on a certain cosine wave curved line or sinusoidal curved line, among the plotted amplitude values, is plotted on the certain cosine wave curved line or sinusoidal curved line.

38. The time lag measuring device according to claim 3, further comprising an approximate-time-lag detecting section detecting an approximate generation time lag between the two measurement pulse signals, and
   wherein the time lag calculating section calculates the generation time lag between the two measurement pulse signals by using the approximate generation time lag detected by the approximate-time-lag detecting section in addition to a precise time lag obtained by the time lag calculating section.

39. The time lag measuring device according to claim 2, wherein:
   the amplitude detecting section detects both of an amplitude A11 of the sinusoidal signal as one of the reference signals and an amplitude A12 of the cosine wave signal as the other one of the reference signals at the generation timing for one of two measurement pulse signals targeted for measuring the generation time lag, the one of two measurement pulse signals chronologically preceding to the other;
   the phase difference detecting section calculates a ratio between the amplitudes A11, A12 (A11/A12), and calculates a phase θ start based on the amplitude ratio (A11/A12) from $\tan^{-1}\{(A11/A12)\}$;
   the correcting section corrects the phase θ start to a phase θ start';
   the amplitude detecting section detects both of an amplitude A21 of the sinusoidal signal and an amplitude A22 of the cosine wave signal at the generation timing for the other of the two measurement pulse signals which is chronologically subsequent;
   the phase difference detecting section calculates a ratio between the amplitudes A21, A22 (A21/A22), and calculates a phase θ stop based on the amplitude ratio (A21/A22) from $\tan^{-1}\{(A21/A22)\}$;
   the correcting section corrects the phase θ stop to a phase θ stop'; and
   the time lag calculating section calculates a phase difference Δθ of the two measurement pulse signals between the generation timings from (θ stop'-θ start').

40. A distance measuring apparatus comprising:
   a measurement-pulse-wave emission unit emitting a measurement pulse wave to an object of distance measurement;
   a reflected-pulse-wave detection unit detecting a reflected pulse wave obtained by reflecting the measurement pulse wave by the object of distance measurement;
   a time lag measuring device obtaining a first pulse signal at a timing when the measurement pulse wave is emitted from the measurement-pulse-wave emission unit, obtaining a second pulse signal at a timing when the reflected pulse wave is detected by the reflected-pulse-wave detection unit, and measuring a time lag between the timings at which the first pulse signal and the second pulse signal are obtained; and
   a distance calculation unit finding a distance to the object of distance measurement according to the time lag obtained by the time lag measuring device, wherein
   the distance measuring apparatus is the time lag measuring device according claim 1.

41. A distance measuring method comprising the steps of:
   generating at least two reference signals having a phase difference of approximately π/2 and a known cycle;
   emitting a measurement pulse wave to an object of distance measurement;
   obtaining an amplitude of each of the two reference signals at a timing at which the emission of the measurement pulse wave is detected;
   obtaining an amplitude of each of the two reference signals at a timing at which a reflected pulse wave is detected, the reflected pulse wave being obtained from the measurement pulse wave reflected by the object of distance measurement;
   obtaining a phase of the reference signals at each detection timing for the pulse waves and a phase difference thereof between the detection timings according to two amplitudes detected for each of the reference signals;
   correcting the detected phase difference relative to an error attributed to one of an error between the two reference signals and an error in at least one of the reference signals;

obtaining a time lag between the detection timing for the measurement pulse wave and the detection timing for the reflected pulse wave according to the corrected phase difference; and finding a distance to the object of distance measurement according to the time lag.

42. A distance measuring method comprising the steps of:

generating a reference signal having a known cycle;

emitting a measurement pulse wave to an object of distance measurement;

detecting an emission of the measuring pulse wave;

detecting a reflected pulse wave obtained by reflecting the measurement pulse wave by the object of distance measurement;

obtaining an amplitude of the reference signal at a timing at which the emission of the measurement pulse is detected and at a delay timing that delays from the detection timing for the measurement pulse by a time corresponding to a phase difference of approximately $\pi/2$ in the reference signal;

obtaining the amplitude of the reference signal at a timing at which the reflected pulse wave is detected and at a delay timing that delays from the detection timing for the reflected pulse wave by a time corresponding to the phase difference of approximately $\pi/2$ in the reference signal;

obtaining a phase of the reference signal at each of the detection timings for the pulse waves and a phase difference thereof between the detection timings according to the two detected amplitudes of the measurement pulse wave and the two detected amplitudes of the reflected pulse wave; and correcting the obtained phase difference relative to one of an error in the reference signal and an error in the phase difference of approximately $\pi/2$;

obtaining a time lag between the detection timing for the measurement pulse wave and the detection timing for the reflected pulse wave according to the corrected phase difference; and finding a distance to the object of distance measurement according to the time lag.

\* \* \* \* \*